# (12) United States Patent
Tohchi et al.

(10) Patent No.: US 8,000,025 B2
(45) Date of Patent: Aug. 16, 2011

(54) ZOOM LENS SYSTEM, IMAGING DEVICE AND CAMERA

(75) Inventors: Yasunori Tohchi, Osaka (JP); Yoshiaki Kurioka, Osaka (JP); Takakazu Bito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/652,235

(22) Filed: Jan. 5, 2010

(65) Prior Publication Data

US 2010/0172031 A1 Jul. 8, 2010

(30) Foreign Application Priority Data

Jan. 8, 2009 (JP) ................................ 2009-002552
Jan. 8, 2009 (JP) ................................ 2009-002553

(51) Int. Cl.
*G02B 15/14* (2006.01)
(52) U.S. Cl. ........................................................ 359/687
(58) Field of Classification Search .................... 359/687
See application file for complete search history.

(56) References Cited

U.S. PATENT DOCUMENTS

| 5,570,233 | A | 10/1996 | Mihara et al. |
| 5,572,277 | A | 11/1996 | Uzawa et al. |
| 2006/0098302 | A1 | 5/2006 | Miyajima et al. |
| 2006/0193062 | A1 | 8/2006 | Ohashi |
| 2006/0291070 | A1 | 12/2006 | Terada et al. |
| 2007/0297068 | A1 | 12/2007 | Ohashi |
| 2009/0103186 | A1* | 4/2009 | Hankawa ..................... 359/686 |

FOREIGN PATENT DOCUMENTS

| JP | 07-005361 A | 1/1995 |
| JP | 07-020381 A | 1/1995 |
| JP | 2006-133632 A | 5/2006 |
| JP | 2006-235062 A | 9/2006 |
| JP | 2007-003554 A | 1/2007 |
| JP | 2007-010695 A | 1/2007 |
| JP | 2008-026837 A | 2/2008 |

* cited by examiner

*Primary Examiner* — William Choi
(74) *Attorney, Agent, or Firm* — Pearne & Gordon LLP

(57) ABSTRACT

A zoom lens system, in order from an object side to an image side, comprising a first lens unit of positive power, a second lens unit of negative power, a third lens unit of positive power, and a fourth lens unit of positive power, wherein the first lens unit is composed of three or fewer lens elements, wherein the second lens unit is composed of three lens elements, wherein in zooming, the first to the fourth lens units are moved individually along an optical axis such that air spaces should vary, so that variable magnification is achieved, and wherein the conditions are satisfied: $2.00 \leq D/f_W \leq 4.68$, $\omega_W \geq 35$ and $f_T/f_W \geq 10$ (D is a total of an optical axial thickness of each lens unit, $\omega_W$ is a half view angle at a wide-angle limit, and $f_T$ and $f_W$ are focal lengths of the entire system respectively at a telephoto limit and at a wide-angle limit), an imaging device and a camera are provided.

13 Claims, 56 Drawing Sheets

ZOOM LENS SYSTEM, IMAGING DEVICE AND CAMERA

CROSS-REFERENCE TO RELATED APPLICATION

This application is based on application Nos. 2009-002552 and 2009-002553 filed in Japan on Jan. 8, 2009, the contents of which are hereby incorporated by reference.

BACKGROUND OF THE INVENTION

1. Field of the Invention

The present invention relates to a zoom lens system, an imaging device and a camera. In particular, the present invention relates to: a high-performance zoom lens system having a small size and still having a wide view angle at a wide-angle limit as well as a high zooming ratio; an imaging device employing this zoom lens system; and a compact and thin camera employing this imaging device.

2. Description of the Background Art

Remarkably strong requirements of size reduction and performance improvement are present in digital still cameras and digital video cameras (simply referred to as digital cameras, hereinafter) provided with an image sensor for performing photoelectric conversion. In particular, from a convenience point of view, digital cameras are strongly requested that employ a zoom lens system having a high zooming ratio and still covering a wide focal-length range from a wide angle condition to a highly telephoto condition. On the other hand, in recent years, zoom lens systems are also desired that have a wide angle range where the photographing field is large.

As zoom lens systems having a high zooming ratio as described above, in conventional art, various kinds of zoom lens systems having a four-unit construction of positive, negative, positive and positive have been proposed that, in order from the object side to the image side, comprise: a first lens unit having positive optical power, a second lens unit having negative optical power, a third lens unit having positive optical power, and a fourth lens unit having positive optical power.

Japanese Laid-Open Patent Publication No. H07-005361 discloses a zoom lens having the above-mentioned four-unit construction of positive, negative, positive and positive, wherein at the time of magnification change from a wide-angle limit to a telephoto limit, the first lens unit and the third lens unit are displaced to the object side relatively in a telephoto limit position than in a wide-angle limit position, the second lens unit is displaced to the image side relatively in a telephoto limit position than in a wide-angle limit position, and the fourth lens unit is moved along the optical axis, and wherein the ratio of the focal lengths of the entire system and the first lens unit and the image formation magnification of the second lens unit are set forth.

Japanese Laid-Open Patent Publication No. H07-020381 discloses a zoom lens having the above-mentioned four-unit construction of positive, negative, positive and positive, wherein at the time of magnification change from a wide-angle limit to a telephoto limit, the first lens unit moves monotonically to the object side, the second lens unit moves monotonically to the image side, the third lens unit moves such as to be located on the object side relatively at a wide-angle limit than at a telephoto limit, and the fourth lens unit moves such that in an infinite in-focus condition, the axial air space with the third lens unit should be larger at a telephoto limit than at a wide-angle limit, and wherein the ratio of the focal lengths of the third and the fourth lens units, the air space between the third and the fourth lens units, and the composite focal lengths of the first to the third lens units are set forth.

Japanese Laid-Open Patent Publication No. 2006-133632 discloses a zoom lens having the above-mentioned four-unit construction of positive, negative, positive and positive, wherein at the time of magnification change from a wide-angle limit to a telephoto limit, the intervals of the individual units are changed and the first lens unit moves to the object side relatively at a telephoto limit than at a wide-angle limit, and wherein the focal length of the first lens unit and the values of lateral magnification of the second lens unit at a telephoto limit and a wide-angle limit are set forth.

Japanese Laid-Open Patent Publication No. 2007-003554 discloses a zoom lens having the above-mentioned four-unit construction of positive, negative, positive and positive, wherein at least the first and the third lens units are moved at the time of magnification change and the first lens unit is moved to the object side at the time of magnification change from a wide-angle limit to a telephoto limit, and wherein the amount of relative movement of the second lens unit in magnification change from a wide-angle limit to a telephoto limit and the focal lengths of the first and the third lens units are set forth.

Japanese Laid-Open Patent Publication No. 2007-010695 discloses a zoom lens having the above-mentioned four-unit construction of positive, negative, positive and positive, wherein at least the first lens unit is moved in magnification change from a wide-angle limit to a telephoto limit, and wherein the focal length of the first lens unit and the average refractive index to the d-line of all lenses in the second lens unit are set forth.

Japanese Laid-Open Patent Publication No. 2008-026837 discloses a zoom lens having the above-mentioned four-unit construction of positive, negative, positive and positive, wherein at the time of magnification change from a wide-angle limit to a telephoto limit, the interval between the first lens unit and the second lens unit increases and the interval between the second lens unit and the third lens unit decreases, and wherein the refractive index, the Abbe number, and the anomalous dispersion property are set forth at least for one positive lens in the third lens unit.

Each zoom lens disclosed in the above-mentioned patent documents has a sufficiently reduced size that permits application to a thin and compact digital camera and still has a high zooming ratio of approximately 10 or greater. Nevertheless, each zoom lens has an insufficient view angle at a wide-angle limit, and hence does not satisfy a requested level in recent years.

SUMMARY OF THE INVENTION

An object of the present invention is to provide: a high-performance zoom lens system having a small size and still having a wide view angle at a wide-angle limit as well as a high zooming ratio; an imaging device employing this zoom lens system; and a compact and thin camera employing this imaging device.

(I) The novel concepts disclosed herein were achieved in order to solve the foregoing problems in the conventional art, and herein is disclosed:

a zoom lens system, in order from an object side to an image side, comprising a first lens unit having positive optical power, a second lens unit having negative optical power, a third lens unit having positive optical power, and a fourth lens unit having positive optical power, wherein the first lens unit is composed of three or fewer lens elements, wherein the second lens unit is composed of three lens elements, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (2), (a-1) and (b) are satisfied:

$$2.00 \leq D/f_W \leq 4.68 \quad (2)$$

$$\omega_W \geq 35 \quad (a\text{-}1)$$

$$f_T/f_W \geq 10 \quad (b)$$

where,

D is a total of an optical axial thickness of each lens unit, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein the first lens unit is composed of three or fewer lens elements, wherein the second lens unit is composed of three lens elements, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (2), (a-1) and (b) are satisfied:

$$2.00 \leq D/f_W \leq 4.68 \quad (2)$$

$$\omega_W \geq 35 \quad (a\text{-}1)$$

$$f_T/f_W \geq 10 \quad (b)$$

where,

D is a total of an optical axial thickness of each lens unit, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein the first lens unit is composed of three or fewer lens elements, wherein the second lens unit is composed of three lens elements, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (2), (a-1) and (b) are satisfied:

$$2.00 \leq D/f_W \leq 4.68 \quad (2)$$

$$\omega_W \geq 35 \quad (a\text{-}1)$$

$$f_T/f_W \geq 10 \quad (b)$$

where,

D is a total of an optical axial thickness of each lens unit, $\omega_W$ is a half view angle (°) at a wide-angle limit, $f_T$ is a focal length of the entire system at a telephoto limit, and $f_W$ is a focal length of the entire system at a wide-angle limit.

(II) The novel concepts disclosed herein were achieved in order to solve the foregoing problems in the conventional art, and herein is disclosed:

a zoom lens system, in order from an object side to an image side, comprising a first lens unit having positive optical power, a second lens unit having negative optical power, a third lens unit having positive optical power, and a fourth lens unit having positive optical power, wherein the first lens unit is composed of three or fewer lens elements, wherein the second lens unit is composed of three lens elements, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (3), (4), (a-1) and (b) are satisfied:

$$8.50 \leq L_W/I_r \leq 11.85 \quad (3)$$

$$11.50 \leq L_T/I_r \leq 15.84 \quad (4)$$

$$\omega_W \geq 35 \quad (a\text{-}1)$$

$$f_T/f_W \geq 10 \quad (b)$$

where, $L_W$ is an overall length of lens system at a wide-angle limit (a distance from the most object side surface of the first lens unit to the image surface), $L_T$ is an overall length of lens system at a telephoto limit (a distance from the most object side surface of the first lens unit to the image surface), $I_r$ is a maximum image height, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein the first lens unit is composed of three or fewer lens elements, wherein the second lens unit is composed of three lens elements, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (3), (4), (a-1) and (b) are satisfied:

$$8.50 \leq L_W/I_r \leq 11.85 \tag{3}$$

$$11.50 \leq L_T/I_r \leq 15.84 \tag{4}$$

$$\omega_W \geq 35 \tag{a-1}$$

$$f_T/f_W \geq 10 \tag{b}$$

where, $L_W$ is an overall length of lens system at a wide-angle limit (a distance from the most object side surface of the first lens unit to the image surface), $L_T$ is an overall length of lens system at a telephoto limit (a distance from the most object side surface of the first lens unit to the image surface), $I_r$ is a maximum image height, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein the first lens unit is composed of three or fewer lens elements, wherein the second lens unit is composed of three lens elements, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (3), (4), (a-1) and (b) are satisfied:

$$8.50 \leq L_W/I_r \leq 11.85 \tag{3}$$

$$11.50 \leq L_T/I_r \leq 15.84 \tag{4}$$

$$\omega_W \geq 35 \tag{a-1}$$

$$f_T/f_W \geq 10 \tag{b}$$

where, $L_W$ is an overall length of lens system at a wide-angle limit (a distance from the most object side surface of the first lens unit to the image surface), $L_T$ is an overall length of lens system at a telephoto limit (a distance from the most object side surface of the first lens unit to the image surface), $I_r$ is a maximum image height, $\omega_W$ is a half view angle (°) at a wide-angle limit, $f_T$ is a focal length of the entire system at a telephoto limit, and $f_W$ is a focal length of the entire system at a wide-angle limit.

The present invention realizes: a high-performance zoom lens system having a small size and still having a wide view angle at a wide-angle limit as well as a high zooming ratio; an imaging device employing this zoom lens system; and a compact and thin camera employing this imaging device.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiments I-1 to I-10

Figure 1:
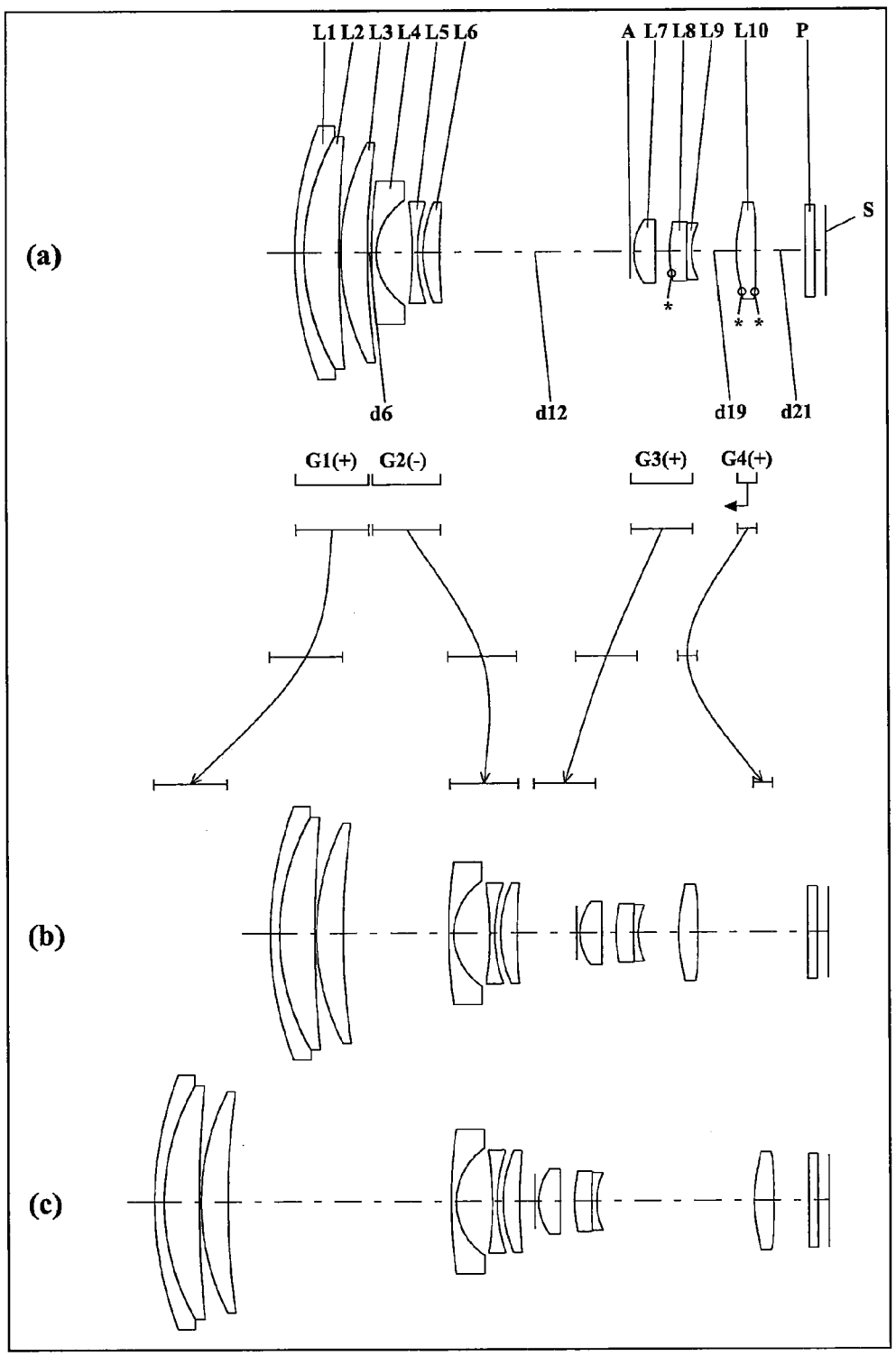
FIGS. 1(a)-(c) are a lens arrangement diagram showing an infinity in-focus condition of a zoom lens system according to Embodiment I-1 (Example I-1)
Figure 2:
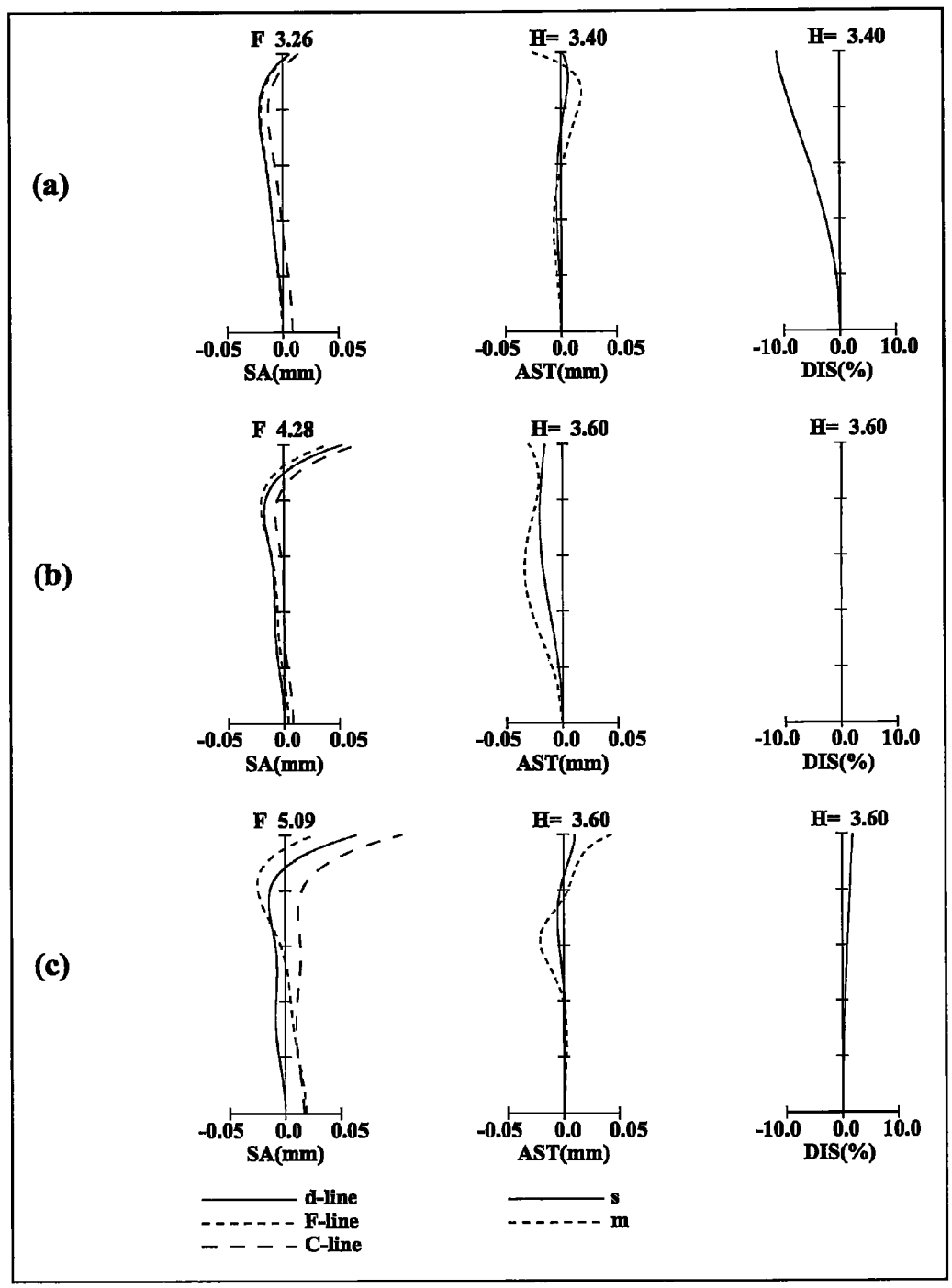
FIGS. 2(a)-(c) are a longitudinal aberration diagram of an infinity in-focus condition of a zoom lens system according to Example I-1.
Figure 3:
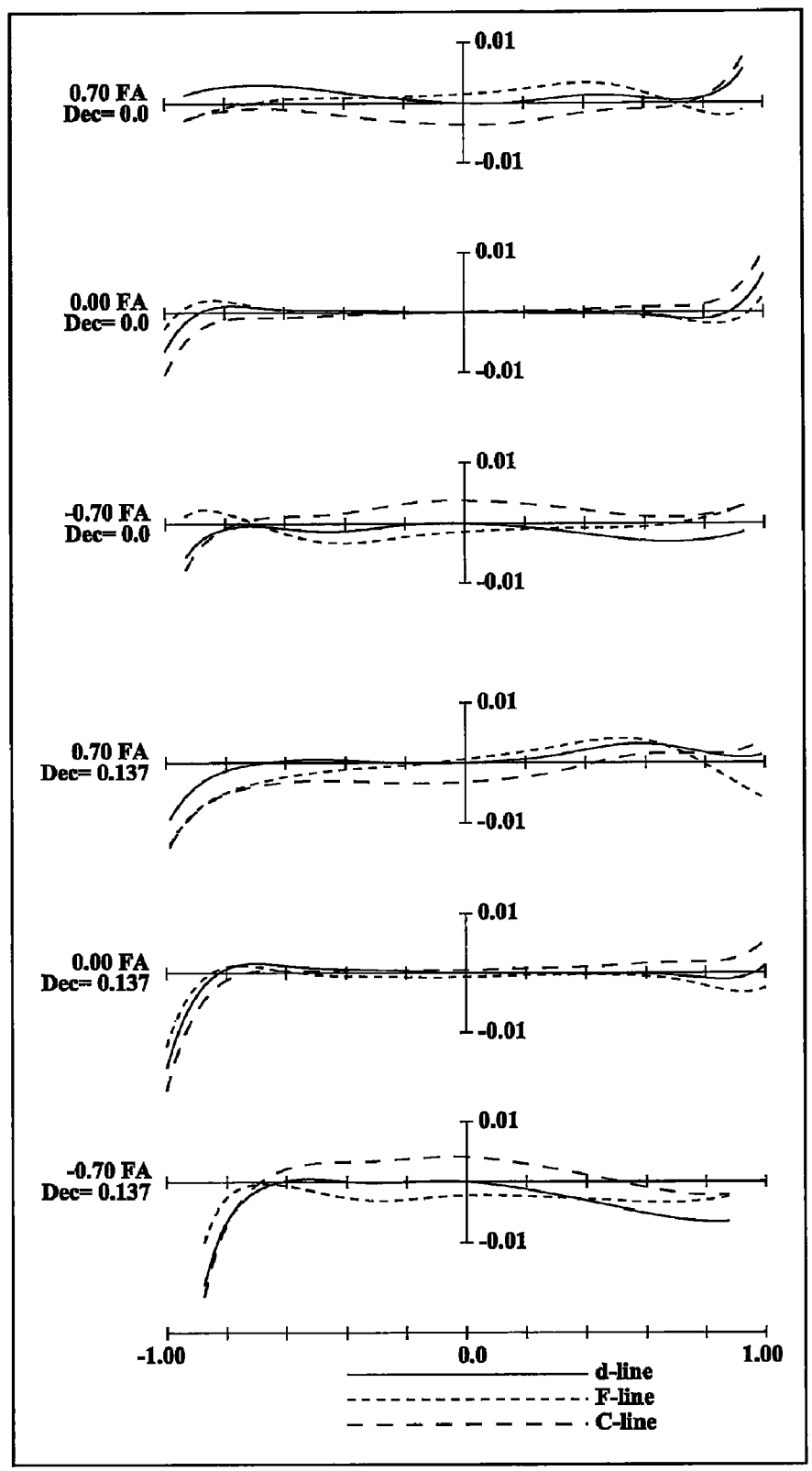
FIG. 3 is a lateral aberration diagram of a zoom lens system according to Example I-1 at a telephoto limit in a basic state where image blur compensation is not performed and in a blur compensation state.

FIGS. 1, 4, 7, 10, 13, 15, 17, 20, 23 and 26 are lens arrangement diagrams of zoom lens systems according to Embodiments I-1 to I-10, respectively.

Each of FIGS. 1, 4, 7, 10, 13, 15, 17, 20, 23 and 26 shows a zoom lens system in an infinity in-focus condition. In each FIG., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W \cdot f_T)}$), and part (c) shows a lens configuration at a telephoto limit (in the maximum focal length condition: focal length $f_T$). Further, in each FIG., an arrow of straight or curved line provided between part (a) and part (b) indicates the movement of each lens unit from a wide-angle limit through a middle position to a telephoto limit. Moreover, in each FIG., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises a first lens unit G1 having positive optical power, a second lens unit G2 having negative optical power, a third lens unit G3 having positive optical power, and a fourth lens unit G4 having positive optical power. Then, in zooming, the individual lens units move in a direction along the optical axis such that intervals between the lens units, that is, the interval between the first lens unit G1 and the second lens unit G2, the interval between the second lens unit G2 and the third lens unit G3, and the interval between the third lens unit G3 and the fourth lens unit G4 should all vary. In the zoom lens system according to each embodiment, since these lens units are arranged in the desired optical power configuration, high optical performance is obtained and still size reduction is achieved in the entire lens system.

Further, in FIGS. 1, 4, 7, 10, 13, 15, 17, 20, 23 and 26, an asterisk "*" imparted to a particular surface indicates that the surface is aspheric. In each FIG., symbol (+) or (−) imparted to the symbol of each lens unit corresponds to the sign of the optical power of the lens unit. In each FIG., the straight line located on the most right-hand side indicates the position of the image surface S. On the object side relative to the image surface S (that is, between the image surface S and the most image side lens surface of the fourth lens unit G4), a plane parallel plate P such as an optical low-pass filter and a face plate of an image sensor is provided.

Further, in FIGS. 1, 4, 7, 10, 13, 15, 17, 20, 23 and 26, an aperture diaphragm A is provided on the most object side of the third lens unit G3. Then, in zooming from a wide-angle limit to a telephoto limit at the time of image taking, the aperture diaphragm A moves along the optical axis integrally with the third lens unit G3.

As shown in FIG. 1, in the zoom lens system according to Embodiment I-1, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment I-1, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

In the zoom lens system according to Embodiment I-1, the third lens unit G3, in order from the object side to the image side, comprises: a positive meniscus seventh lens element L7 with the convex surface facing the object side; a positive meniscus eighth lens element L8 with the convex surface facing the object side; and a negative meniscus ninth lens element L9 with the convex surface facing the object side. Among these, the eighth lens element L8 and the ninth lens element L9 are cemented with each other. In the surface data in the corresponding numerical example described later, surface number 17 indicates the cement layer between the eighth lens element L8 and the ninth lens element L9. Further, the eighth lens element L8 has an aspheric object side surface.

Further, in the zoom lens system according to Embodiment I-1, the fourth lens unit G4 comprises solely a bi-convex tenth lens element L10. The tenth lens element L10 has two aspheric surfaces.

Here, in the zoom lens system according to Embodiment I-1, a plane parallel plate P is provided on the object side relative to the image surface S (between the image surface S and the tenth lens element L10).

In the zoom lens system according to Embodiment I-1, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 4:
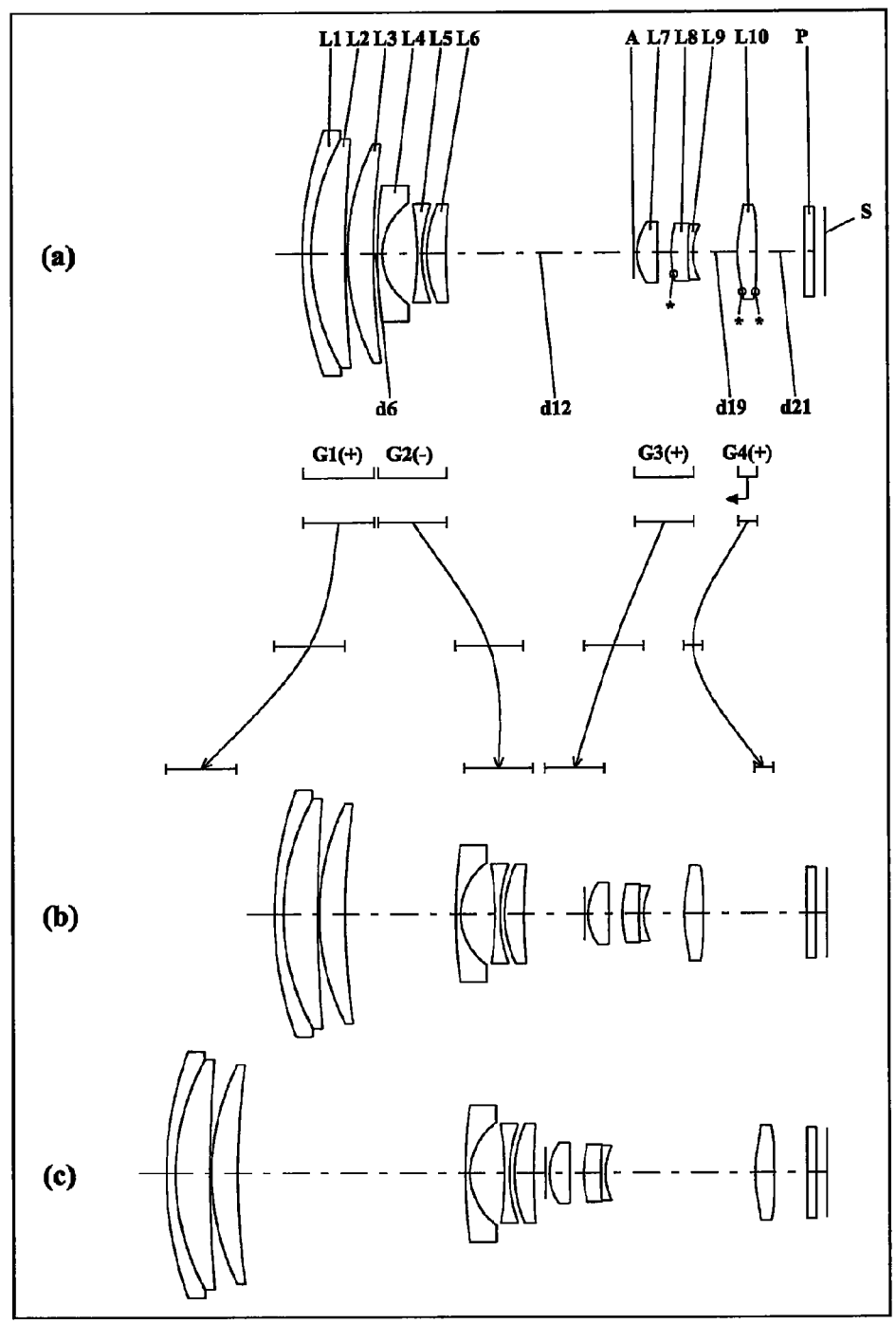
FIGS. 4(a)-(c) are a lens arrangement diagram showing an infinity in-focus condition of a zoom lens system according to Embodiment I-2 (Example I-2)
Figure 5:
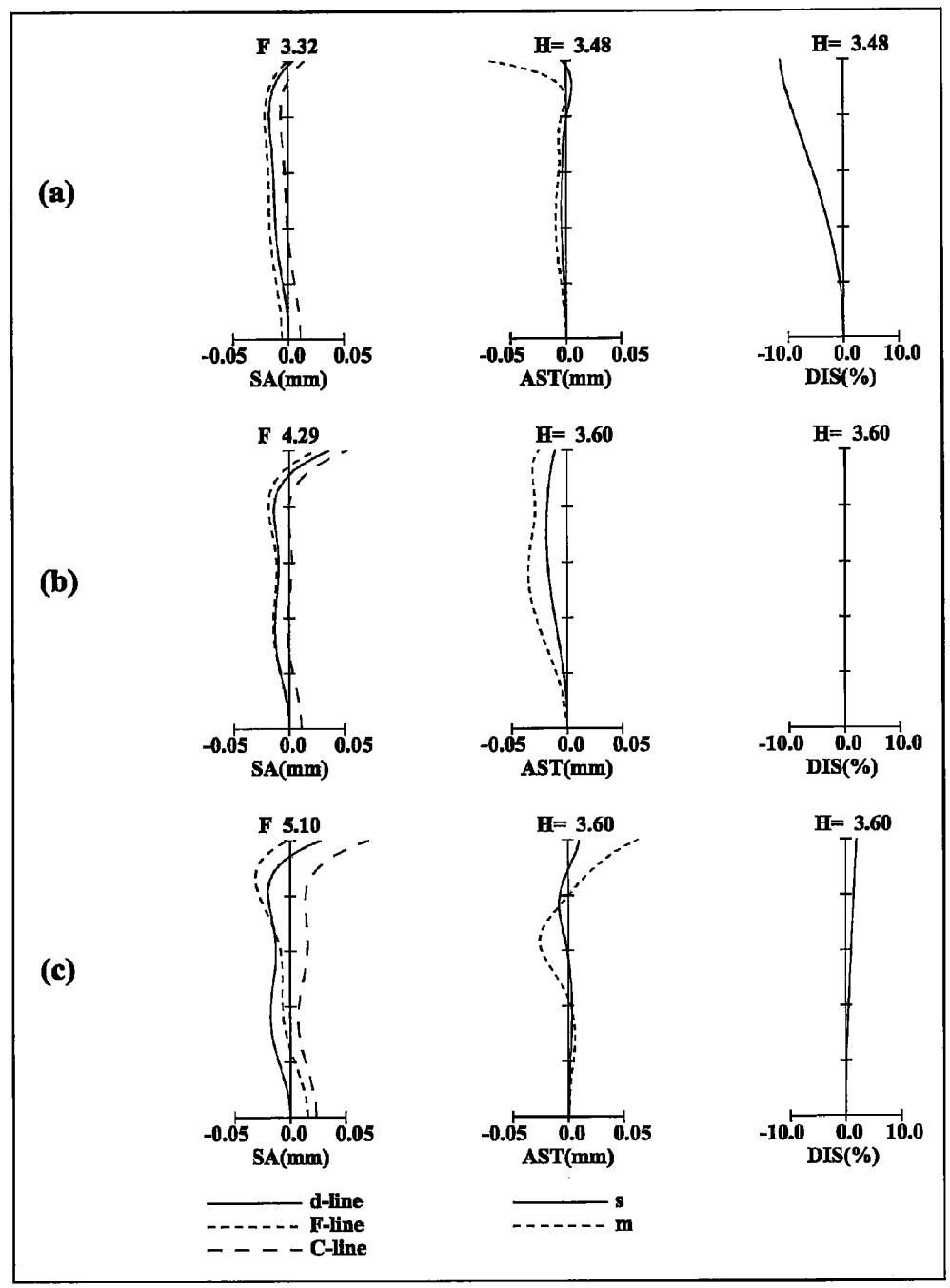
FIGS. 5(*a*)-(*c*) are a longitudinal aberration diagram of an infinity in-focus condition of a zoom lens system according to Example I-2.
Figure 6:
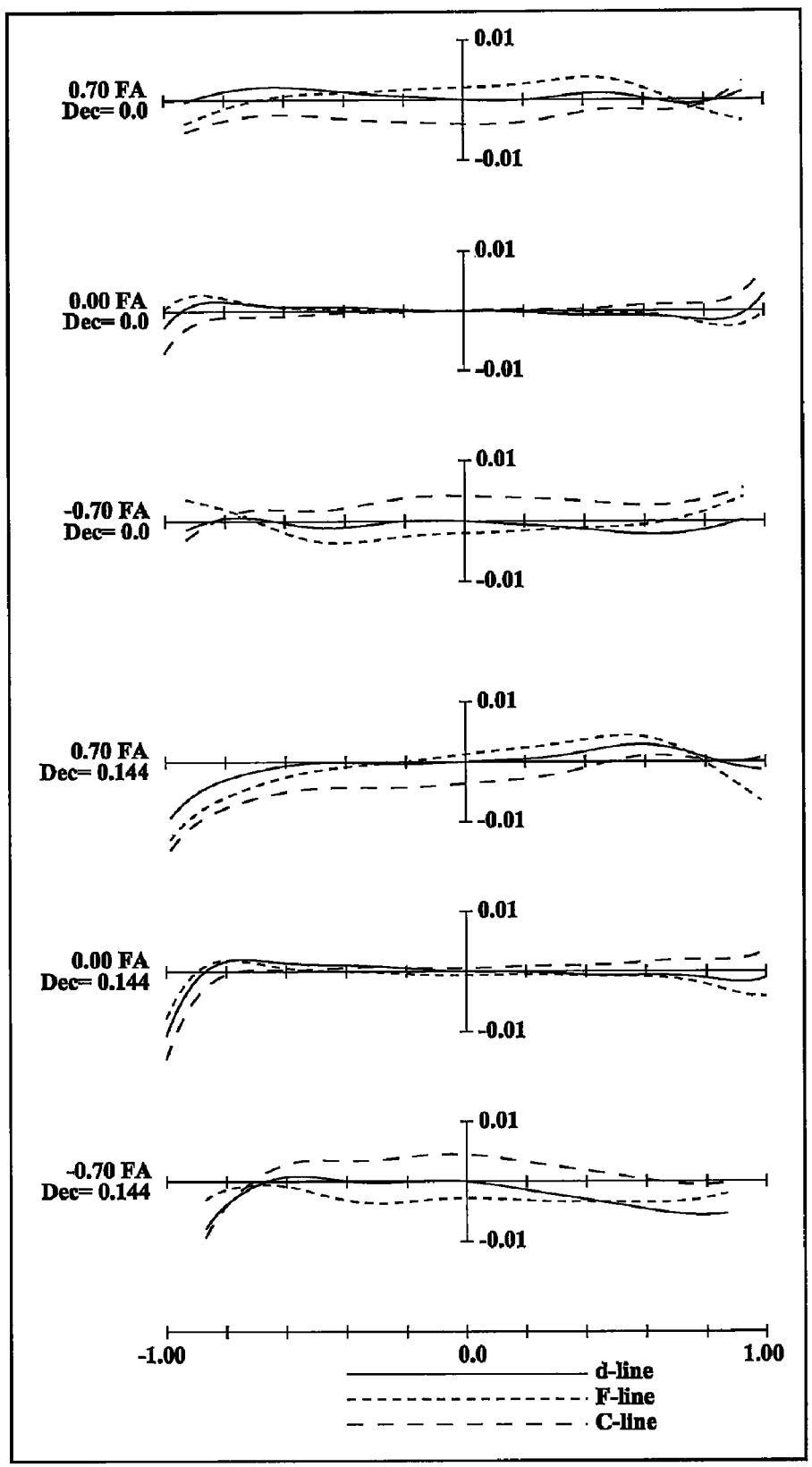
FIG. 6 is a lateral aberration diagram of a zoom lens system according to Example I-2 at a telephoto limit in a basic state where image blur compensation is not performed and in a blur compensation state.

As shown in FIG. 4, in the zoom lens system according to Embodiment I-2, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment I-2, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

In the zoom lens system according to Embodiment I-2, the third lens unit G3, in order from the object side to the image side, comprises: a positive meniscus seventh lens element L7 with the convex surface facing the object side; a positive meniscus eighth lens element L8 with the convex surface facing the object side; and a negative meniscus ninth lens element L9 with the convex surface facing the object side. Among these, the eighth lens element L8 and the ninth lens element L9 are cemented with each other. In the surface data in the corresponding numerical example described later, surface number 17 indicates the cement layer between the eighth lens element L8 and the ninth lens element L9. Further, the eighth lens element L8 has an aspheric object side surface.

Further, in the zoom lens system according to Embodiment I-2, the fourth lens unit G4 comprises solely a bi-convex tenth lens element L10. The tenth lens element L10 has two aspheric surfaces.

Here, in the zoom lens system according to Embodiment I-2, a plane parallel plate P is provided on the object side relative to the image surface S (between the image surface S and the tenth lens element L10).

In the zoom lens system according to Embodiment I-2, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 7:
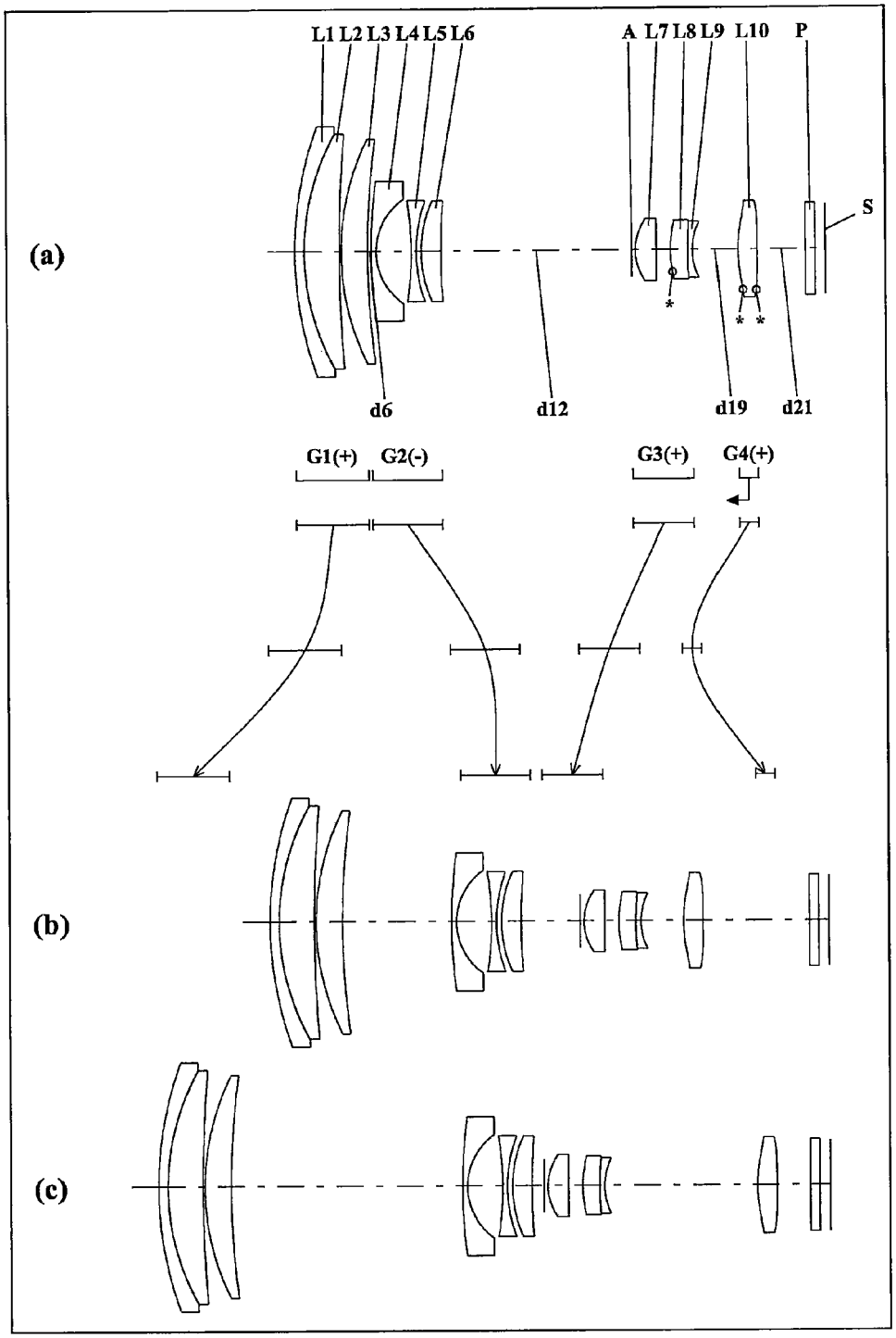
FIGS. 7(*a*)-(*c*) are a lens arrangement diagram showing an infinity in-focus condition of a zoom lens system according to Embodiment I-3 (Example I-3)
Figure 8:
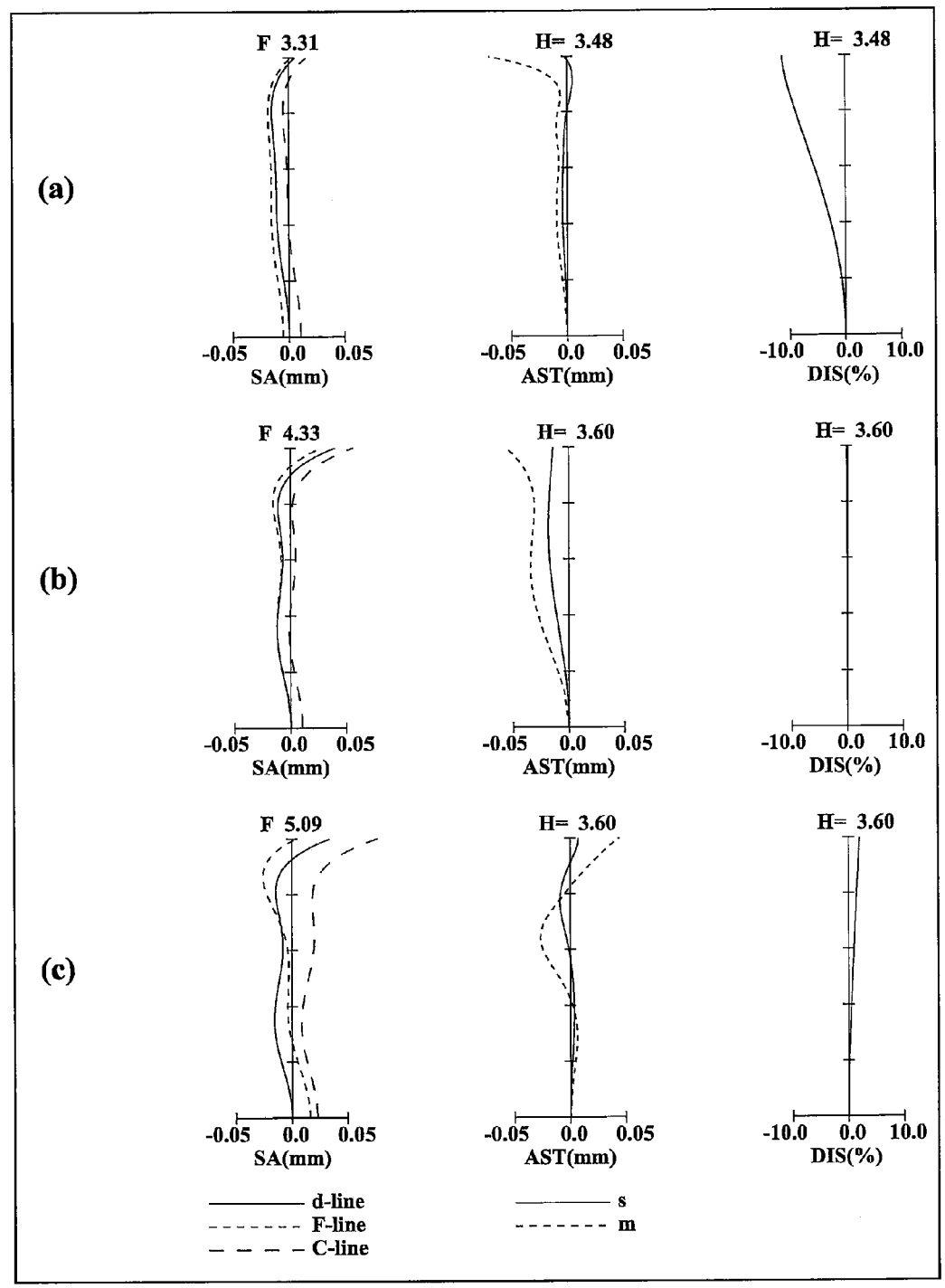
FIGS. 8(*a*)-(*c*) are a longitudinal aberration diagram of an infinity in-focus condition of a zoom lens system according to Example I-3.
Figure 9:
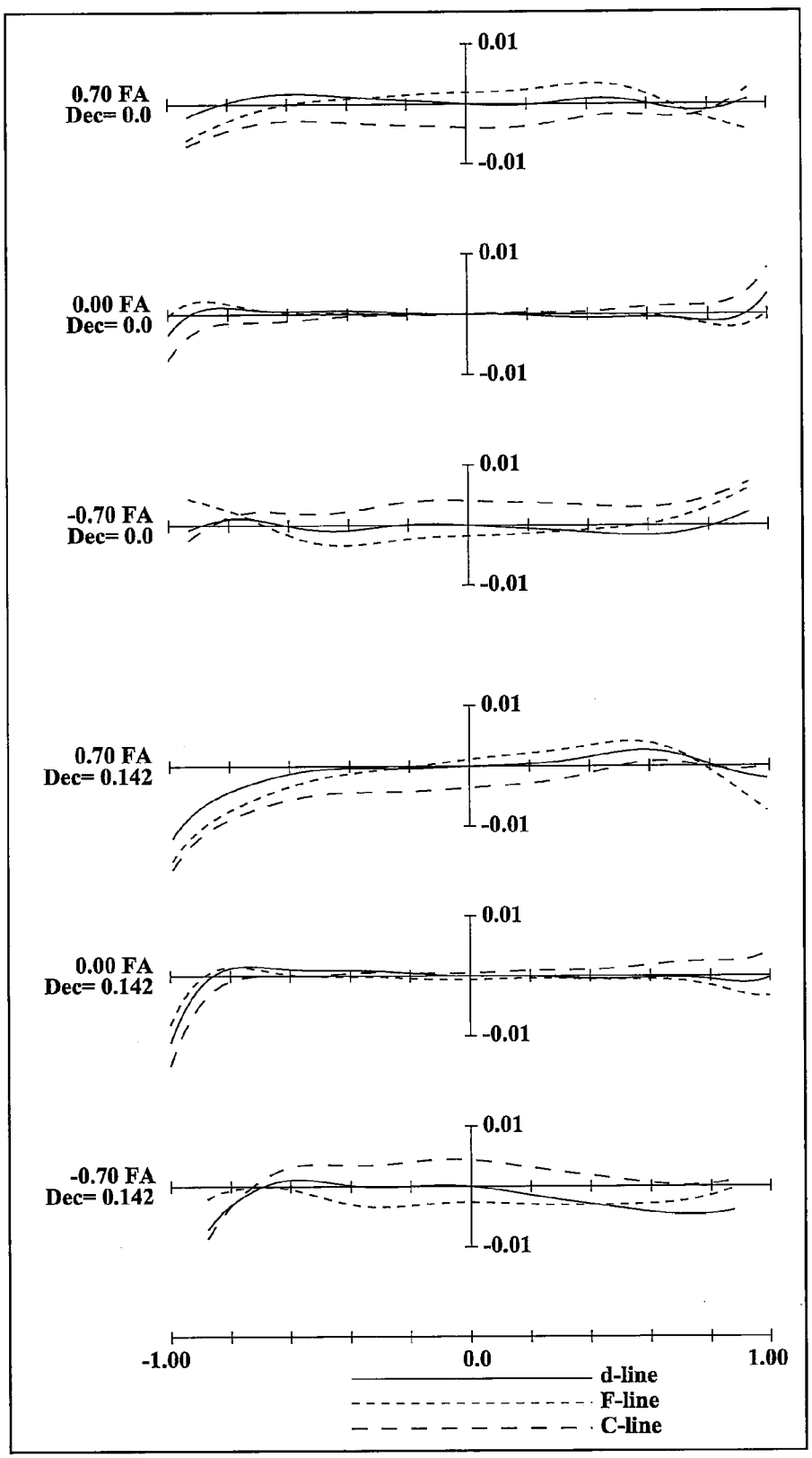
FIG. 9 is a lateral aberration diagram of a zoom lens system according to Example I-3 at a telephoto limit in a basic state where image blur compensation is not performed and in a blur compensation state.

As shown in FIG. 7, in the zoom lens system according to Embodiment I-3, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment I-3, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

In the zoom lens system according to Embodiment I-3, the third lens unit G3, in order from the object side to the image side, comprises: a positive meniscus seventh lens element L7 with the convex surface facing the object side; a positive meniscus eighth lens element L8 with the convex surface facing the object side; and a negative meniscus ninth lens element L9 with the convex surface facing the object side. Among these, the eighth lens element L8 and the ninth lens element L9 are cemented with each other. In the surface data in the corresponding numerical example described later, surface number 17 indicates the cement layer between the eighth lens element L8 and the ninth lens element L9. Further, the eighth lens element L8 has an aspheric object side surface.

Further, in the zoom lens system according to Embodiment I-3, the fourth lens unit G4 comprises solely a bi-convex tenth lens element L10. The tenth lens element L10 has two aspheric surfaces.

Here, in the zoom lens system according to Embodiment I-3, a plane parallel plate P is provided on the object side relative to the image surface S (between the image surface S and the tenth lens element L10).

In the zoom lens system according to Embodiment I-3, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 10:
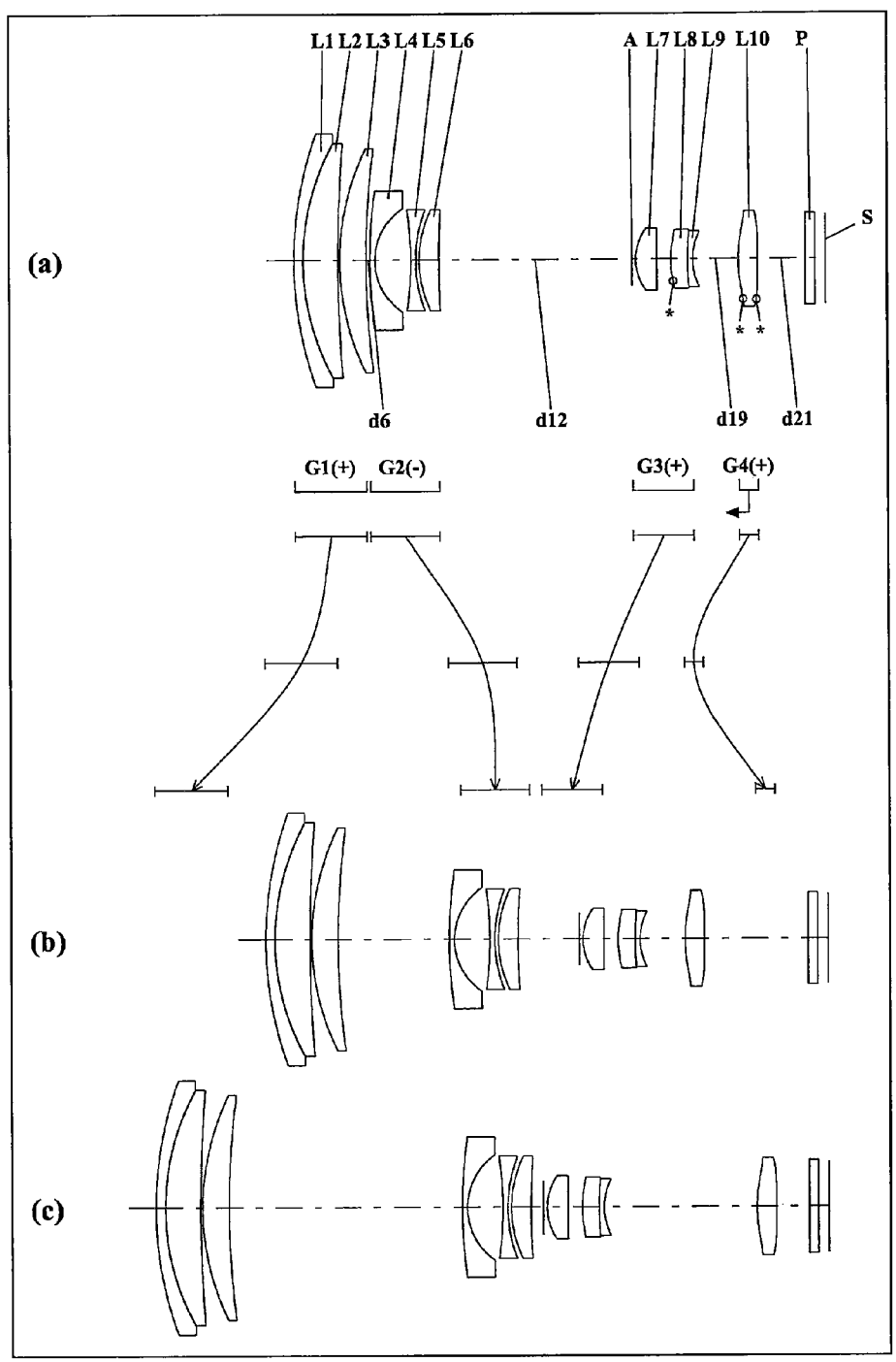
FIGS. 10(*a*)-(*c*) are a lens arrangement diagram showing an infinity in-focus condition of a zoom lens system according to Embodiment I-4 (Example I-4)
Figure 11:
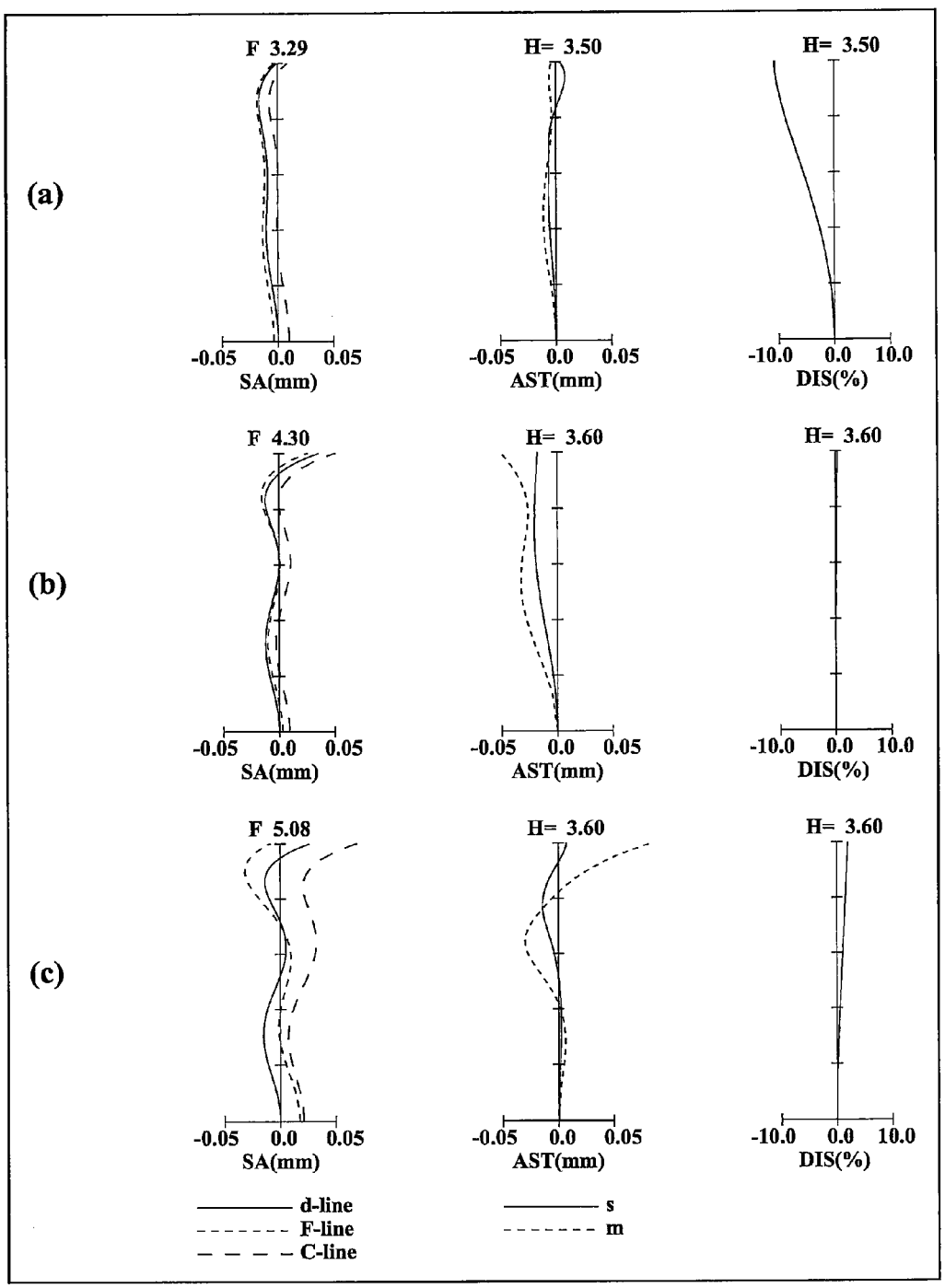
FIGS. 11(*a*)-(*c*) are a longitudinal aberration diagram of an infinity in-focus condition of a zoom lens system according to Example I-4.
Figure 12:
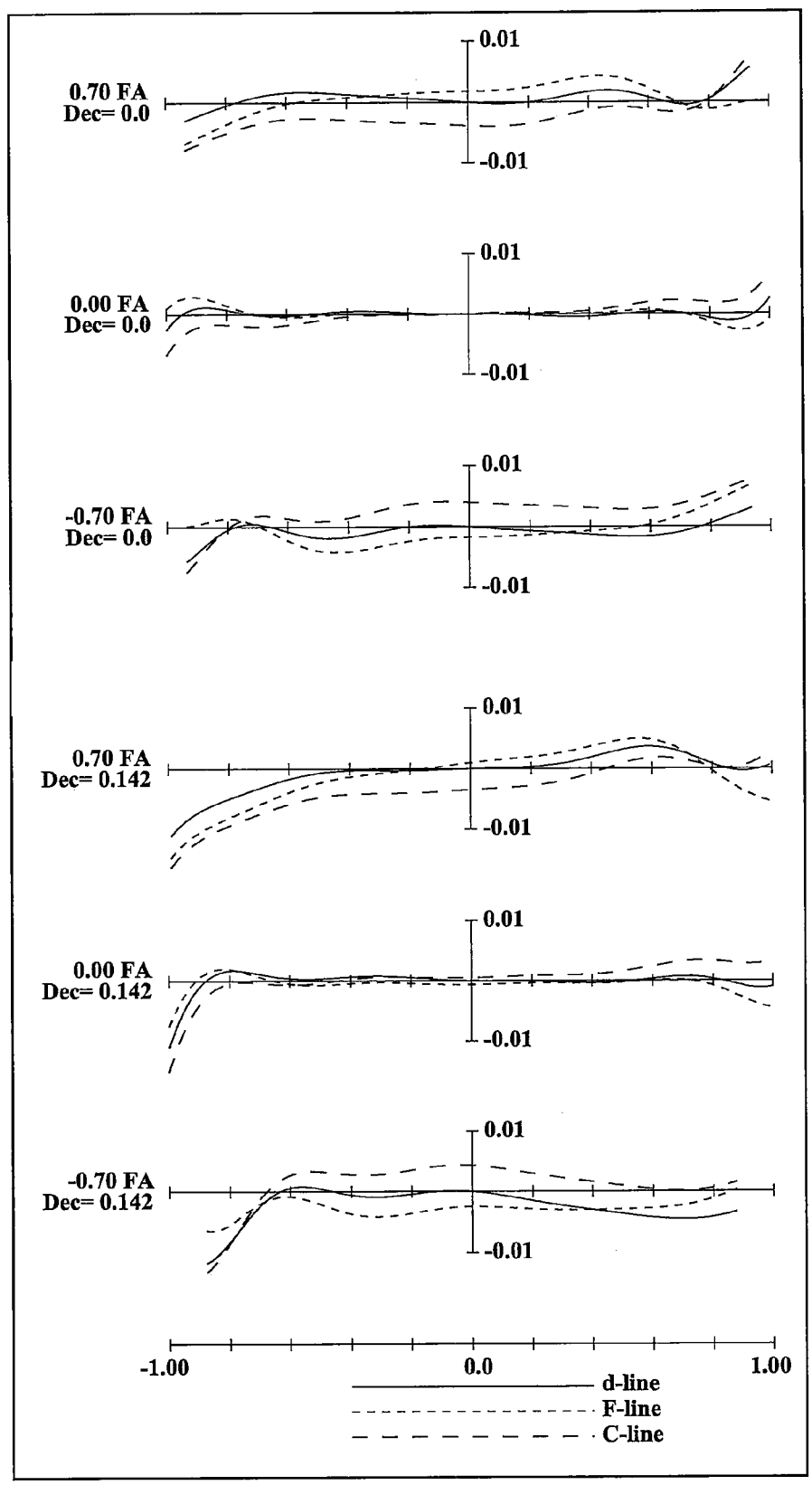
FIG. 12 is a lateral aberration diagram of a zoom lens system according to Example I-4 at a telephoto limit in a basic state where image blur compensation is not performed and in a blur compensation state.

As shown in FIG. 10, in the zoom lens system according to Embodiment I-4, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment I-4, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

In the zoom lens system according to Embodiment I-4, the third lens unit G3, in order from the object side to the image side, comprises: a positive meniscus seventh lens element L7 with the convex surface facing the object side; a positive meniscus eighth lens element L8 with the convex surface facing the object side; and a negative meniscus ninth lens element L9 with the convex surface facing the object side. Among these, the eighth lens element L8 and the ninth lens element L9 are cemented with each other. In the surface data in the corresponding numerical example described later, surface number 17 indicates the cement layer between the eighth lens element L8 and the ninth lens element L9. Further, the eighth lens element L8 has an aspheric object side surface.

Further, in the zoom lens system according to Embodiment I-4, the fourth lens unit G4 comprises solely a bi-convex tenth lens element L10. The tenth lens element L10 has two aspheric surfaces.

Here, in the zoom lens system according to Embodiment I-4, a plane parallel plate P is provided on the object side relative to the image surface S (between the image surface S and the tenth lens element L10).

In the zoom lens system according to Embodiment I-4, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 13:
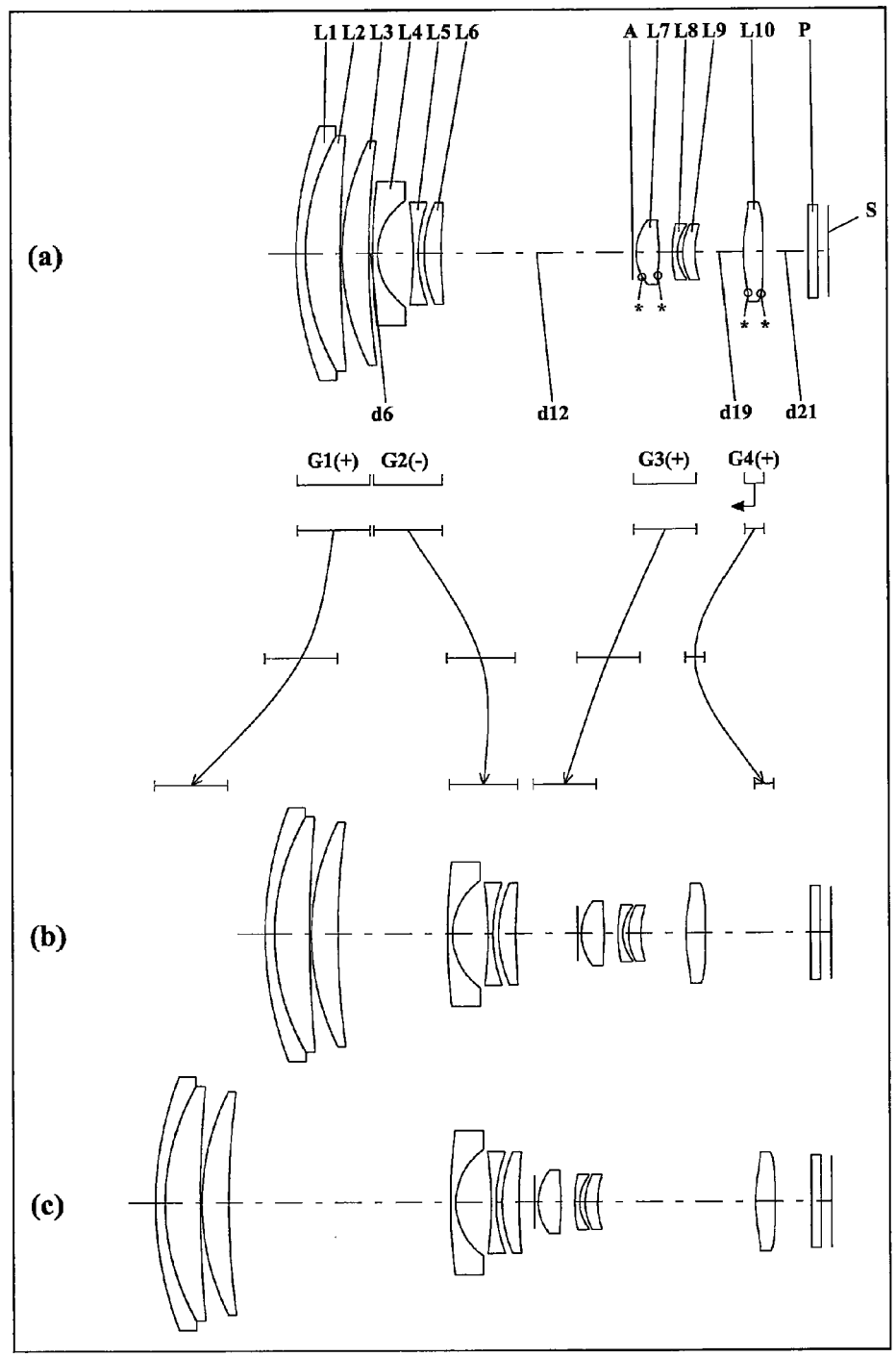
FIGS. 13(*a*)-(*c*) are a lens arrangement diagram showing an infinity in-focus condition of a zoom lens system according to Embodiment I-5 (Example I-5)
Figure 14:
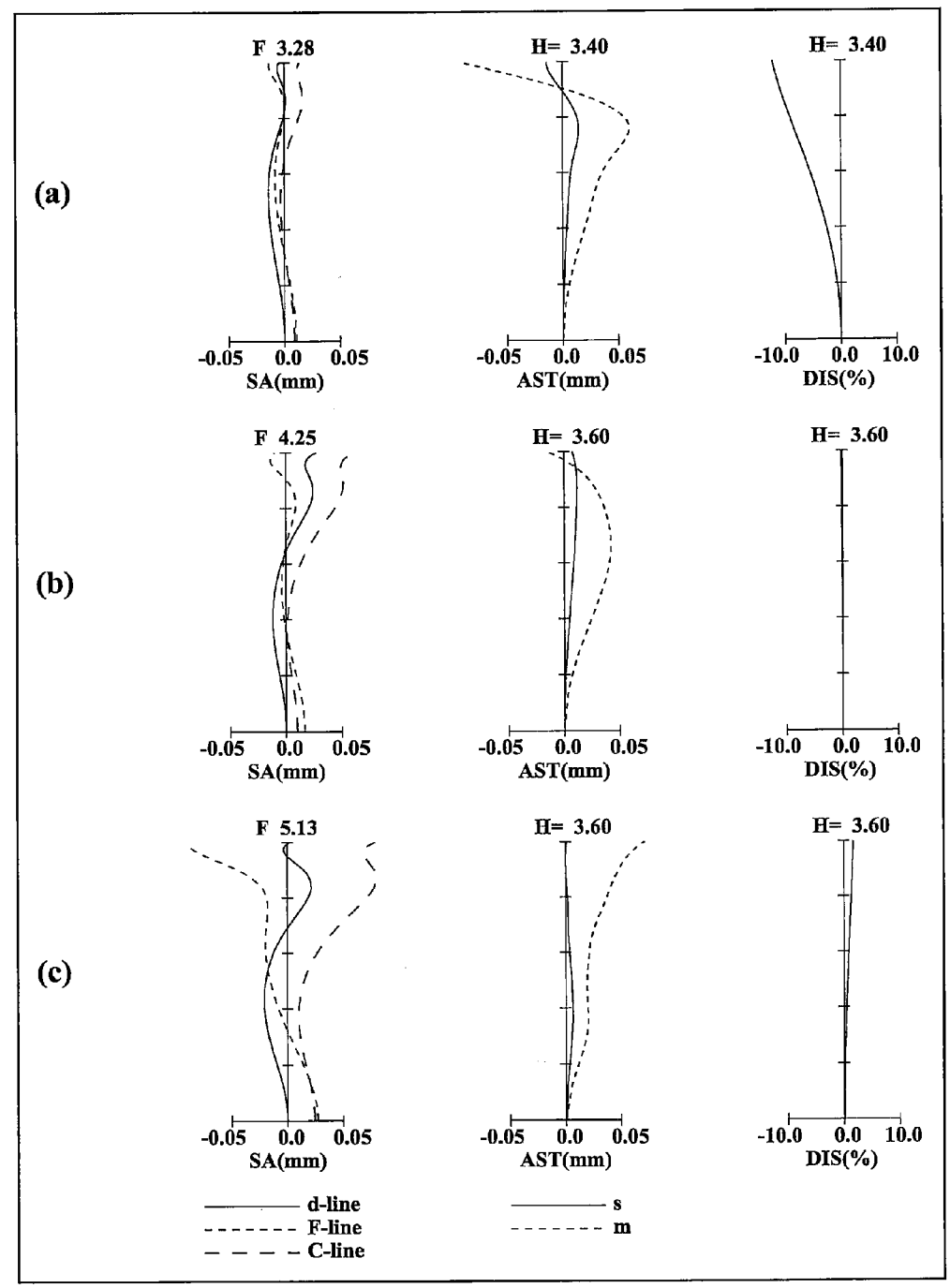
FIGS. 14(*a*)-(*c*) are a longitudinal aberration diagram of an infinity in-focus condition of a zoom lens system according to Example I-5.

As shown in FIG. 13, in the zoom lens system according to Embodiment I-5, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment I-5, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system according to Embodiment I-5, the third lens unit G3, in order from the object side to the image side, comprises: a bi-convex seventh lens element L7; a negative meniscus eighth lens element L8 with the convex surface facing the object side; and a positive meniscus ninth lens element L9 with the convex surface facing the object side. Among these, the seventh lens element L7 has two aspheric surfaces.

Further, in the zoom lens system according to Embodiment I-5, the fourth lens unit G4 comprises solely a bi-convex tenth lens element L10. The tenth lens element L10 has two aspheric surfaces.

Here, in the zoom lens system according to Embodiment I-5, a plane parallel plate P is provided on the object side relative to the image surface S (between the image surface S and the tenth lens element L10).

In the zoom lens system according to Embodiment I-5, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 15:
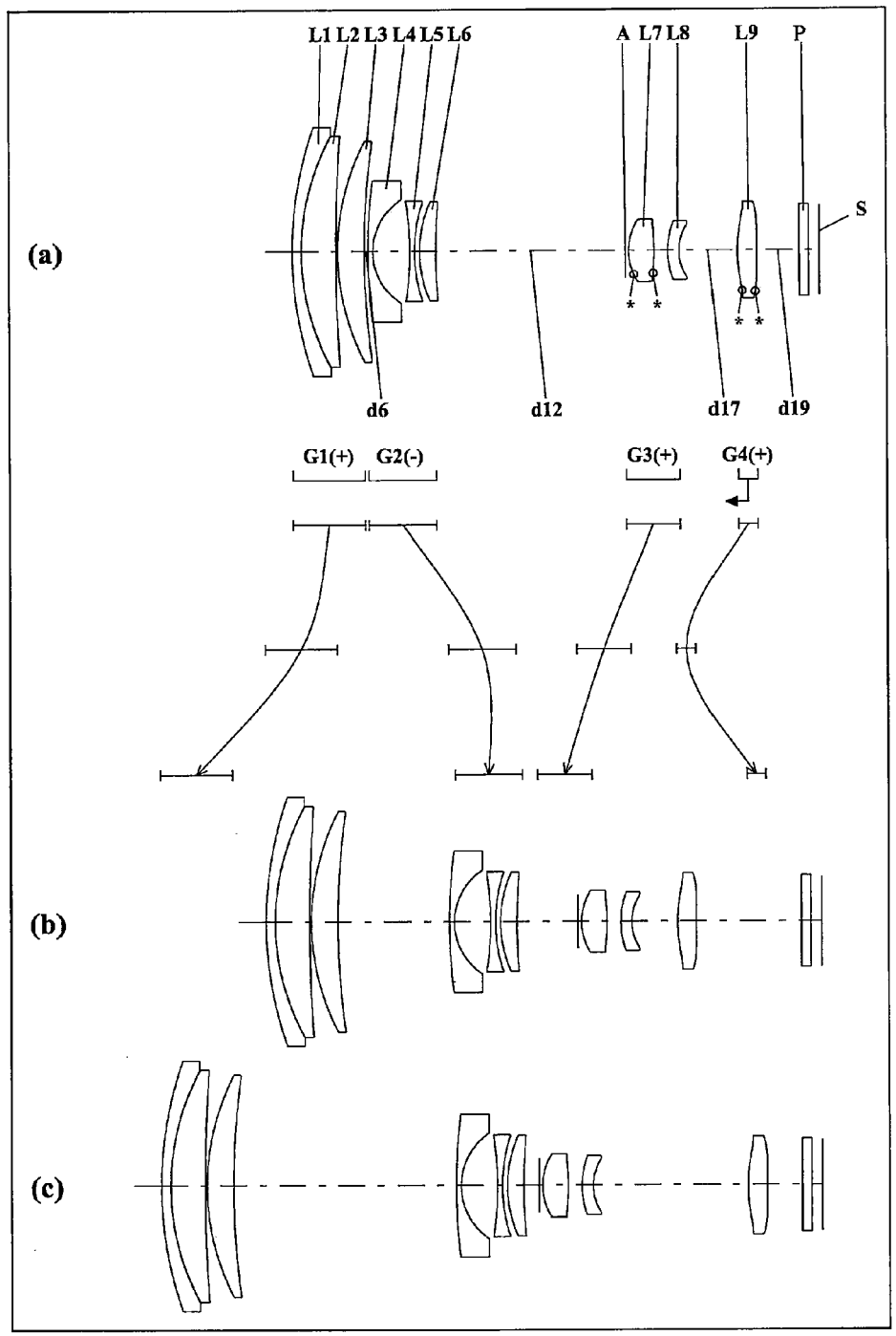
FIGS. 15(*a*)-(*c*) are a lens arrangement diagram showing an infinity in-focus condition of a zoom lens system according to Embodiment I-6 (Example I-6)
Figure 16:
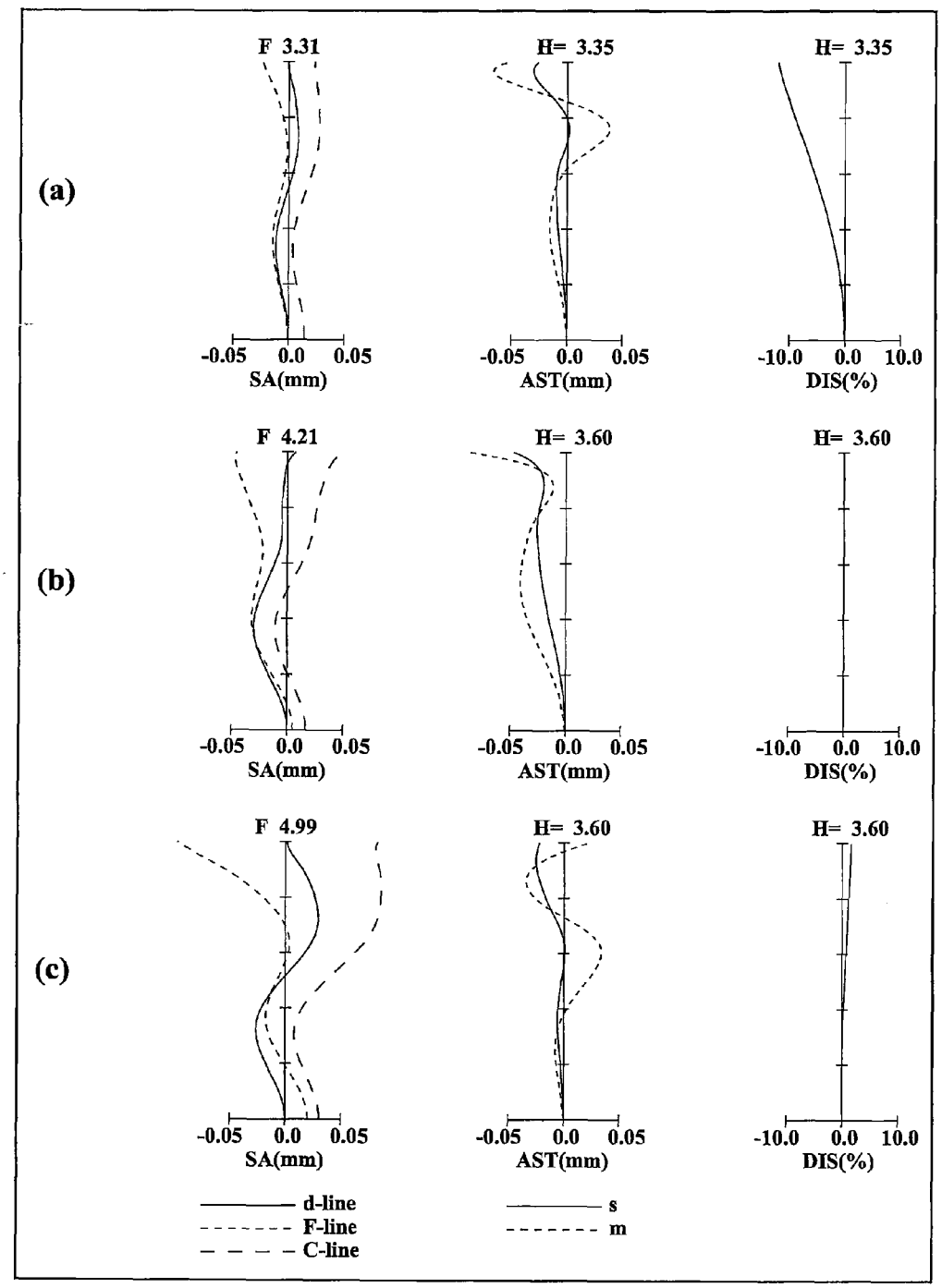
FIGS. 16(*a*)-(*c*) are a longitudinal aberration diagram of an infinity in-focus condition of a zoom lens system according to Example I-6.

As shown in FIG. 15, in the zoom lens system according to Embodiment I-6, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment I-6, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system according to Embodiment I-6, the third lens unit G3, in order from the object side to the image side, comprises: a bi-convex seventh lens element L7; and a negative meniscus eighth lens element L8 with the convex surface facing the object side. Among these, the seventh lens element L7 has two aspheric surfaces.

Further, in the zoom lens system according to Embodiment I-6, the fourth lens unit G4 comprises solely a bi-convex ninth lens element L9. The ninth lens element L9 has two aspheric surfaces.

Here, in the zoom lens system according to Embodiment I-6, a plane parallel plate P is provided on the object side relative to the image surface S (between the image surface S and the ninth lens element L9).

In the zoom lens system according to Embodiment I-6, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 17:
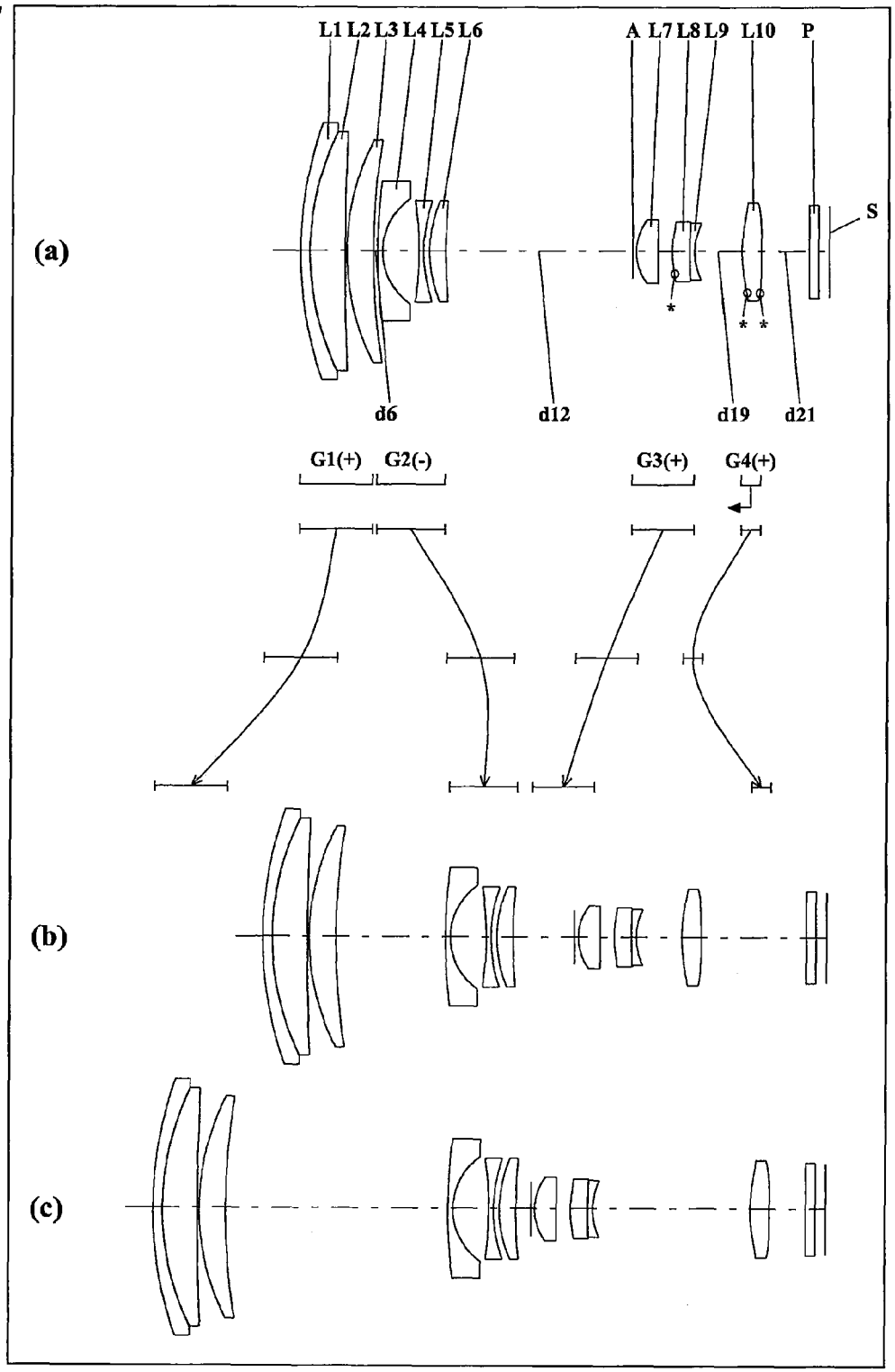
FIGS. 17(*a*)-(*c*) are a lens arrangement diagram showing an infinity in-focus condition of a zoom lens system according to Embodiment I-7 (Example I-7)
Figure 18:
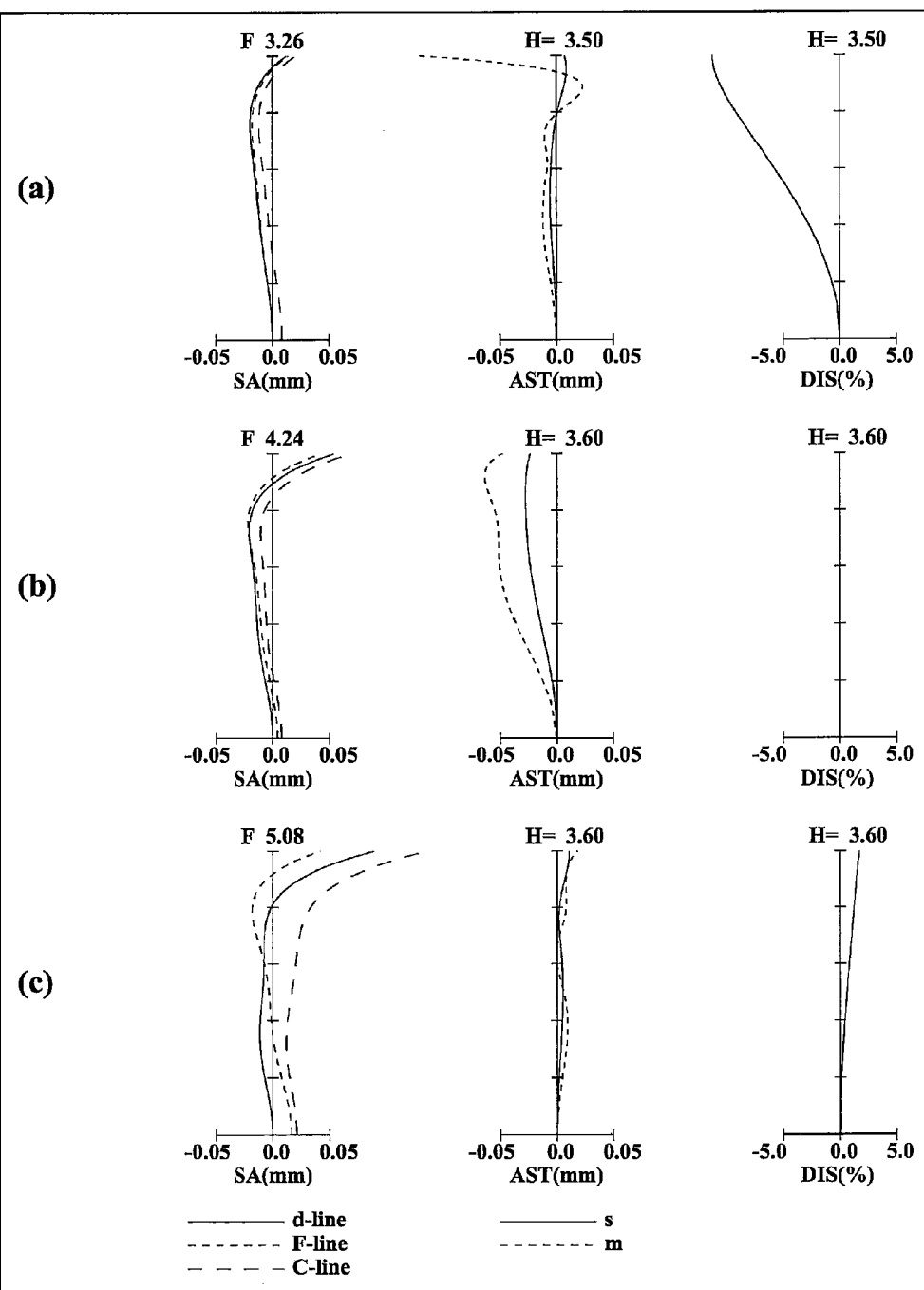
FIGS. 18(*a*)-(*c*) are a longitudinal aberration diagram of an infinity in-focus condition of a zoom lens system according to Example I-7.
Figure 19:
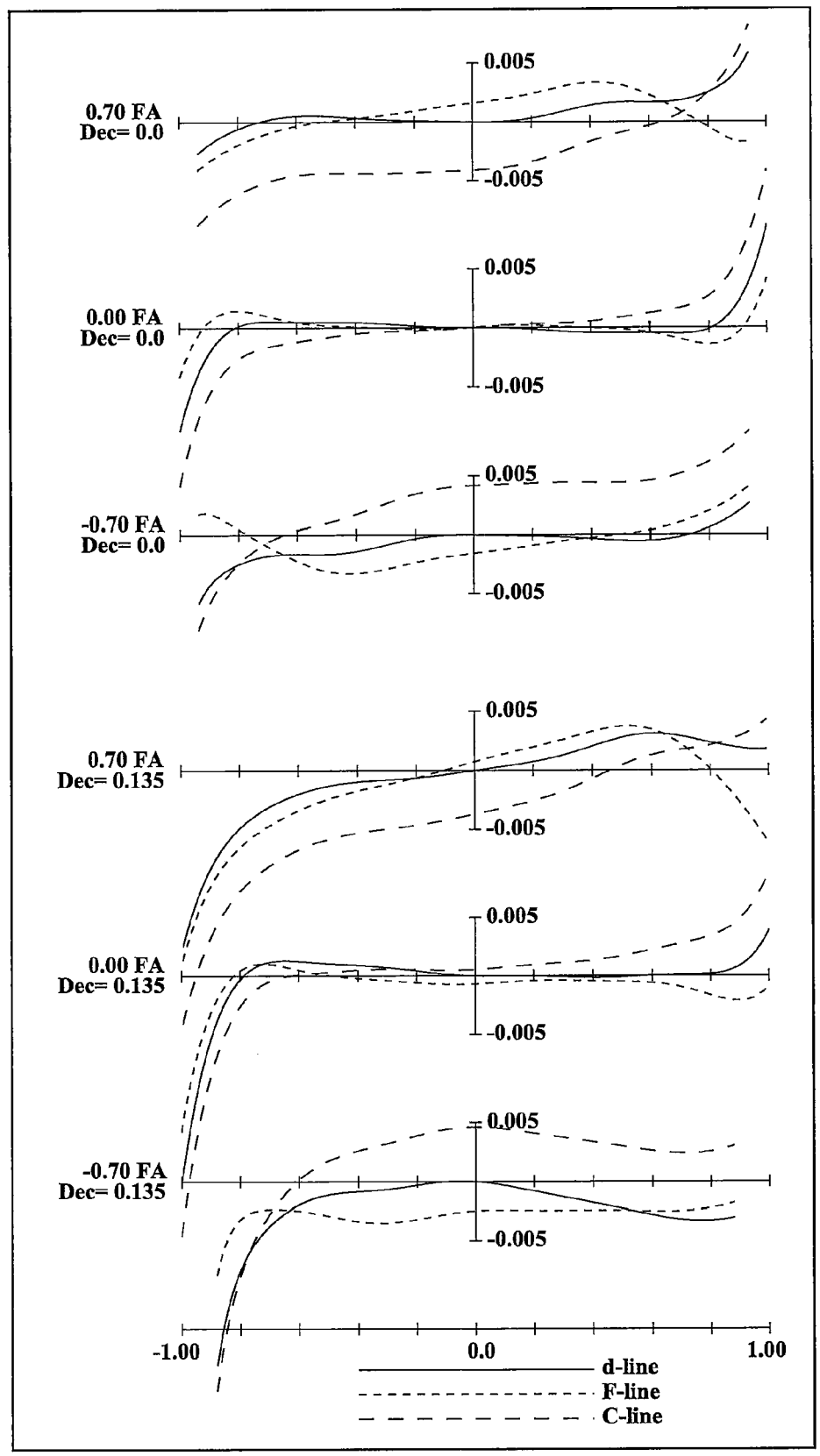
FIG. 19 is a lateral aberration diagram of a zoom lens system according to Example I-7 at a telephoto limit in a basic state where image blur compensation is not performed and in a blur compensation state.

As shown in FIG. 17, in the zoom lens system according to Embodiment I-7, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment I-7, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

In the zoom lens system according to Embodiment I-7, the third lens unit G3, in order from the object side to the image side, comprises: a positive meniscus seventh lens element. L7 with the convex surface facing the object side; a positive meniscus eighth lens element L8 with the convex surface facing the object side; and a negative meniscus ninth lens element L9 with the convex surface facing the object side. Among these, the eighth lens element L8 and the ninth lens element L9 are cemented with each other. In the surface data in the corresponding numerical example described later, surface number 17 indicates the cement layer between the eighth lens element L8 and the ninth lens element L9. Further, the eighth lens element L8 has an aspheric object side surface.

Further, in the zoom lens system according to Embodiment I-7, the fourth lens unit G4 comprises solely a bi-convex tenth lens element L10. The tenth lens element L10 has two aspheric surfaces.

Here, in the zoom lens system according to Embodiment I-7, a plane parallel plate P is provided on the object side relative to the image surface S (between the image surface S and the tenth lens element L10).

In the zoom lens system according to Embodiment I-7, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 20:
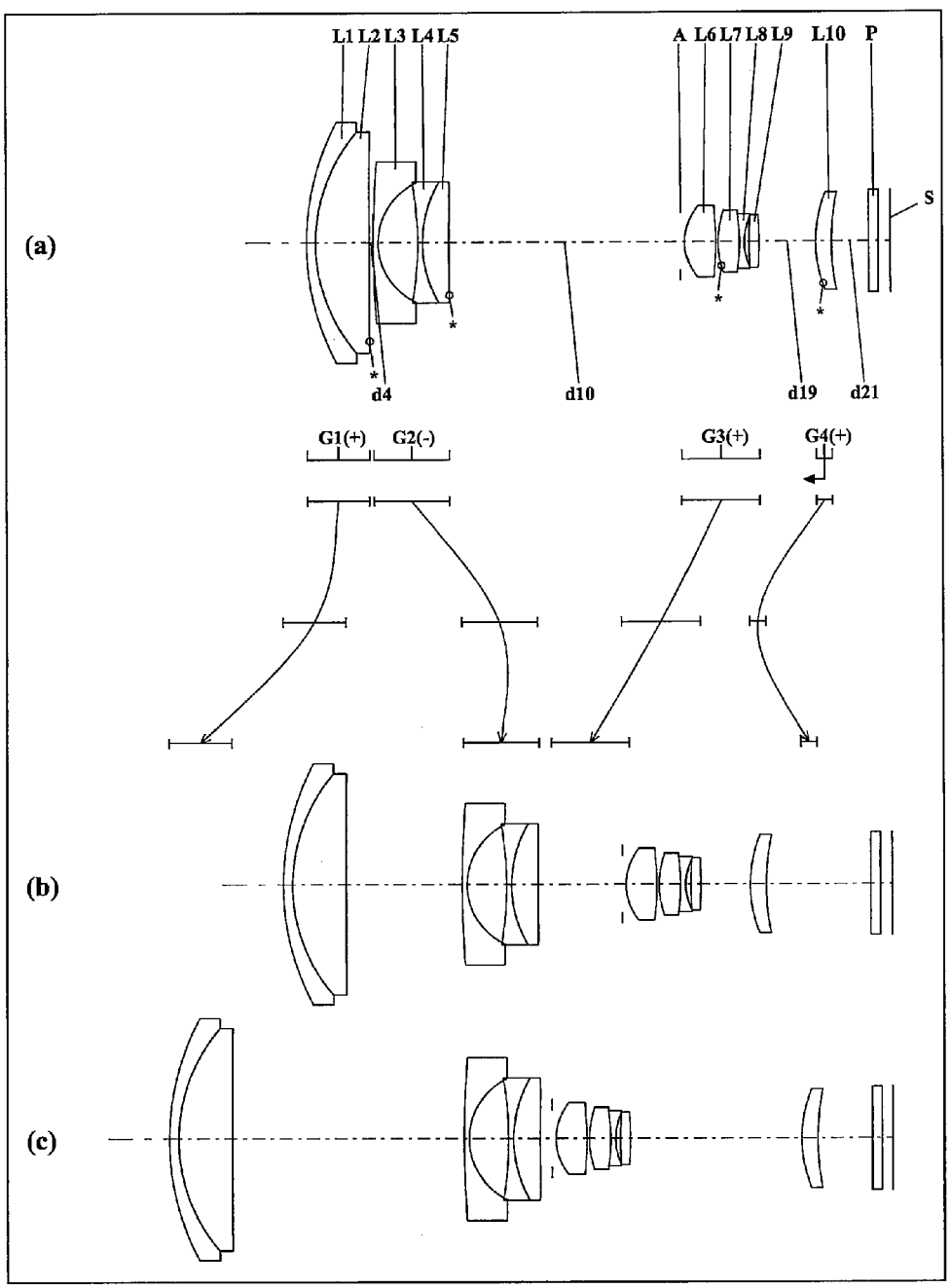
FIGS. 20(*a*)-(*c*) are a lens arrangement diagram showing an infinity in-focus condition of a zoom lens system according to Embodiment I-8 (Example I-8)
Figure 21:
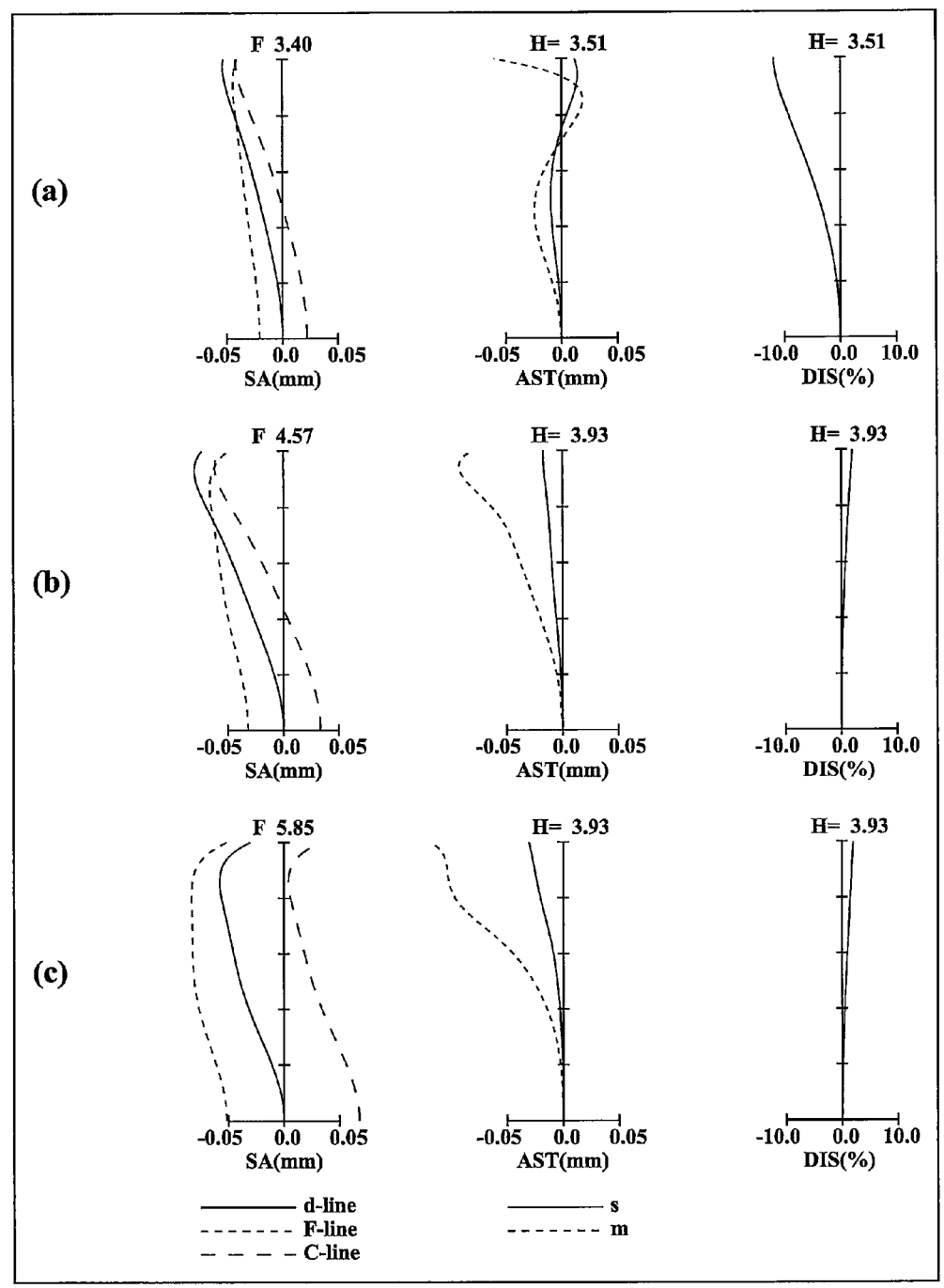
FIGS. 21(*a*)-(*c*) are a longitudinal aberration diagram of an infinity in-focus condition of a zoom lens system according to Example I-8.
Figure 22:
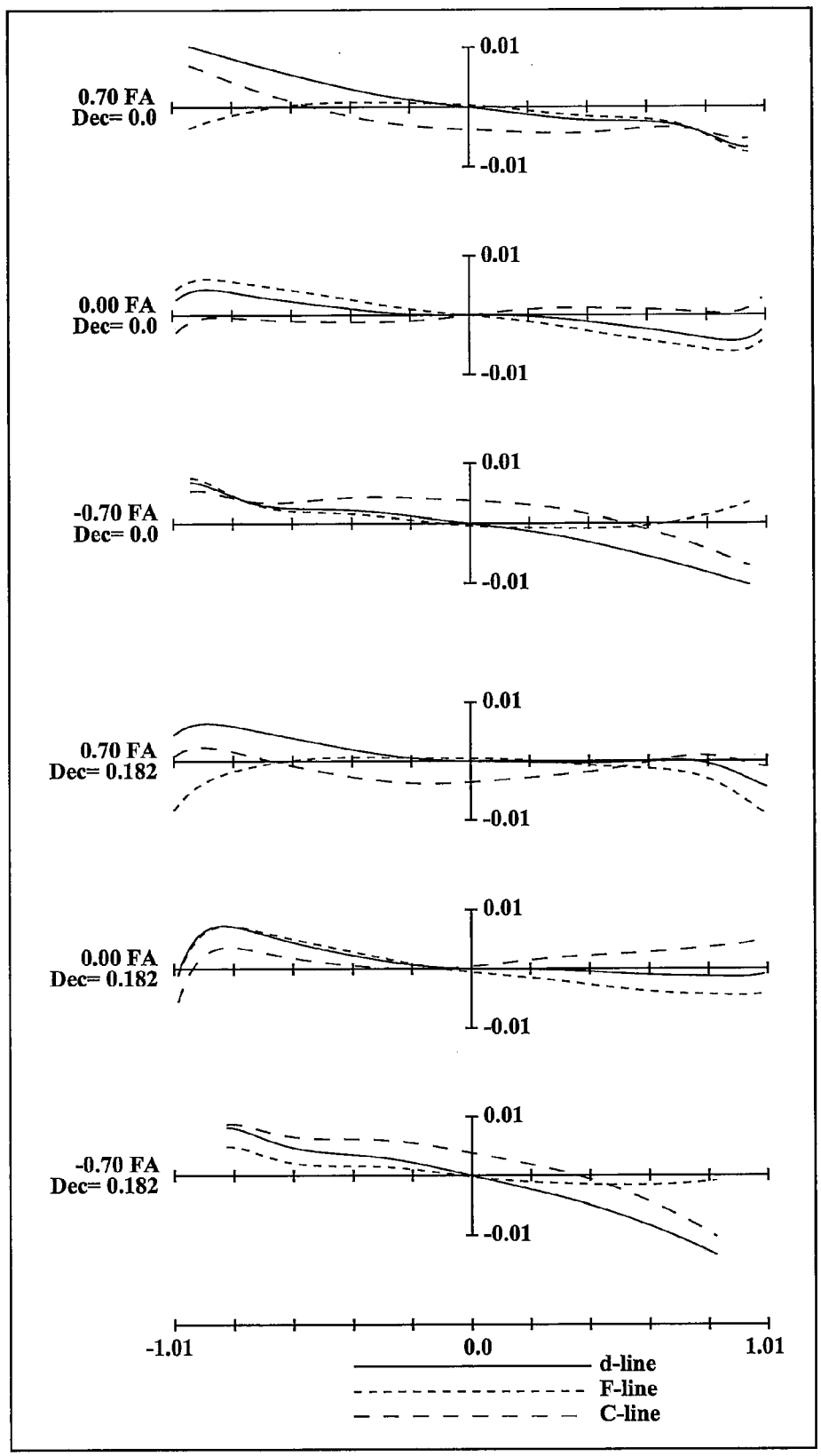
FIG. 22 is a lateral aberration diagram of a zoom lens system according to Example I-8 at a telephoto limit in a basic state where image blur compensation is not performed and in a blur compensation state.

As shown in FIG. 20, in the zoom lens system according to Embodiment I-8, the first lens unit G1, in order from the object side to the image side, comprises a negative meniscus first lens element L1 with the convex surface facing the object side and a planer-convex second lens element L2 with the convex surface facing the object side. The first lens element L1 and the second lens element L2 are cemented with each other. In the surface data in the corresponding numerical example described later, surface number 2 indicates the cement layer between the first lens element L1 and the second lens element L2. Further, the second lens element L2 has an aspheric image side surface.

In the zoom lens system according to Embodiment I-8, the second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the fifth lens element L5 has an aspheric image side surface.

Further, in the zoom lens system according to Embodiment I-8, the third lens unit G3, in order from the object side to the image side, comprises: a bi-convex sixth lens element L6; a bi-convex seventh lens element L7; a bi-concave eighth lens element L8; and a bi-convex ninth lens element L9. Among these, the seventh lens element L7 and the eighth lens element L8 are cemented with each other. In the surface data in the corresponding numerical example described later, surface number 15 indicates the cement layer between the seventh lens element L7 and the eighth lens element L8. Further, the seventh lens element L7 has an aspheric object side surface.

Moreover, in the zoom lens system according to Embodiment I-8, the fourth lens unit G4 comprises solely a positive meniscus tenth lens element L10 with the convex surface facing the object side. The tenth lens element L10 has an aspheric object side surface.

Here, in the zoom lens system according to Embodiment I-8, a plane parallel plate P is provided on the object side relative to the image surface S (between the image surface S and the tenth lens element L10).

In the zoom lens system according to Embodiment I-8, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 23:
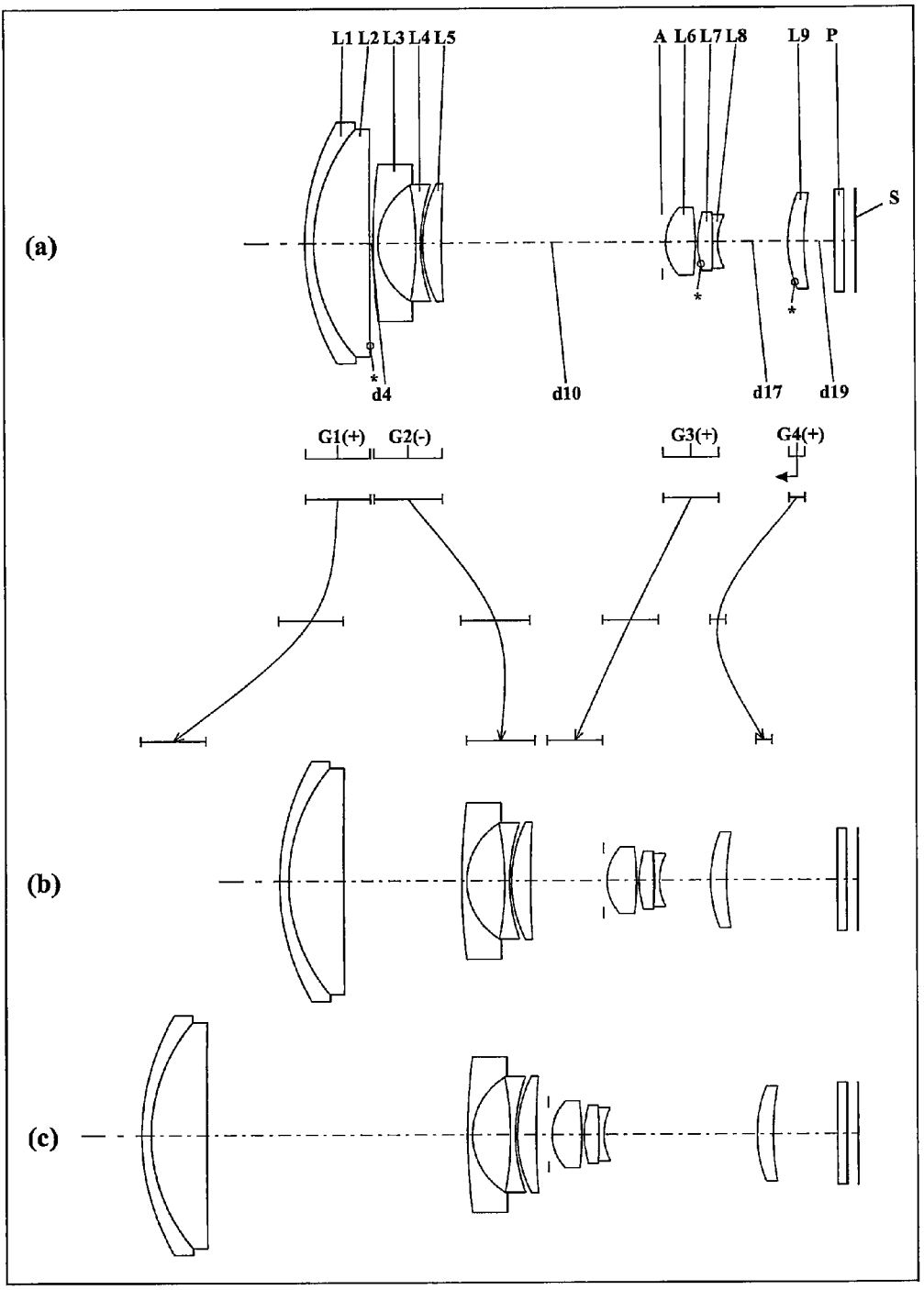
FIGS. 23(*a*)-(*c*) are a lens arrangement diagram showing an infinity in-focus condition of a zoom lens system according to Embodiment I-9 (Example I-9)
Figure 24:
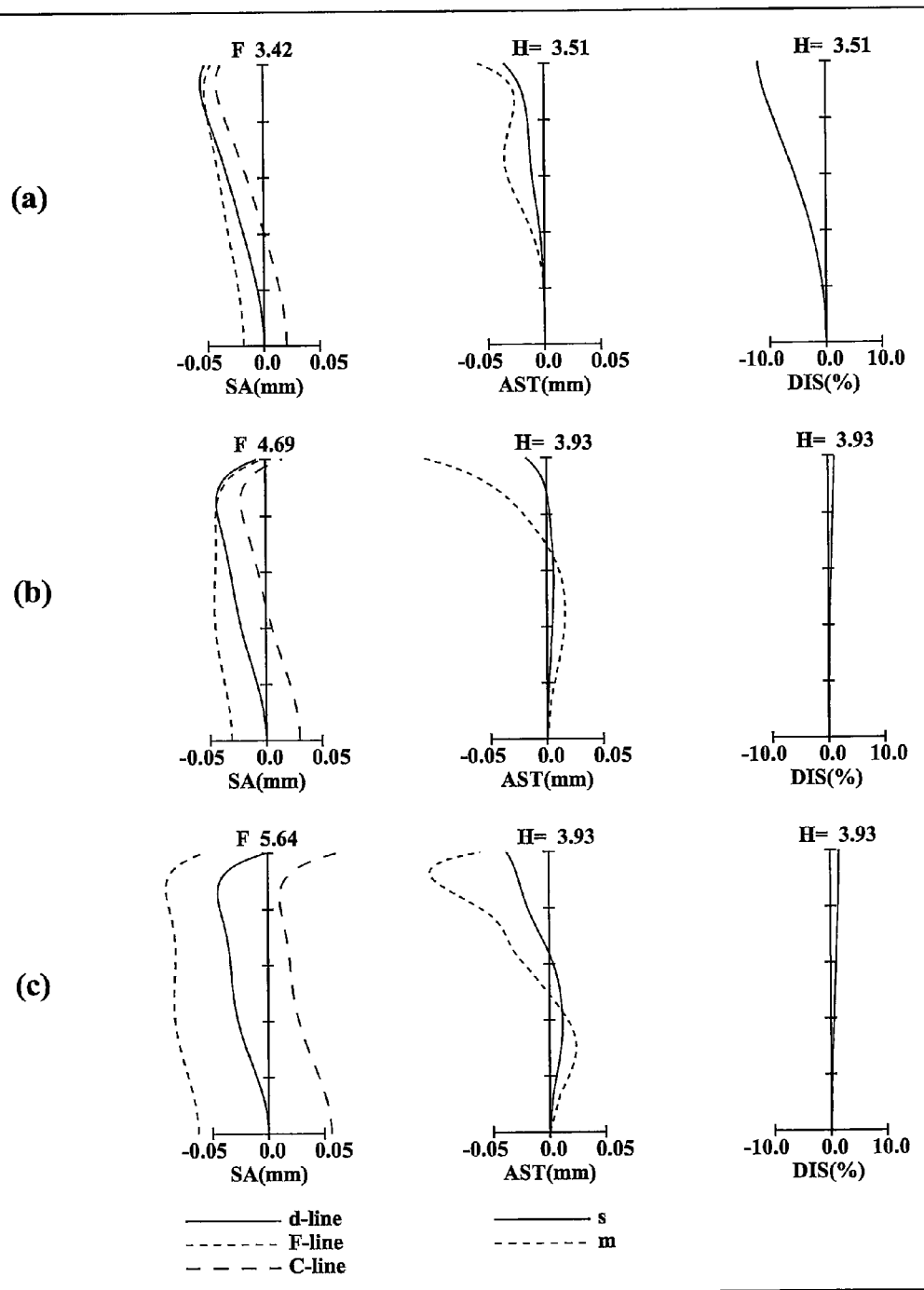
FIGS. 24(*a*)-(*c*) are a longitudinal aberration diagram of an infinity in-focus condition of a zoom lens system according to Example I-9.
Figure 25:
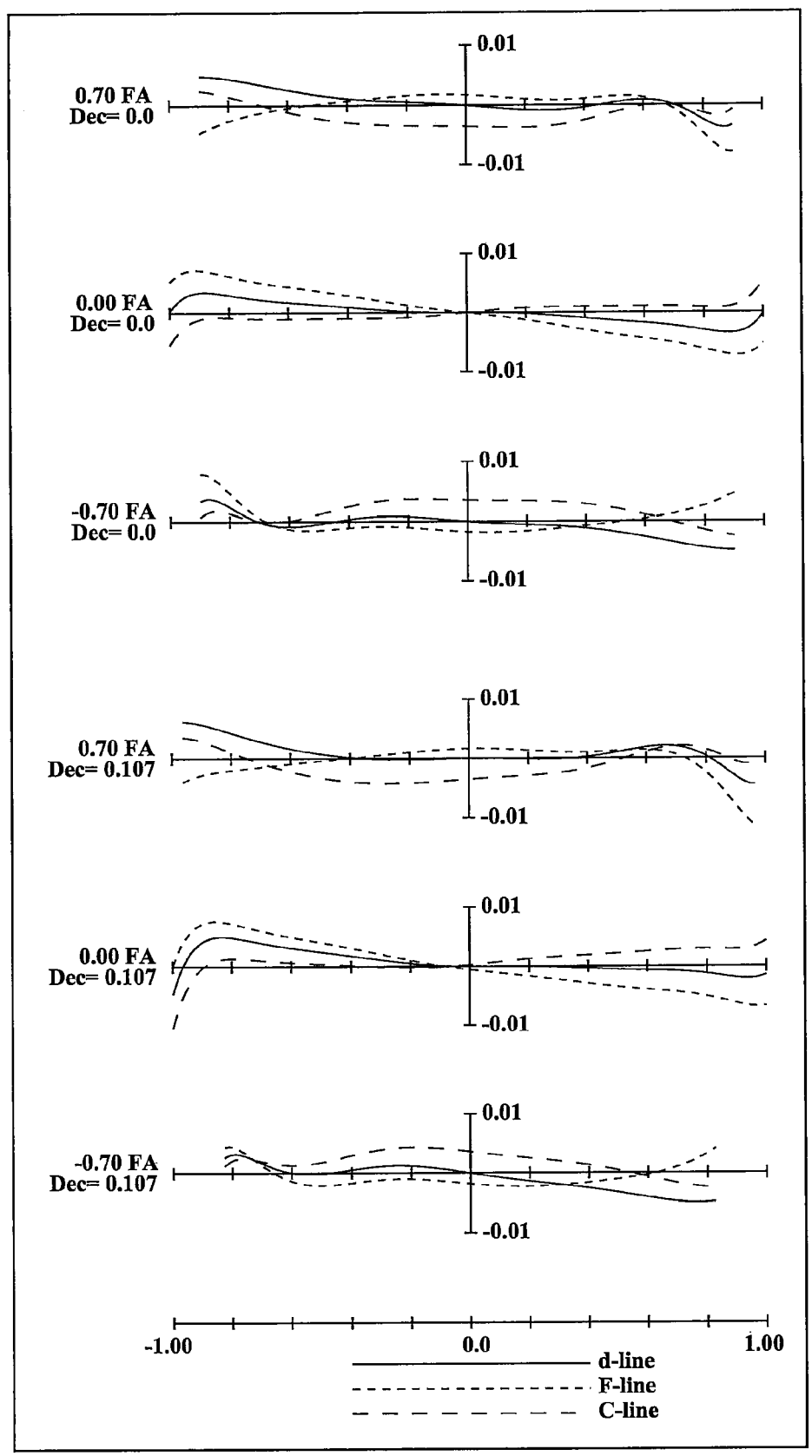
FIG. 25 is a lateral aberration diagram of a zoom lens system according to Example I-9 at a telephoto limit in a basic state where image blur compensation is not performed and in a blur compensation state.

As shown in FIG. 23, in the zoom lens system according to Embodiment I-9, the first lens unit G1, in order from the object side to the image side, comprises: a negative meniscus first lens element L1 with the convex surface facing the object side; and a planer-convex second lens element L2 with the convex surface facing the object side. The first lens element L1 and the second lens element L2 are cemented with each other. In the surface data in the corresponding numerical example described later, surface number 2 indicates the cement layer between the first lens element L1 and the second lens element L2. Further, the second lens element L2 has an aspheric image side surface.

In the zoom lens system according to Embodiment I-9, the second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side.

Further, in the zoom lens system according to Embodiment I-9, the third lens unit G3, in order from the object side to the image side, comprises: a bi-convex sixth lens element. L6; a bi-convex seventh lens element L7; and a bi-concave eighth lens element L8. Among these, the seventh lens element L7 and the eighth lens element L8 are cemented with each other. In the surface data in the corresponding numerical example described later, surface number 15 indicates the cement layer between the seventh lens element L7 and the eighth lens element L8. Further, the seventh lens element L7 has an aspheric object side surface.

Moreover, in the zoom lens system according to Embodiment I-9, the fourth lens unit G4 comprises solely a positive meniscus ninth lens element L9 with the convex surface facing the object side. The ninth lens element L9 has an aspheric object side surface.

Here, in the zoom lens system according to Embodiment I-9, a plane parallel plate P is provided on the object side relative to the image surface S (between the image surface S and the ninth lens element L9).

In the zoom lens system according to Embodiment I-9, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 26:
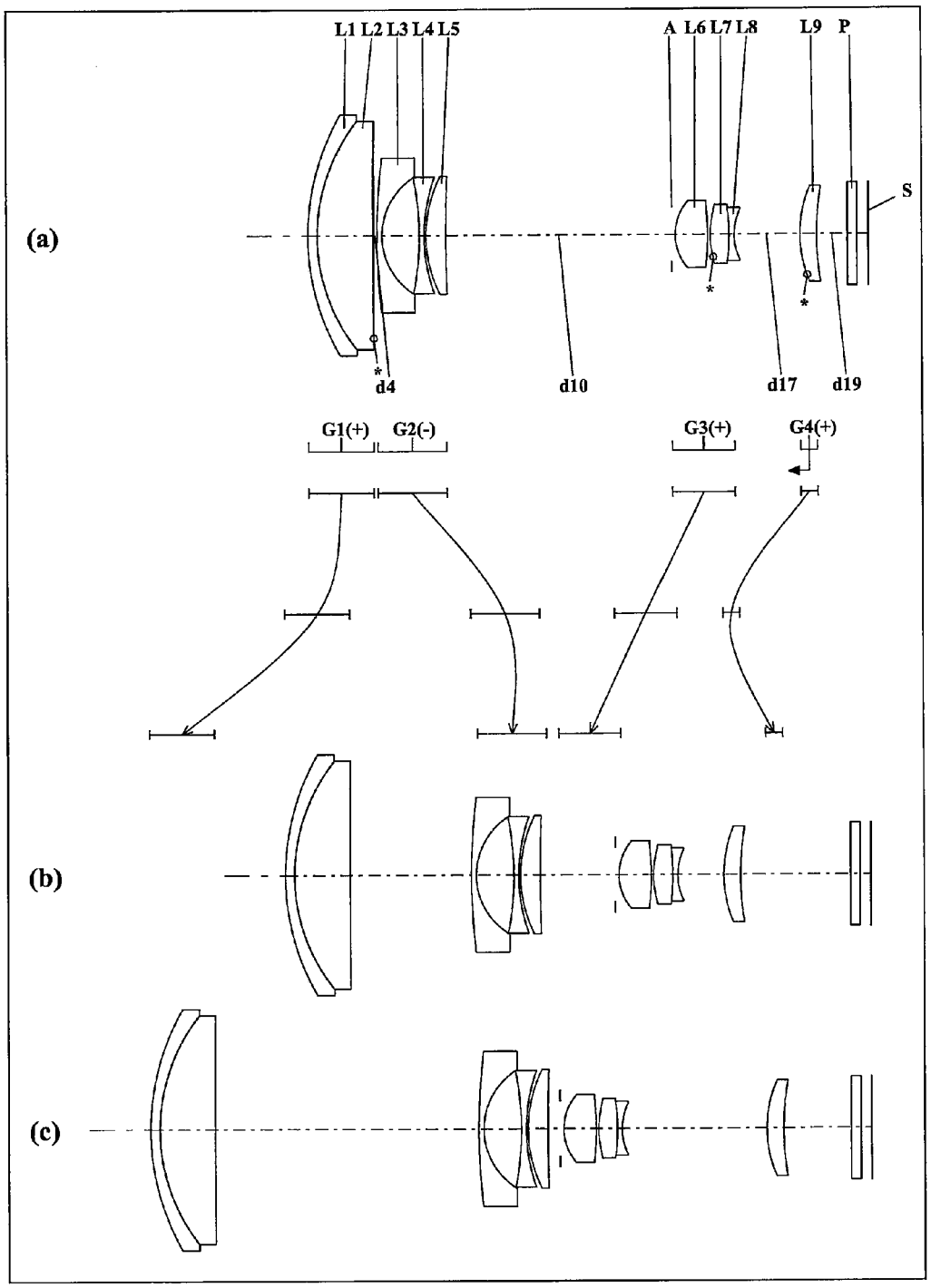
FIGS. 26(*a*)-(*c*) are a lens arrangement diagram showing an infinity in-focus condition of a zoom lens system according to Embodiment I-10 (Example I-10)
Figure 27:
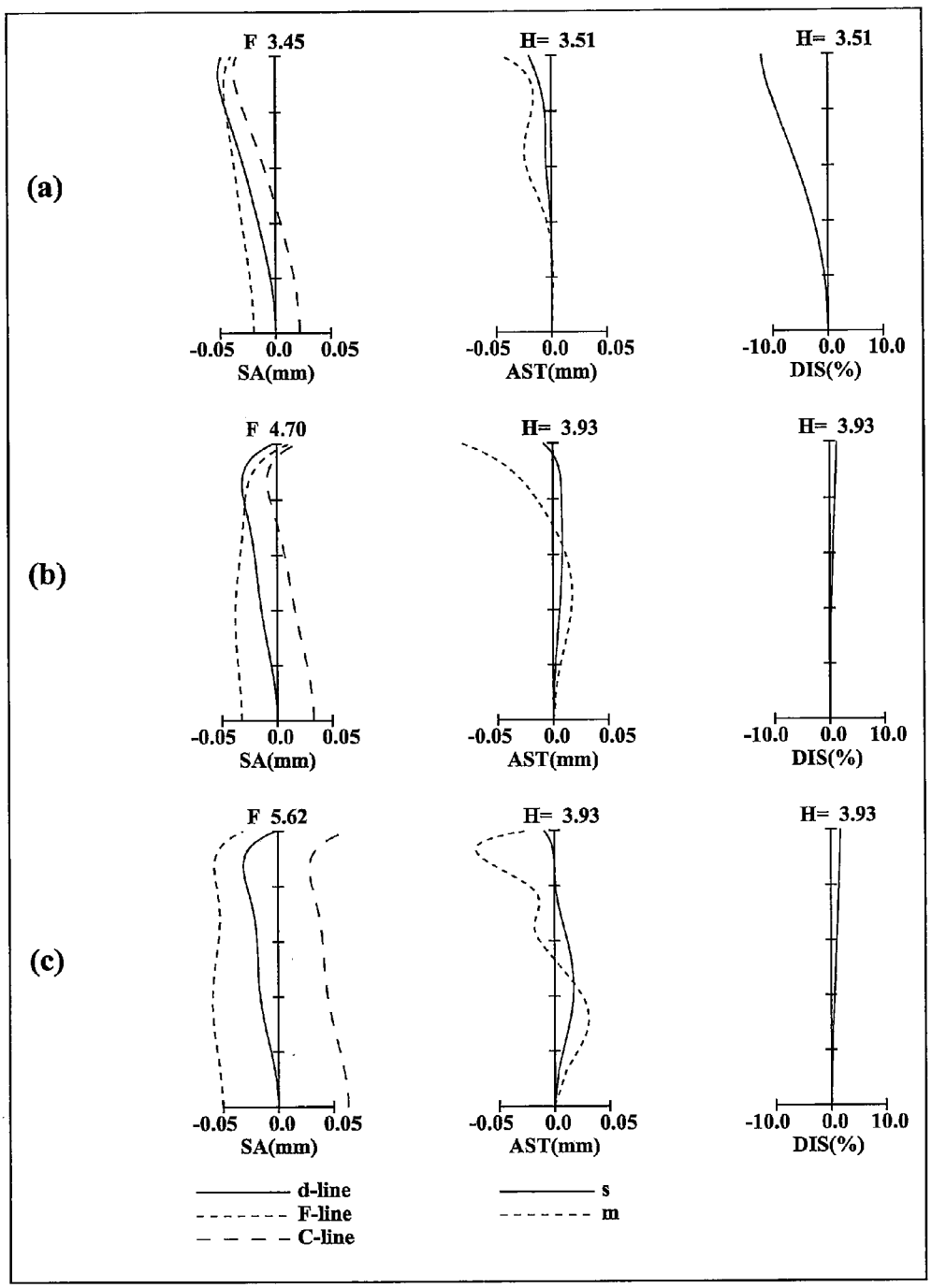
FIGS. 27(*a*)-(*c*) are a longitudinal aberration diagram of an infinity in-focus condition of a zoom lens system according to Example I-10.
Figure 28:
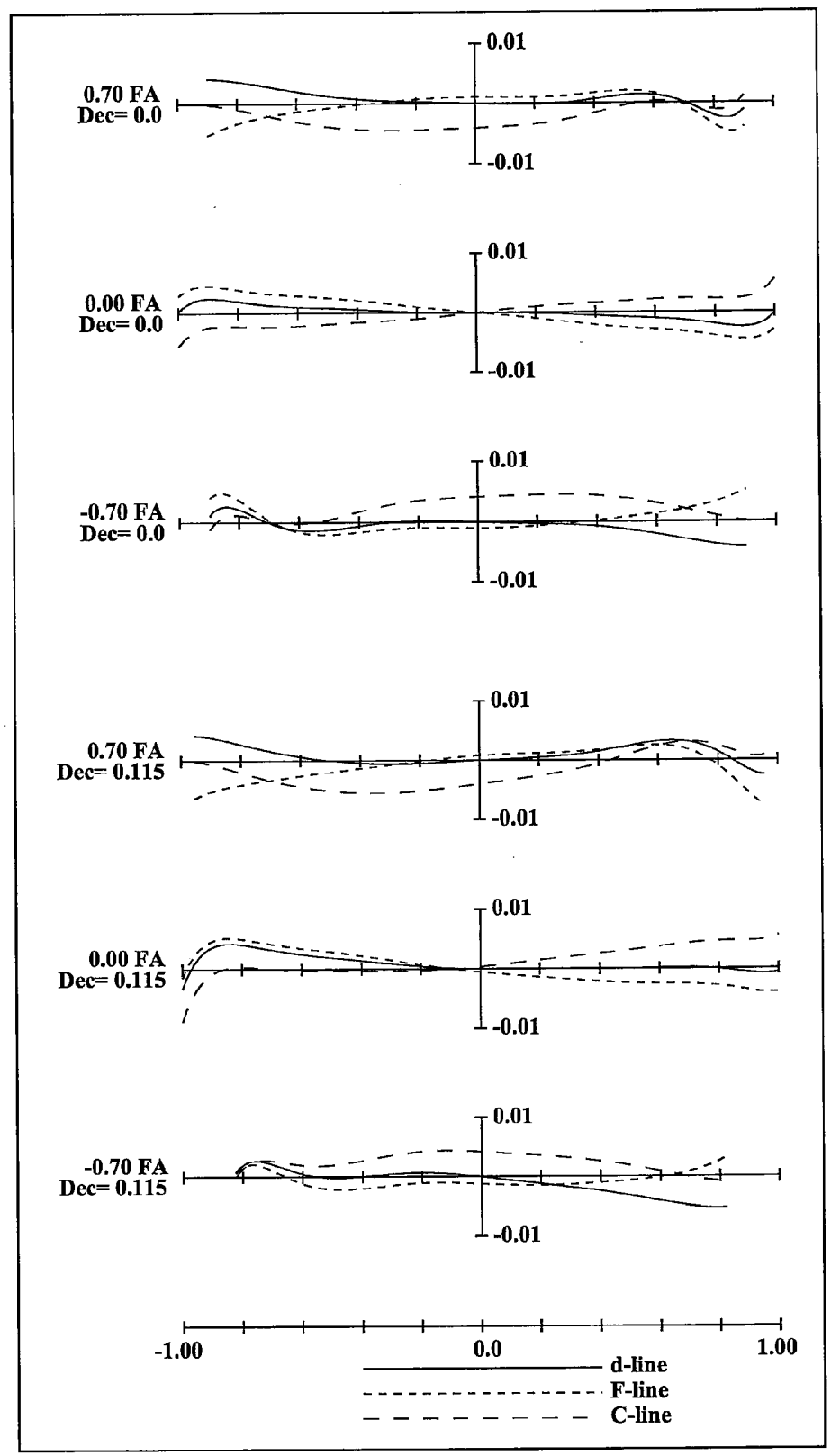
FIG. 28 is a lateral aberration diagram of a zoom lens system according to Example I-10 at a telephoto limit in a basic state where image blur compensation is not performed and in a blur compensation state.

As shown in FIG. 26, in the zoom lens system according to Embodiment I-10, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. In the surface data in the corresponding numerical example described later, surface number 2 indicates the cement layer between the first lens element L1 and the second lens element L2. Further, the second lens element L2 has an aspheric image side surface.

In the zoom lens system according to Embodiment I-10, the second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side.

Further, in the zoom lens system according to Embodiment I-10, the third lens unit G3, in order from the object side to the image side, comprises: a bi-convex sixth lens element L6; a bi-convex seventh lens element L7; and a bi-concave eighth lens element L8. Among these, the seventh lens element L7 and the eighth lens element L8 are cemented with each other. In the surface data in the corresponding numerical example described later, surface number 15 indicates the cement layer between the seventh lens element L7 and the eighth lens element L8. Further, the seventh lens element L7 has an aspheric object side surface.

Moreover, in the zoom lens system according to Embodiment I-10, the fourth lens unit G4 comprises solely a positive meniscus ninth lens element L9 with the convex surface facing the object side. The ninth lens element L9 has an aspheric object side surface.

Here, in the zoom lens system according to Embodiment I-10, a plane parallel plate P is provided on the object side relative to the image surface S (between the image surface S and the ninth lens element L9).

In the zoom lens system according to Embodiment I-10, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

In the zoom lens system according to Embodiments I-1 to I-10, the first lens unit G1 is composed of three or two lens elements while the second lens unit G2 is composed of three lens elements. Thus, the lens system has a short overall length.

In the zoom lens system according to Embodiments I-1 to I-7, the first lens unit G1, in order from the object side to the image side, comprises a negative meniscus lens element L1 with the convex surface facing the object side, a positive meniscus lens element L2 with the convex surface facing the object side, and a positive meniscus lens element L3 with the convex surface facing the object side. Further, among these, the negative meniscus lens element L1 and the positive meniscus lens element L2 are cemented with each other so that a cemented lens element is formed. This realizes a compact lens system. Further, in the zoom lens system according to Embodiments I-8 to I-10, the first lens unit G1, in order from the object side to the image side, comprises a negative meniscus first lens element L1 with the convex surface facing the object side, and a planer-convex second lens element L2 with the convex surface facing the object side or a bi-convex second lens element L2. Then, the first lens elements L1 and the second lens element L2 are cemented with each other so that a cemented lens element is formed. This realizes a compact lens system. In the zoom lens system according to Embodiments I-1 to I-10, such a configuration permits satisfactory compensation of chromatic aberration.

In the zoom lens system according to Embodiments I-1 to I-9, each surface of the three or two lens elements constituting the first lens unit G1 and the three lens elements constituting the second lens unit G2 has a positive radius of curvature except for the object side surface of the fifth lens element L5 or the object side surface of the fourth lens element L4 arranged in the center of the second lens unit G2. Thus, in a state that a compact lens system is realized, compensation of curvature of field is achieved.

In the zoom lens system according to Embodiments I-1 to I-10, the third lens unit G3 includes at least one lens element having negative optical power and having a concave image side surface. This permits satisfactory compensation of spherical aberration, coma aberration and chromatic aberration.

In the zoom lens system according to Embodiments I-1 to I-4 and I-7, the third lens unit G3, in order from the object side to the image side, comprises a seventh lens element L7 having positive optical power, an eighth lens element L8 having an aspheric object side surface and having positive optical power, and a ninth lens element L9 having negative optical power. Further, the eighth lens element L8 serving as a positive lens element on the image side and the ninth lens element L9 are cemented with each other so that a cemented lens element is formed. This permits remarkably satisfactory compensation of spherical aberration, coma aberration and chromatic aberration. Further, in the zoom lens system according to Embodiments I-8 to I-10, the third lens unit G3, in order from the object side to the image side, includes a sixth lens element L6 having positive optical power, a seventh lens element L7 having an aspheric object side surface and having positive optical power, and an eighth lens element L8 having negative optical power. Furthermore, the seventh lens element L7 serving as a positive lens element on the second object side and the eighth lens element L8 are cemented with each other so that a cemented lens element is formed. This permits remarkably satisfactory compensation of spherical aberration, coma aberration and chromatic aberration.

In the zoom lens system according to Embodiments I-1 to I-10, the fourth lens unit G4 also is composed of one lens element, and this lens element has positive optical power. This realizes a lens system having a short overall length. Further, at the time of focusing change from an infinite-distance object to a short-distance object, as shown in each FIG., the fourth lens unit G4 is drawn out to the object side so that rapid focusing is achieved easily. Further, in the zoom lens system according to Embodiments I-1 to I-7, the one lens element constituting the fourth lens unit G4 has two aspheric surfaces. This permits satisfactory compensation of curvature of off-axial field over the range from a wide-angle limit to a telephoto limit.

Further, in the zoom lens system according to Embodiments I-1 to I-10, in zooming from a wide-angle limit to a telephoto limit at the time of image taking, the first lens unit G1, the second lens unit G2, the third lens unit G3 and the fourth lens unit G4 are moved individually along the optical axis so that zooming is achieved. Then, any lens unit among the first lens unit G1, the second lens unit G2, the third lens unit G3 and the fourth lens unit G4, or alternatively a sub lens unit consisting of a part of a lens unit is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the third lens unit G3 is moved in a direction perpendicular to the optical axis, so that image blur is compensated in a state that size increase in the entire zoom lens system is suppressed and a compact construction is realized and that excellent imaging characteristics such as small decentering coma aberration and decentering astigmatism are satisfied.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

Embodiments II-1 to II-9

FIGS. 30, 33, 36, 39, 42, 45, 47, 50 and 53 are lens arrangement diagrams of zoom lens systems according to Embodiments II-1 to II-9, respectively.

Each of FIGS. 30, 33, 36, 39, 42, 45, 47, 50 and 53 shows a zoom lens system in an infinity in-focus condition. In each FIG., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each FIG., an arrow of straight or curved line provided between part (a) and part (b) indicates the movement of each lens unit from a wide-angle limit through a middle position to a telephoto limit. Moreover, in each FIG., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises a first lens unit G1 having positive optical power, a second lens unit G2 having negative optical power, a third lens unit G3 having positive optical power, and a fourth lens unit G4 having positive optical power. Then, in zooming, the individual lens units move in a direction along the optical axis such that intervals between the lens units, that is, the interval between the first lens unit G1 and the second lens unit G2, the interval between the second lens unit G2 and the third lens unit G3, and the interval between the third lens unit G3 and the fourth lens unit G4 should all vary. In the zoom lens system according to each embodiment, since these lens units are arranged in the desired optical power configuration, high optical performance is obtained and still size reduction is achieved in the entire lens system.

Further, in FIGS. 30, 33, 36, 39, 42, 45, 47, 50 and 53, an asterisk "*" imparted to a particular surface indicates that the surface is aspheric. In each FIG., symbol (+) or (−) imparted to the symbol of each lens unit corresponds to the sign of the optical power of the lens unit. In each FIG., the straight line located on the most right-hand side indicates the position of the image surface S. On the object side relative to the image surface S (that is, between the image surface S and the most image side lens surface of the fourth lens unit G4), a plane parallel plate P such as an optical low-pass filter and a face plate of an image sensor is provided.

Further, in FIGS. 30, 33, 36, 39, 42, 45, 47, 50 and 53, an aperture diaphragm A is provided on the most object side of the third lens unit G3. Then, in zooming from a wide-angle limit to a telephoto limit at the time of image taking, the aperture diaphragm A moves along the optical axis integrally with the third lens unit G3.

Figure 30:
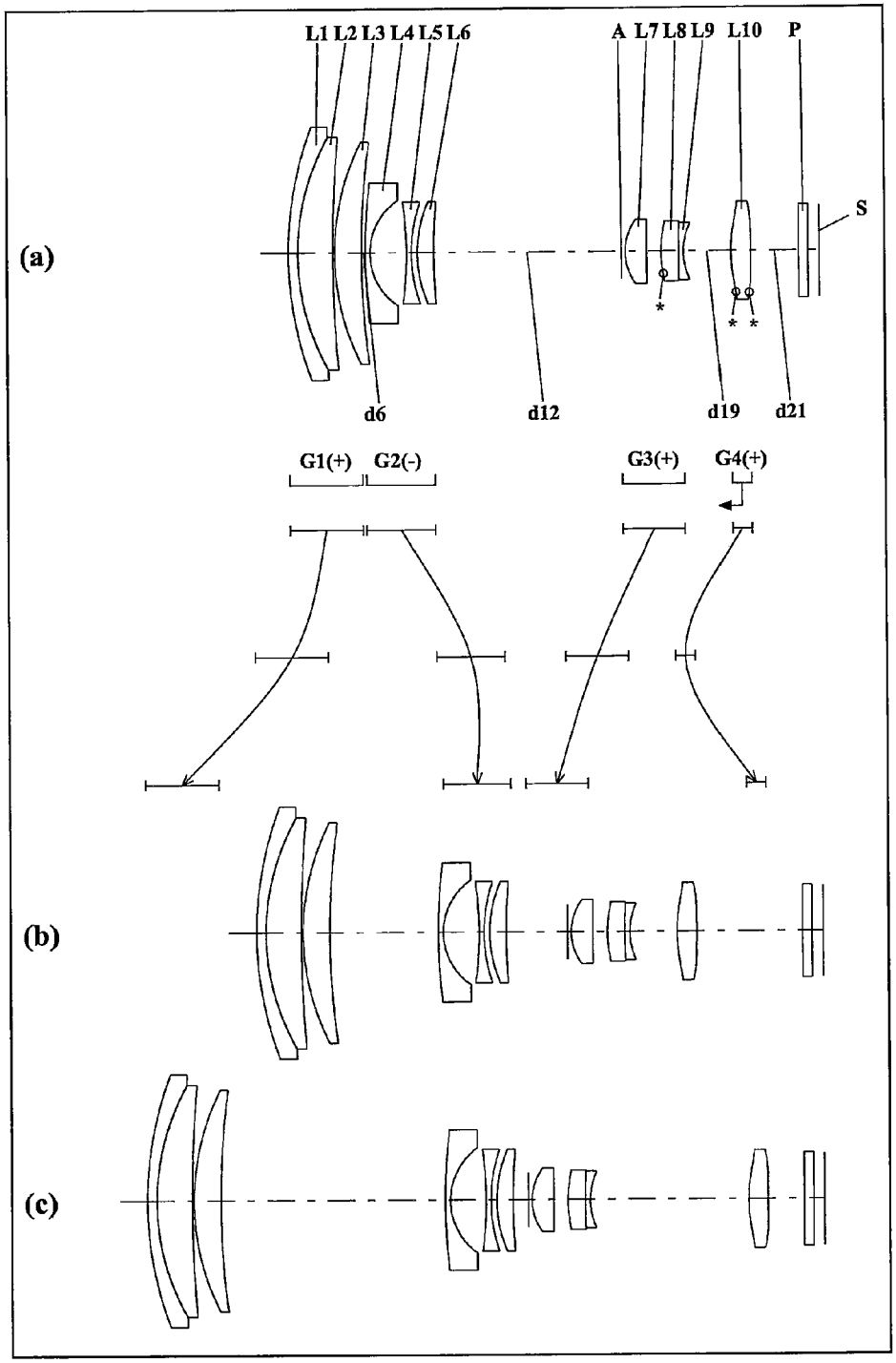
FIGS. 30(*a*)-(*c*) are a lens arrangement diagram showing an infinity in-focus condition of a zoom lens system according to Embodiment II-1 (Example II-1)
Figure 31:
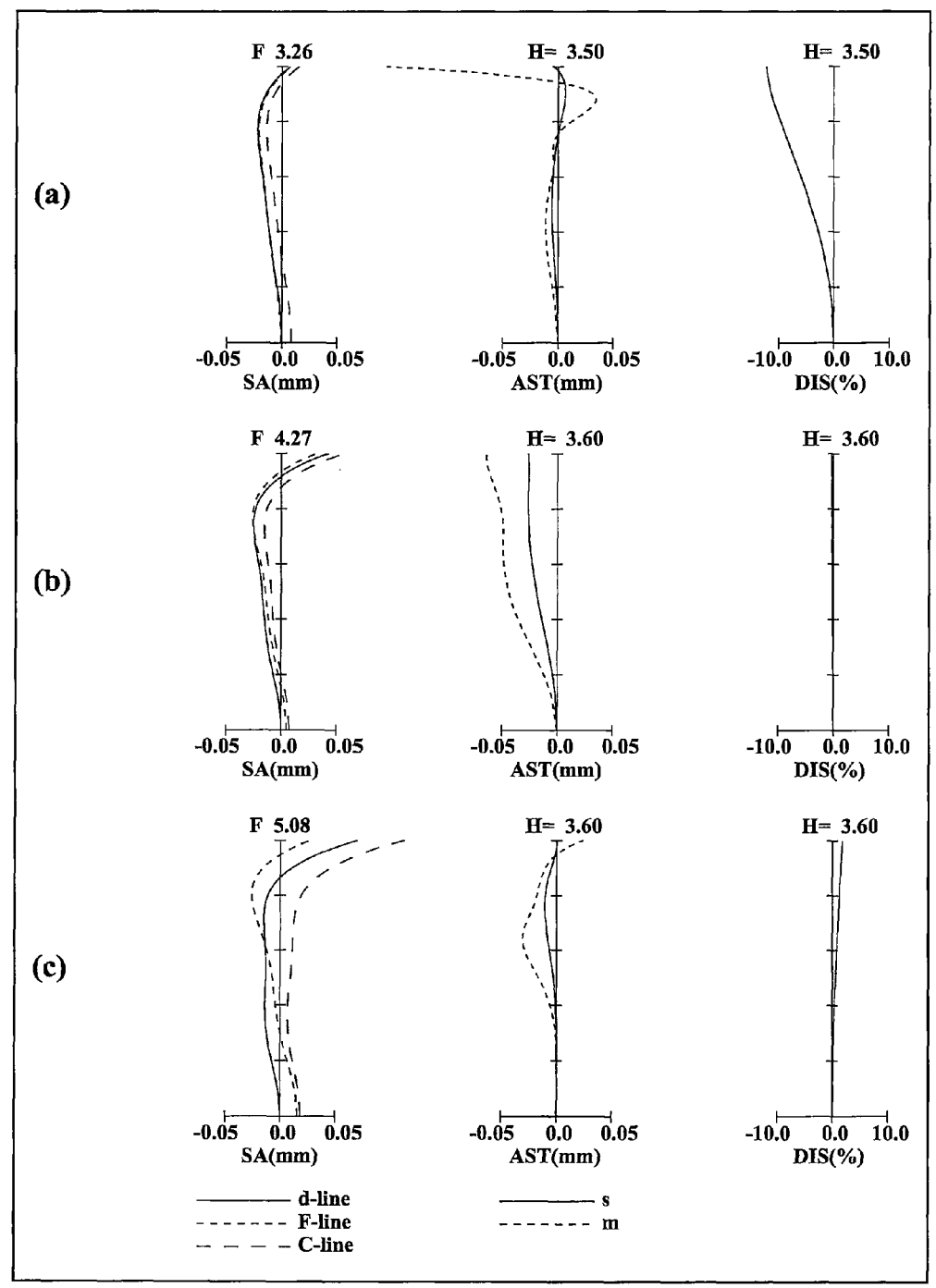
FIGS. 31(*a*)-(*c*) are a longitudinal aberration diagram of an infinity in-focus condition of a zoom lens system according to Example II-1.
Figure 32:
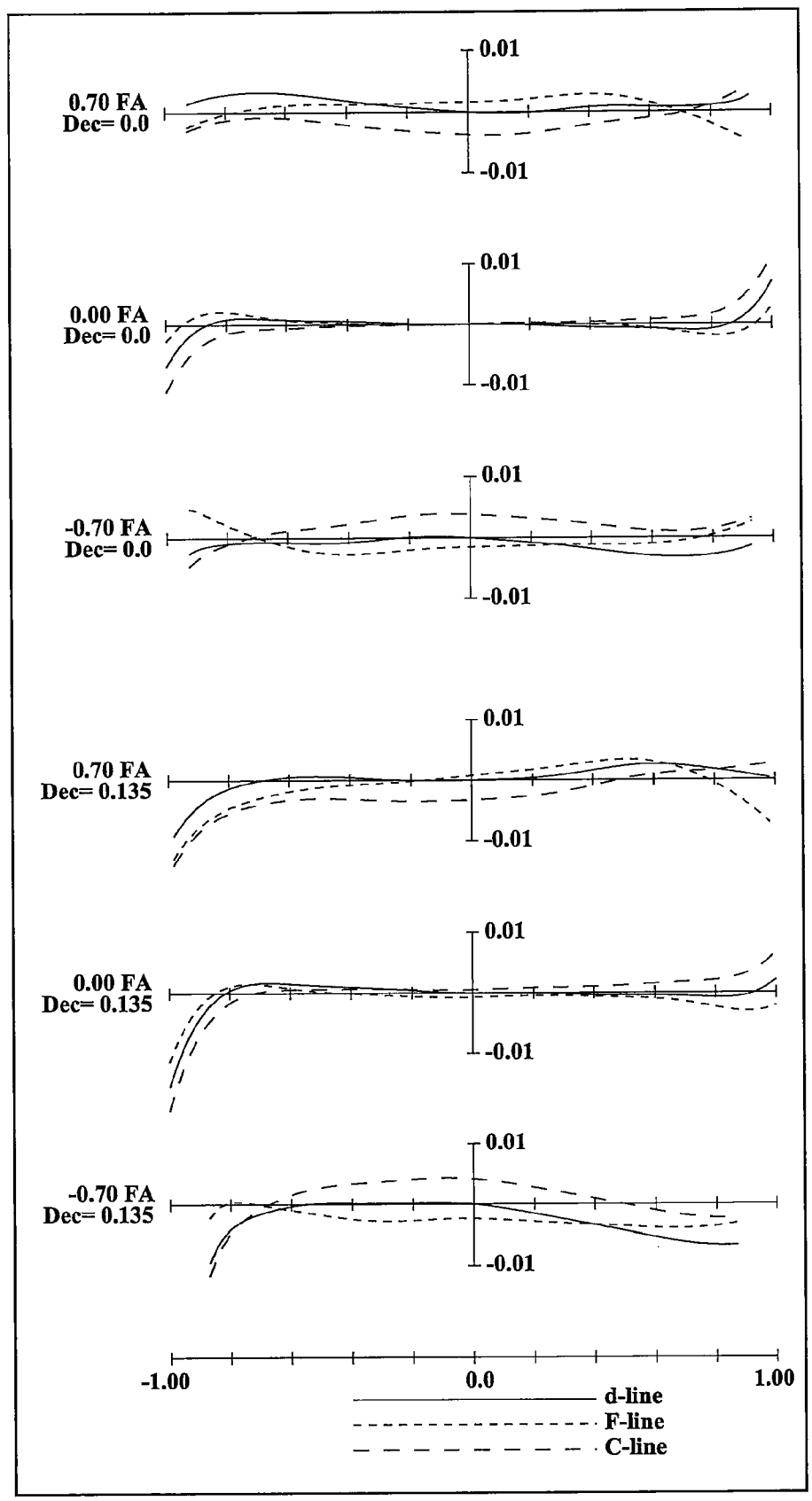
FIG. 32 is a lateral aberration diagram of a zoom lens system according to Example II-1 at a telephoto limit in a basic state where image blur compensation is not performed and in a blur compensation state.

As shown in FIG. 30, in the zoom lens system according to Embodiment II-1, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment II-1, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

In the zoom lens system according to Embodiment II-1, the third lens unit G3, in order from the object side to the image side, comprises: a positive meniscus seventh lens element L7 with the convex surface facing the object side; a positive meniscus eighth lens element L8 with the convex surface facing the object side; and a negative meniscus ninth lens element L9 with the convex surface facing the object side. Among these, the eighth lens element L8 and the ninth lens element L9 are cemented with each other. In the surface data in the corresponding numerical example described later, surface number 17 indicates the cement layer between the eighth lens element L8 and the ninth lens element L9. Further, the eighth lens element L8 has an aspheric object side surface.

Further, in the zoom lens system according to Embodiment II-1, the fourth lens unit G4 comprises solely a bi-convex tenth lens element L10. The tenth lens element L10 has two aspheric surfaces.

Here, in the zoom lens system according to Embodiment II-1, a plane parallel plate P is provided on the object side relative to the image surface S (between the image surface S and the tenth lens element L10).

In the zoom lens system according to Embodiment II-1, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 33:
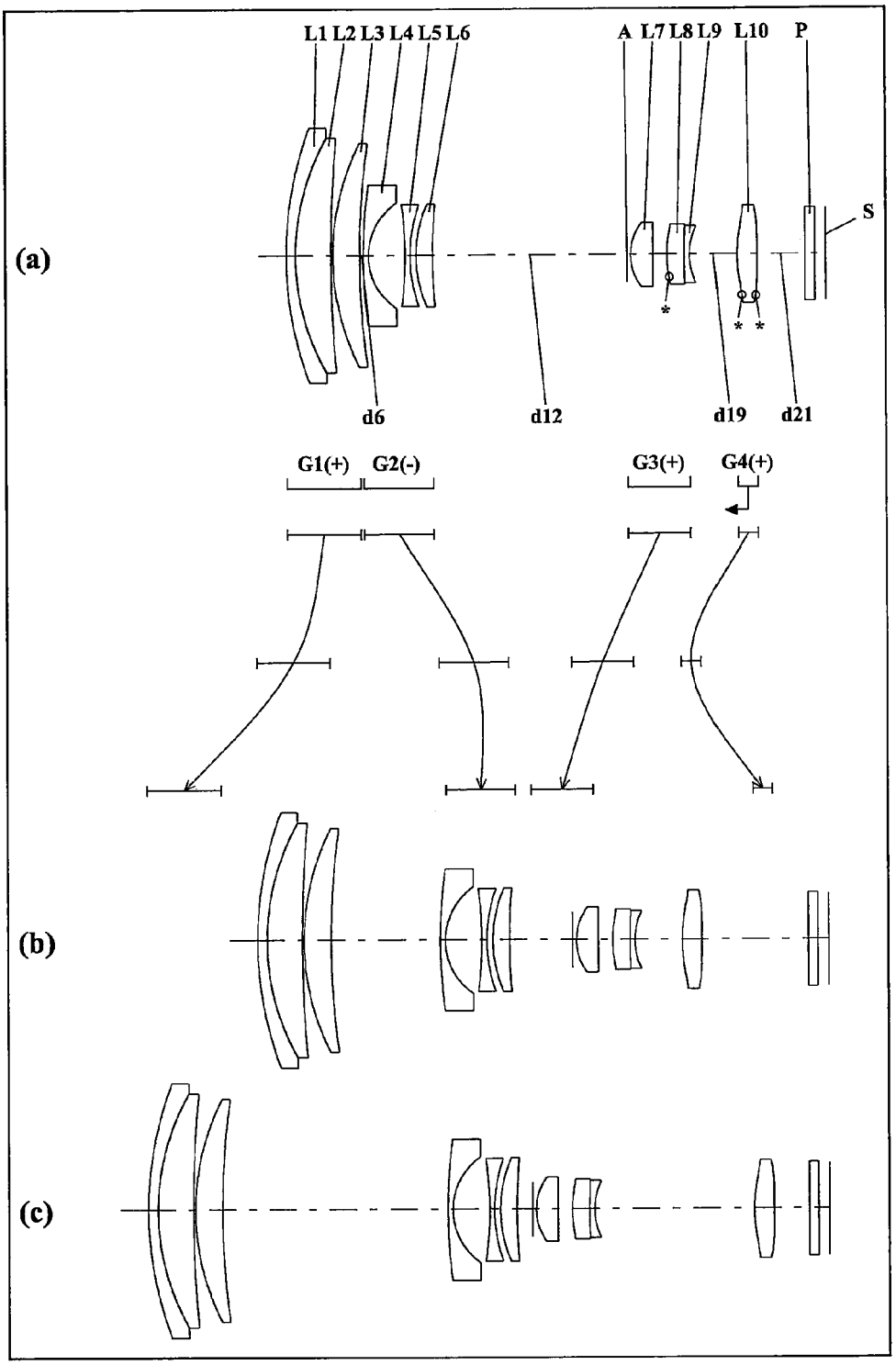
FIGS. 33(*a*)-(*c*) are a lens arrangement diagram showing an infinity in-focus condition of a zoom lens system according to Embodiment II-2 (Example II-2)
Figure 34:
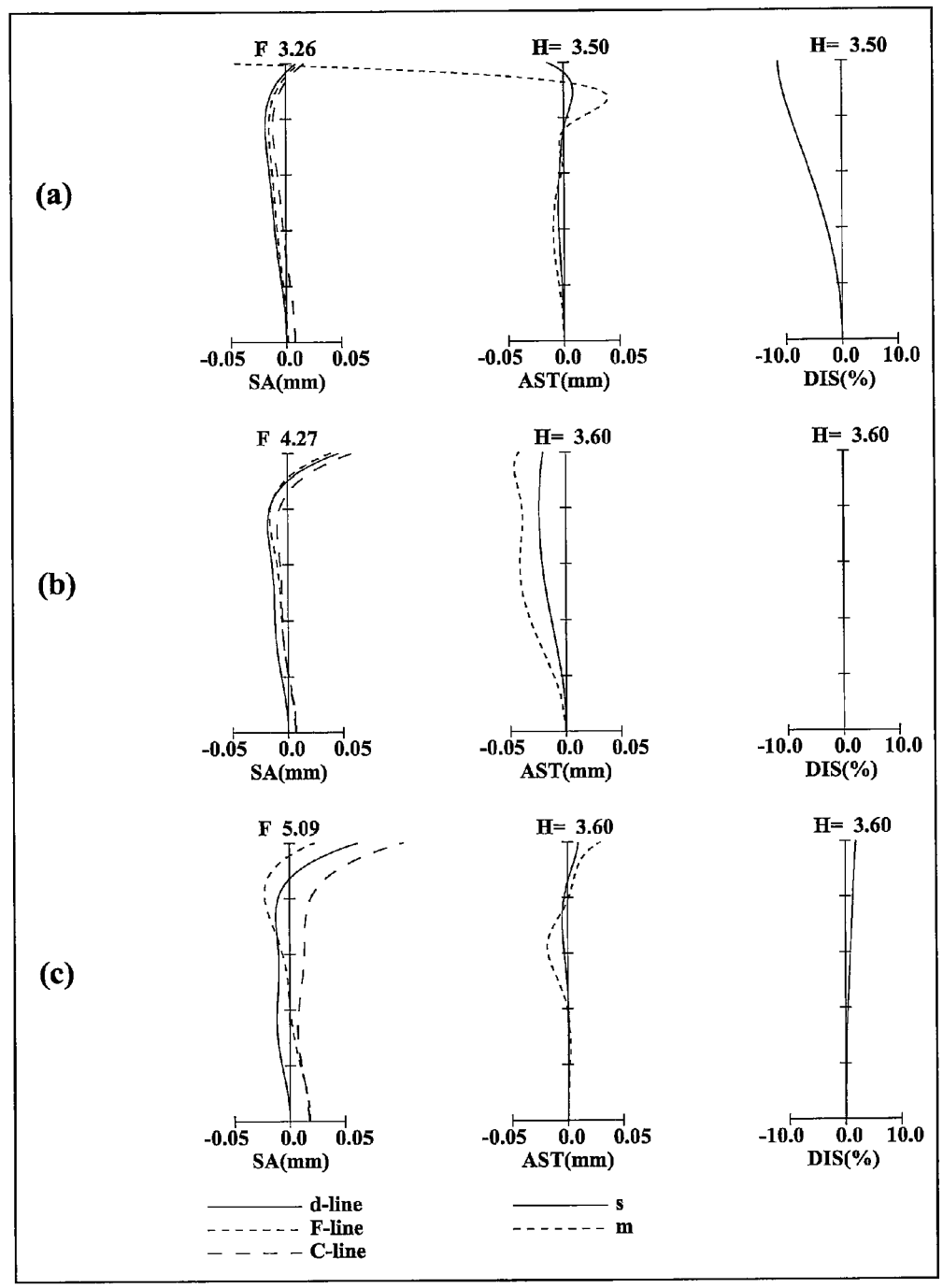
FIGS. 34(*a*)-(*c*) are a longitudinal aberration diagram of an infinity in-focus condition of a zoom lens system according to Example II-2.
Figure 35:
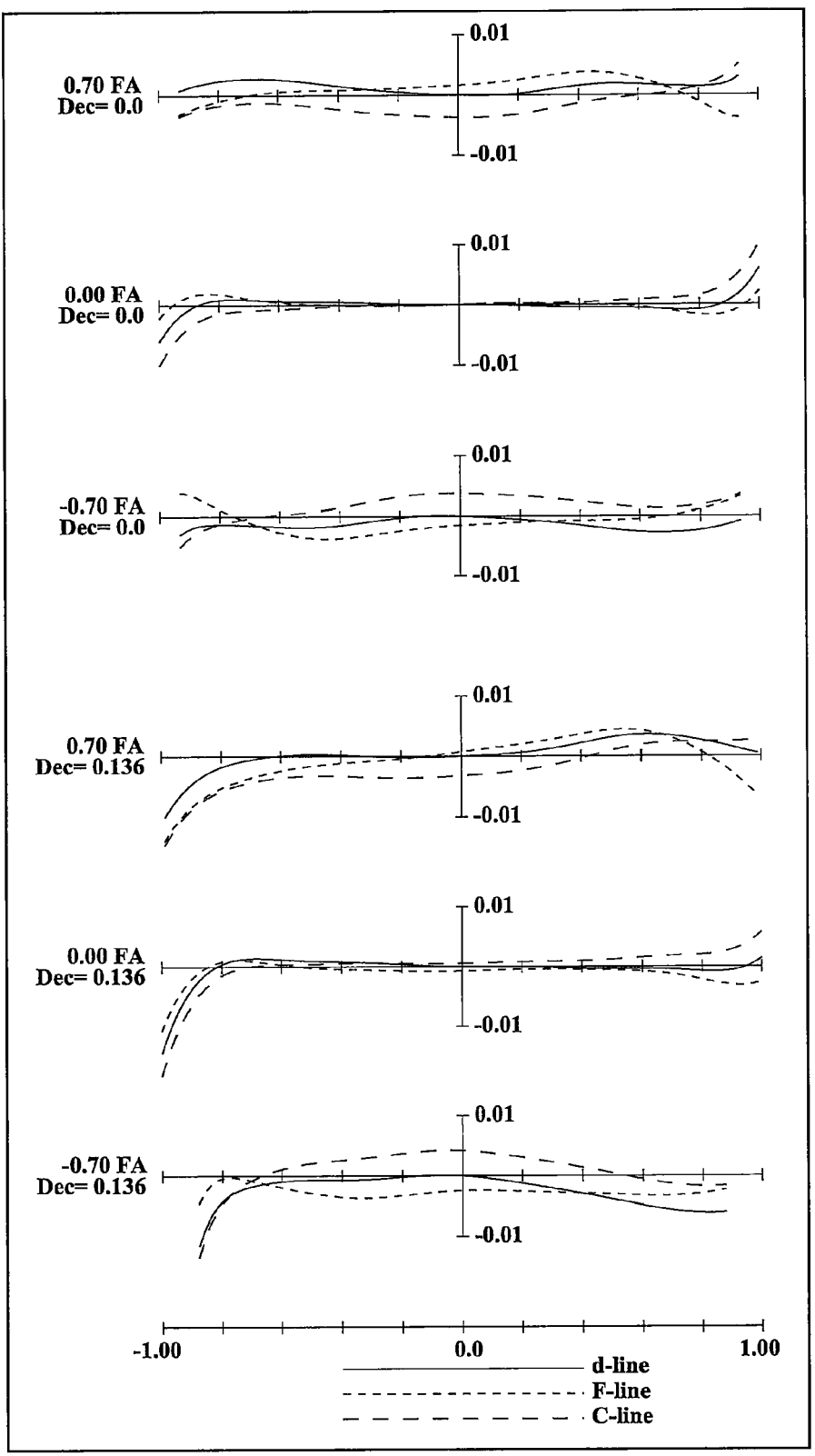
FIG. 35 is a lateral aberration diagram of a zoom lens system according to Example II-2 at a telephoto limit in a basic state where image blur compensation is not performed and in a blur compensation state.

As shown in FIG. 33, in the zoom lens system according to Embodiment II-2, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment II-2, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

In the zoom lens system according to Embodiment II-2, the third lens unit G3, in order from the object side to the image side, comprises: a positive meniscus seventh lens element L7 with the convex surface facing the object side; a positive meniscus eighth lens element L8 with the convex surface facing the object side; and a negative meniscus ninth lens element L9 with the convex surface facing the object side. Among these, the eighth lens element L8 and the ninth lens element L9 are cemented with each other. In the surface data in the corresponding numerical example described later, surface number 17 indicates the cement layer between the eighth lens element L8 and the ninth lens element L9. Further, the eighth lens element L8 has an aspheric object side surface.

Further, in the zoom lens system according to Embodiment II-2, the fourth lens unit G4 comprises solely a bi-convex tenth lens element L10. The tenth lens element L10 has two aspheric surfaces.

Here, in the zoom lens system according to Embodiment II-2, a plane parallel plate P is provided on the object side relative to the image surface S (between the image surface S and the tenth lens element L10).

In the zoom lens system according to Embodiment II-2, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 36:
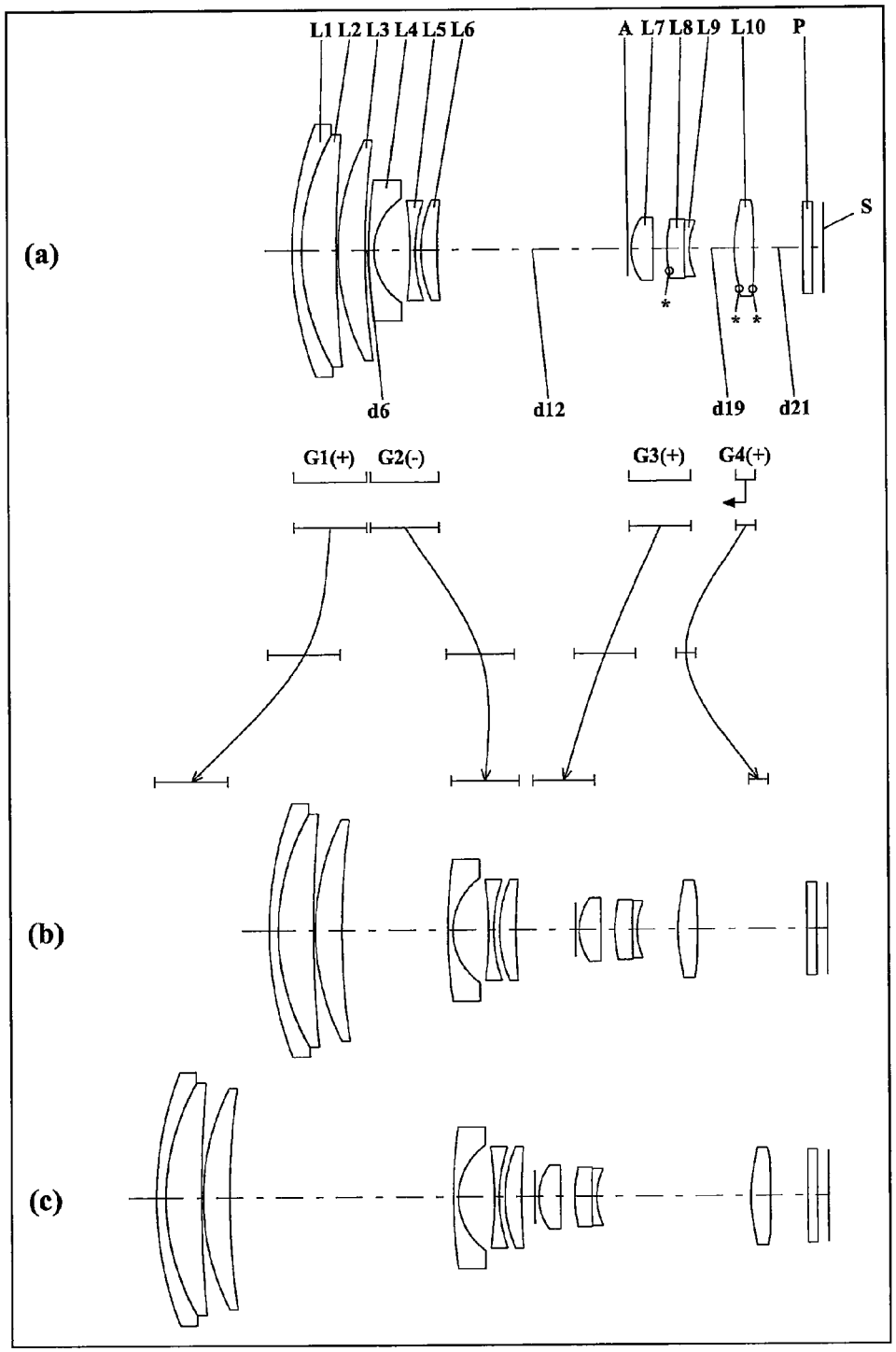
FIGS. 36(*a*)-(*c*) are a lens arrangement diagram showing an infinity in-focus condition of a zoom lens system according to Embodiment II-3 (Example II-3)
Figure 37:
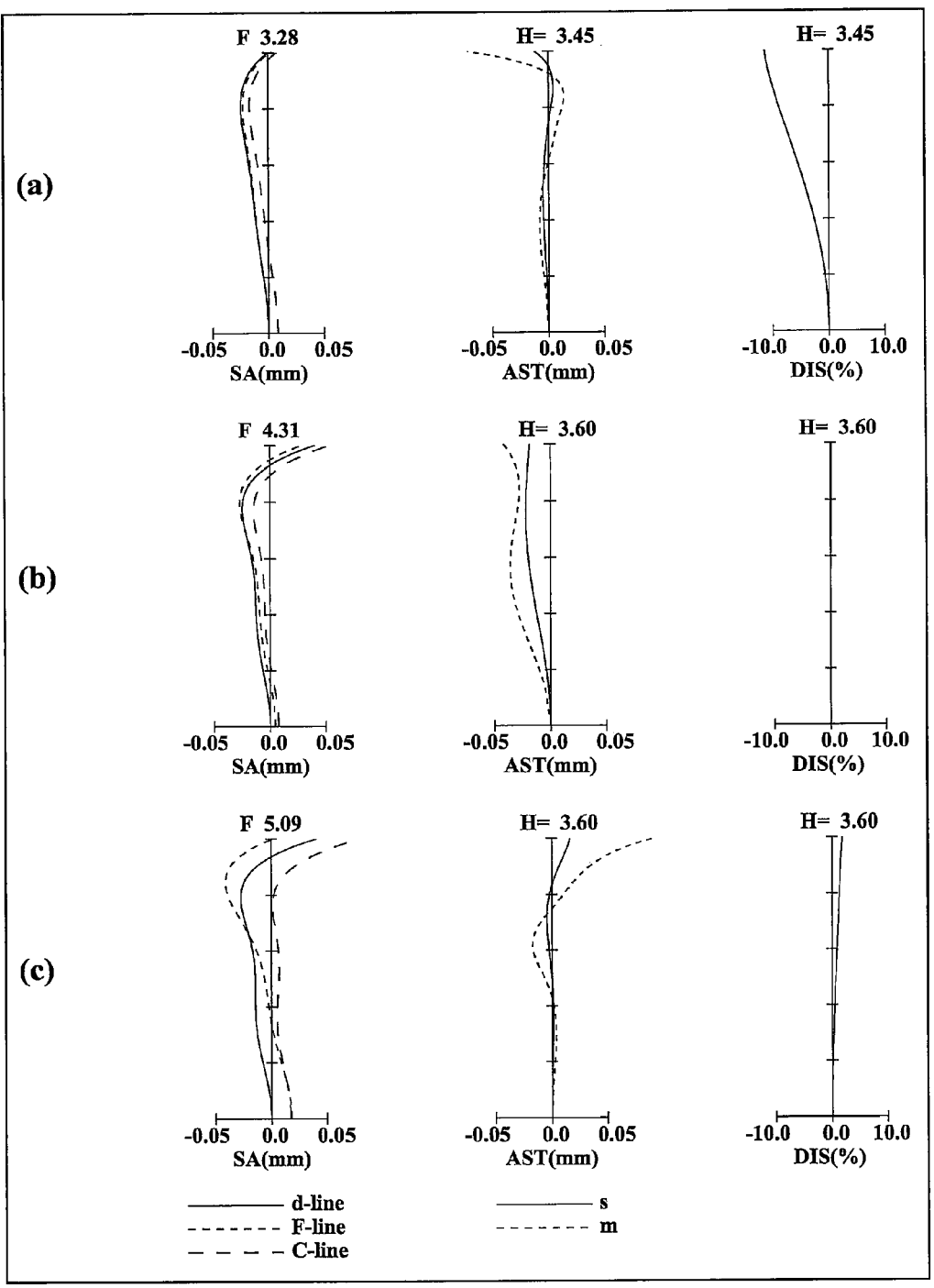
FIGS. 37(*a*)-(*c*) are a longitudinal aberration diagram of an infinity in-focus condition of a zoom lens system according to Example II-3.
Figure 38:
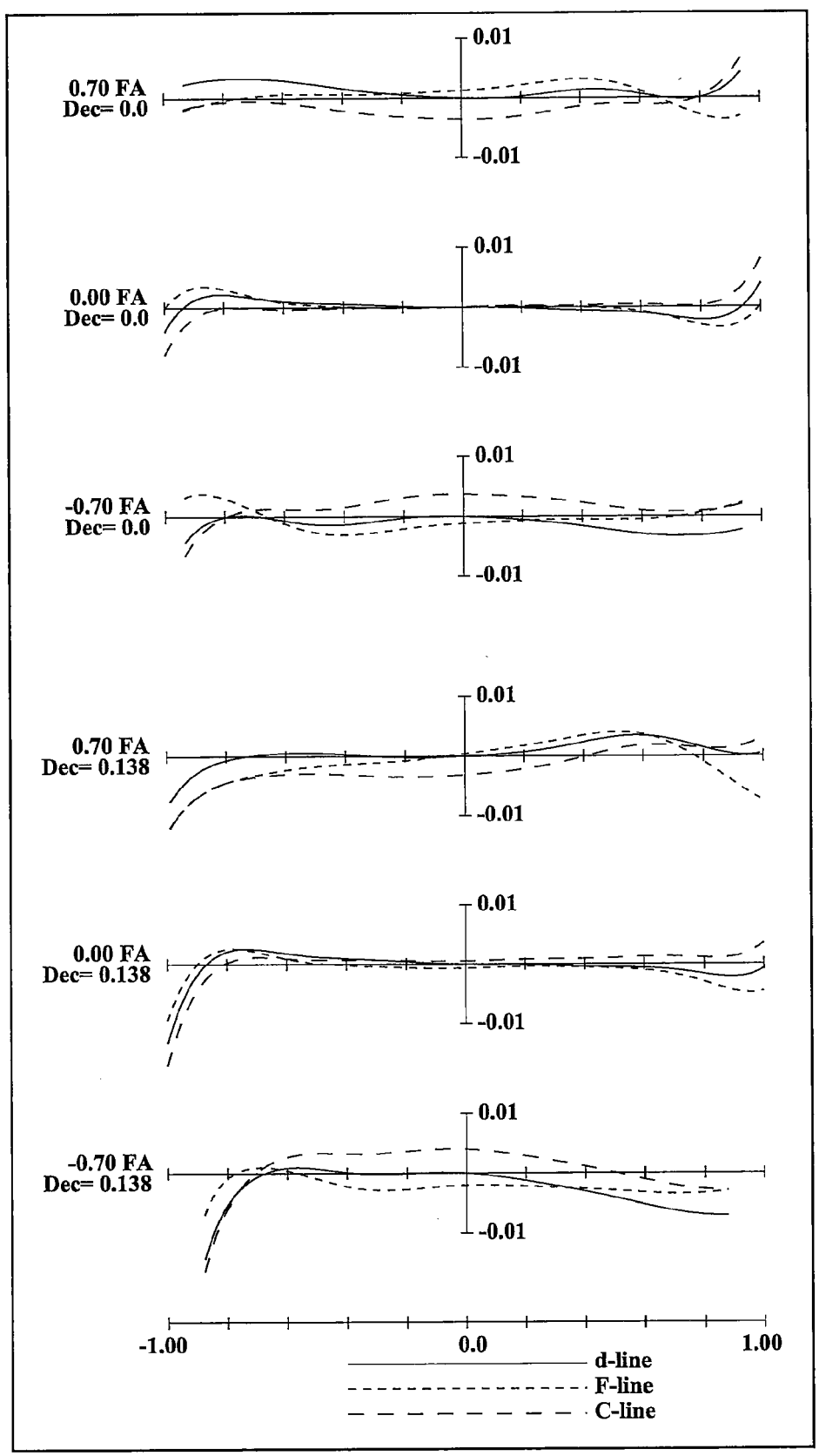
FIG. 38 is a lateral aberration diagram of a zoom lens system according to Example II-3 at a telephoto limit in a basic state where image blur compensation is not performed and in a blur compensation state.

As shown in FIG. 36, in the zoom lens system according to Embodiment II-3, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment II-3, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

In the zoom lens system according to Embodiment II-3, the third lens unit G3, in order from the object side to the image side, comprises: a positive meniscus seventh lens element L7 with the convex surface facing the object side; a positive meniscus eighth lens element L8 with the convex surface facing the object side; and a negative meniscus ninth lens element L9 with the convex surface facing the object side. Among these, the eighth lens element L8 and the ninth lens element L9 are cemented with each other. In the surface data in the corresponding numerical example described later, surface number 17 indicates the cement layer between the eighth lens element L8 and the ninth lens element L9. Further, the eighth lens element L8 has an aspheric object side surface.

Further, in the zoom lens system according to Embodiment II-3, the fourth lens unit G4 comprises solely a bi-convex tenth lens element L10. The tenth lens element L10 has two aspheric surfaces.

Here, in the zoom lens system according to Embodiment II-3, a plane parallel plate P is provided on the object side relative to the image surface S (between the image surface S and the tenth lens element L10).

In the zoom lens system according to Embodiment II-3, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 39:
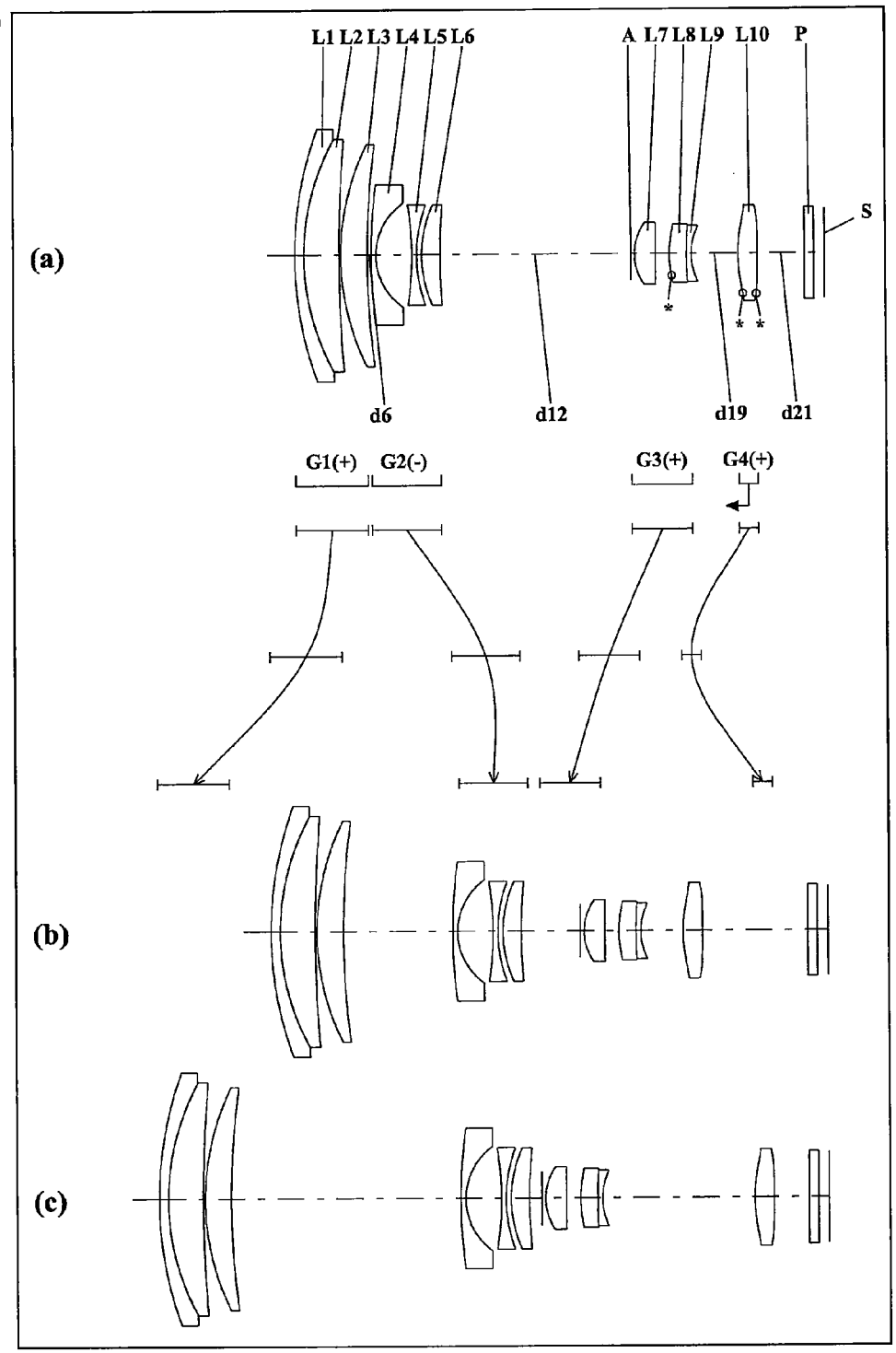
FIGS. 39(*a*)-(*c*) are a lens arrangement diagram showing an infinity in-focus condition of a zoom lens system according to Embodiment II-4 (Example II-4)
Figure 40:
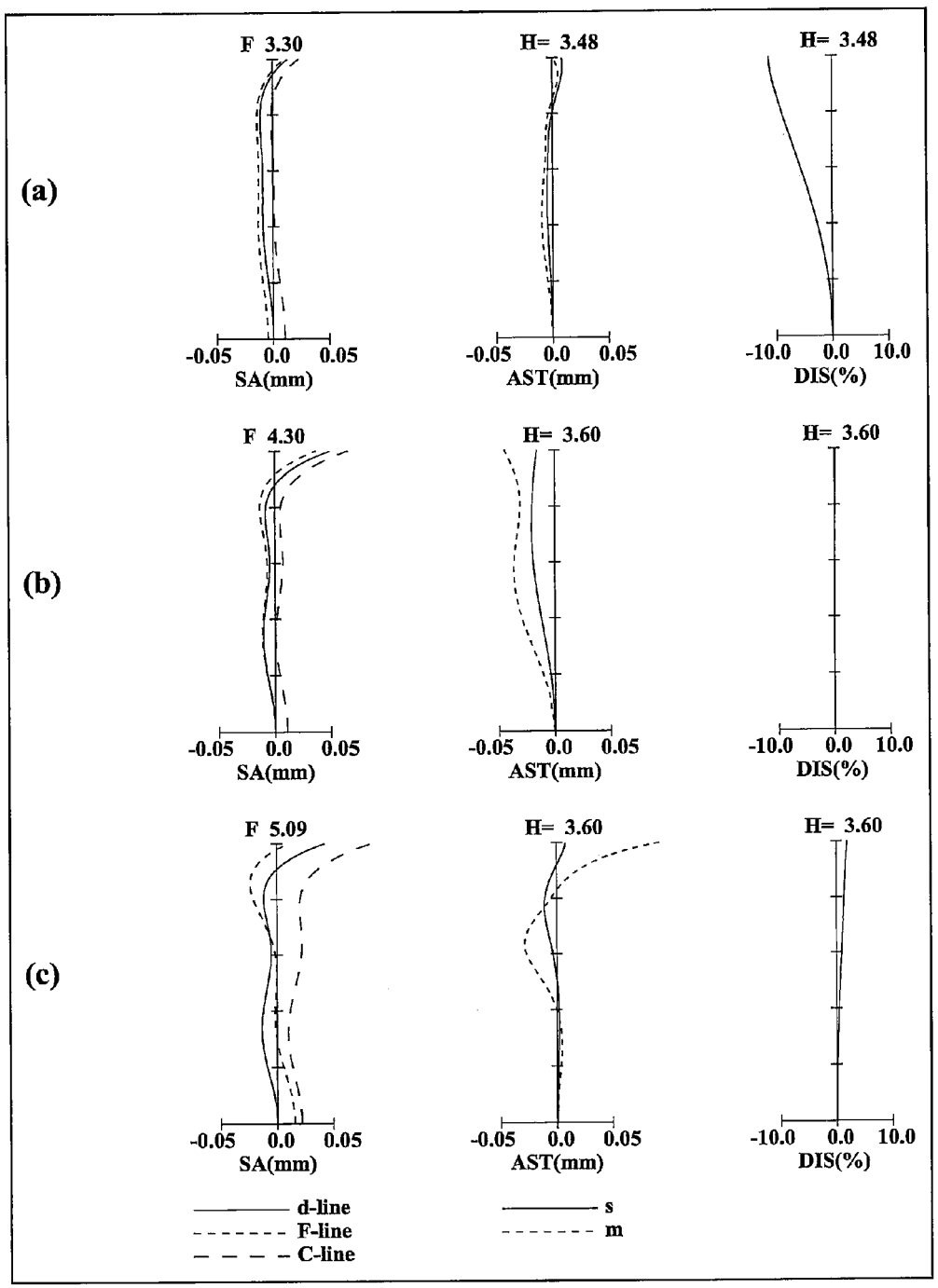
FIGS. 40(*a*)-(*c*) are a longitudinal aberration diagram of an infinity in-focus condition of a zoom lens system according to Example II-4.
Figure 41:
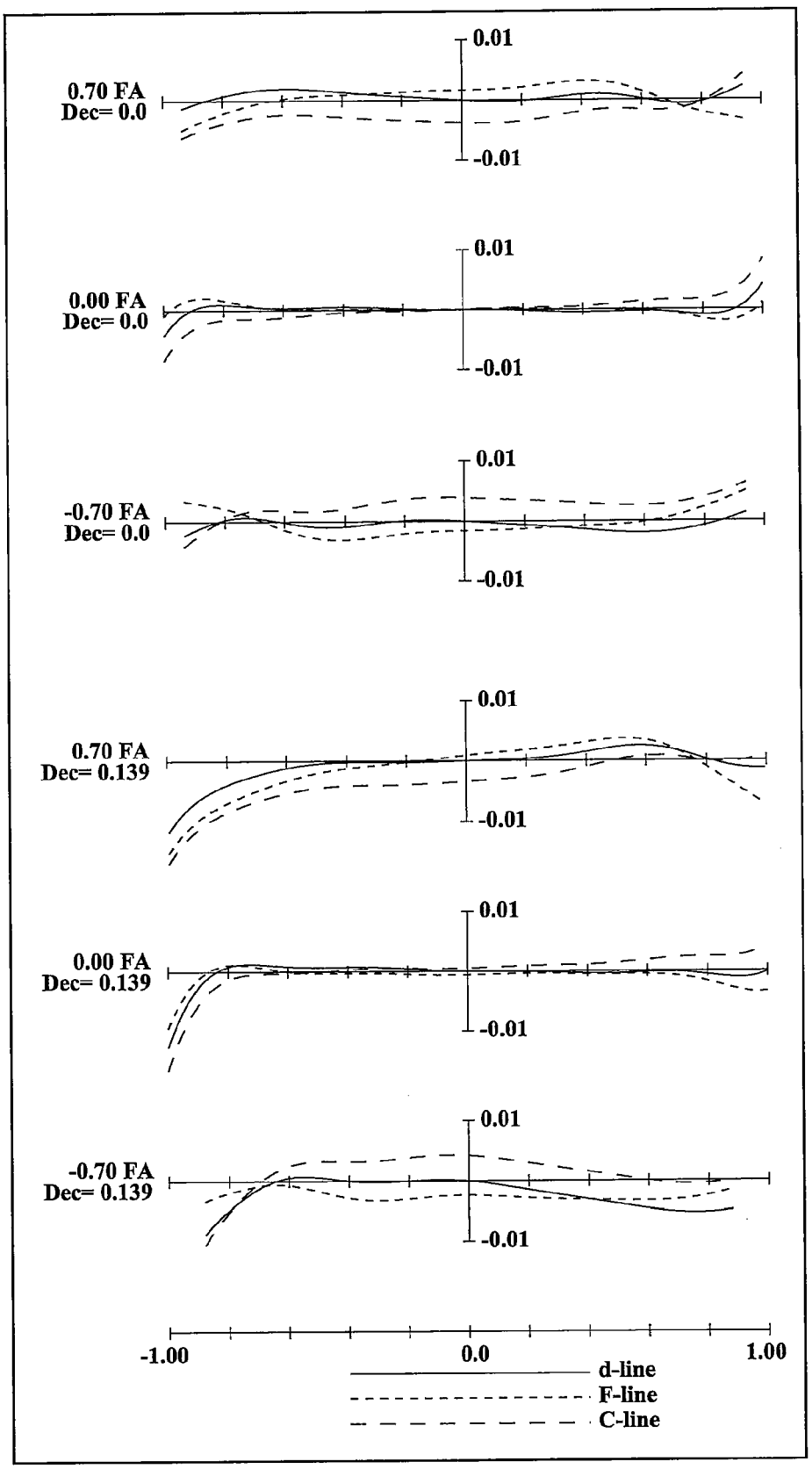
FIG. 41 is a lateral aberration diagram of a zoom lens system according to Example II-4 at a telephoto limit in a basic state where image blur compensation is not performed and in a blur compensation state.

As shown in FIG. 39, in the zoom lens system according to Embodiment II-4, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment II-4, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

In the zoom lens system according to Embodiment II-4, the third lens unit G3, in order from the object side to the image side, comprises: a positive meniscus seventh lens element L7 with the convex surface facing the object side; a positive meniscus eighth lens element L8 with the convex surface facing the object side; and a negative meniscus ninth lens element L9 with the convex surface facing the object side. Among these, the eighth lens element L8 and the ninth lens element L9 are cemented with each other. In the surface data in the corresponding numerical example described later, surface number 17 indicates the cement layer between the eighth lens element L8 and the ninth lens element L9. Further, the eighth lens element L8 has an aspheric object side surface.

Further, in the zoom lens system according to Embodiment II-4, the fourth lens unit G4 comprises solely a bi-convex tenth lens element L10. The tenth lens element L10 has two aspheric surfaces.

Here, in the zoom lens system according to Embodiment II-4, a plane parallel plate P is provided on the object side relative to the image surface S (between the image surface S and the tenth lens element L10).

In the zoom lens system according to Embodiment II-4, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 42:
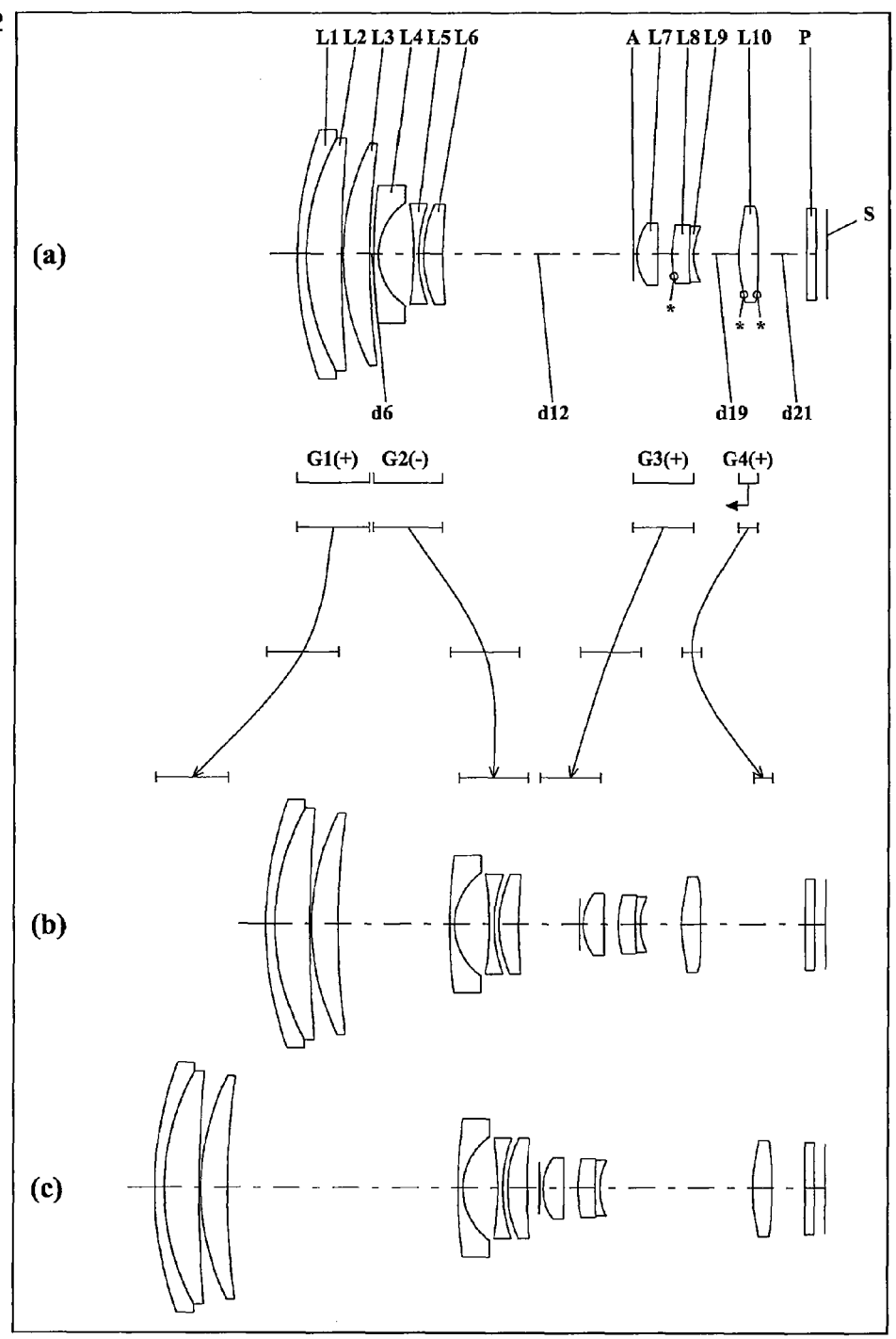
FIGS. 42(*a*)-(*c*) are a lens arrangement diagram showing an infinity in-focus condition of a zoom lens system according to Embodiment II-5 (Example II-5)
Figure 43:
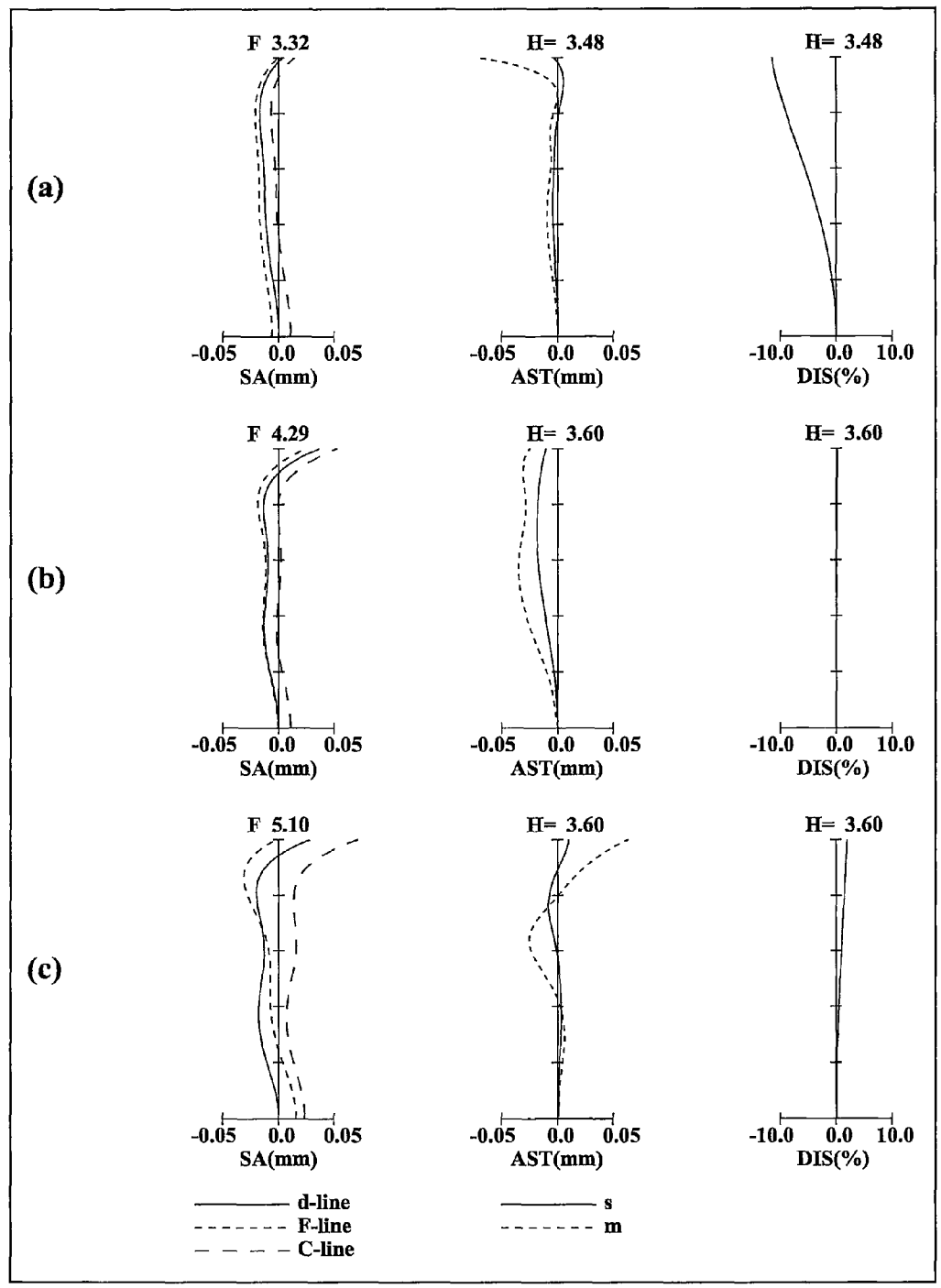
FIGS. 43 (*a*)-(*c*) are a longitudinal aberration diagram of an infinity in-focus condition of a zoom lens system according to Example II-5.
Figure 44:
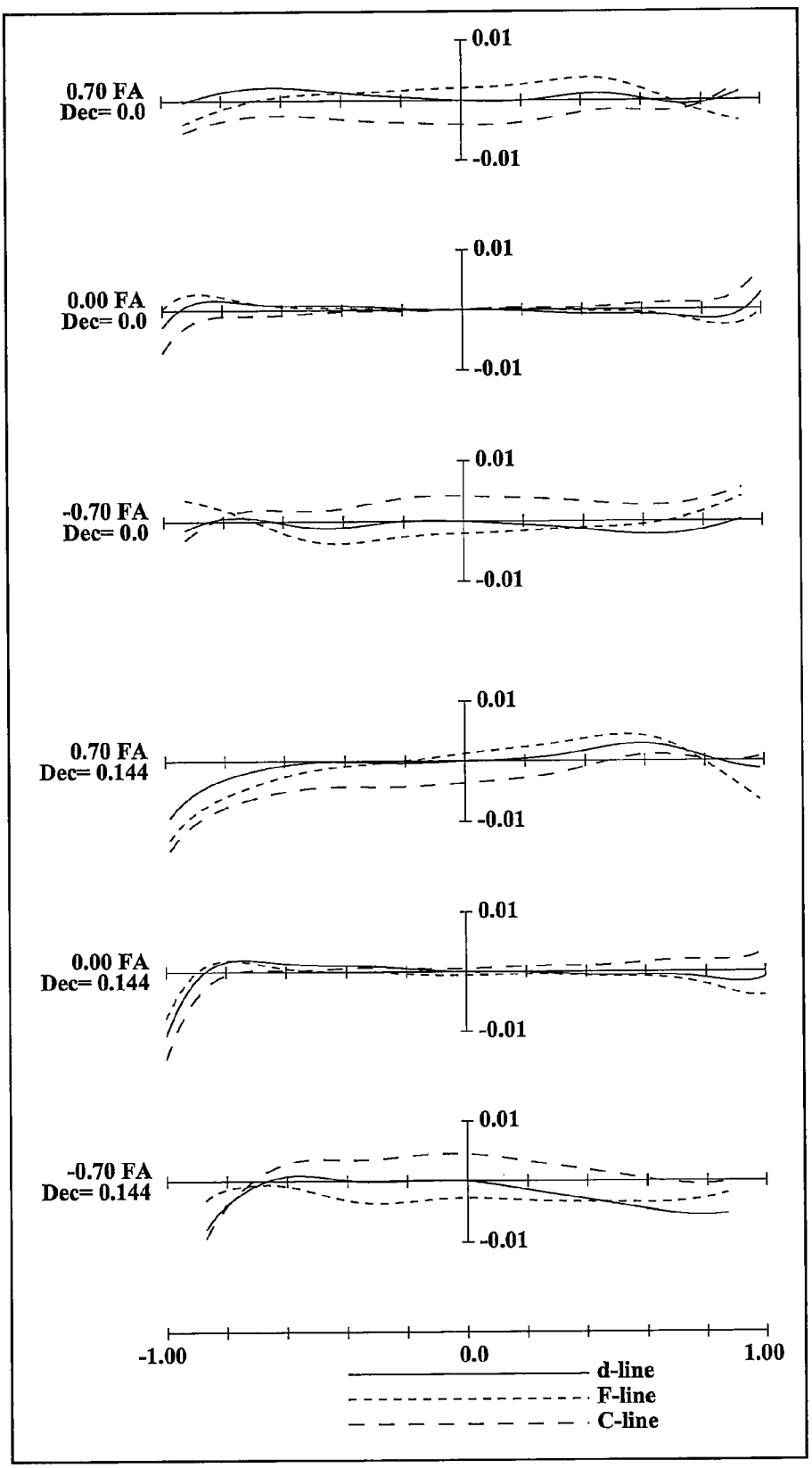
FIG. 44 is a lateral aberration diagram of a zoom lens system according to Example II-5 at a telephoto limit in a basic state where image blur compensation is not performed and in a blur compensation state.

As shown in FIG. 42, in the zoom lens system according to Embodiment II-5, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment II-5, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

In the zoom lens system according to Embodiment II-5, the third lens unit G3, in order from the object side to the image side, comprises: a positive meniscus seventh lens element L7 with the convex surface facing the object side; a positive meniscus eighth lens element L8 with the convex surface facing the object side; and a negative meniscus ninth lens element L9 with the convex surface facing the object side. Among these, the eighth lens element L8 and the ninth lens element L9 are cemented with each other. In the surface data in the corresponding numerical example described later, surface number 17 indicates the cement layer between the eighth lens element L8 and the ninth lens element L9. Further, the eighth lens element L8 has an aspheric object side surface.

Further, in the zoom lens system according to Embodiment II-5, the fourth lens unit G4 comprises solely a bi-convex tenth lens element L10. The tenth lens element L10 has two aspheric surfaces.

Here, in the zoom lens system according to Embodiment II-5, a plane parallel plate P is provided on the object side relative to the image surface S (between the image surface S and the tenth lens element L10).

In the zoom lens system according to Embodiment II-5, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 45:
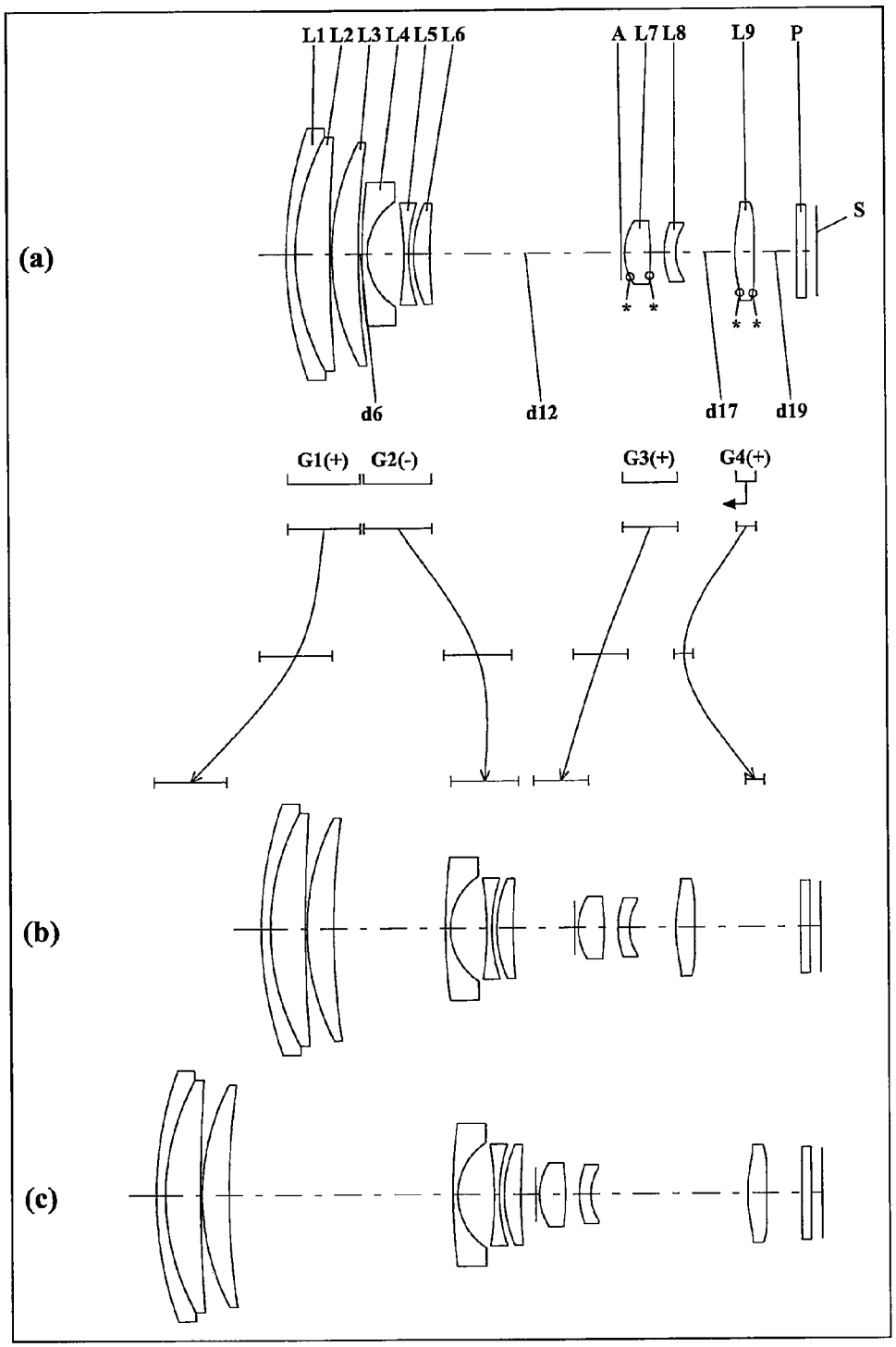
FIGS. 45(a)-(c) are a lens arrangement diagram showing an infinity in-focus condition of a zoom lens system according to Embodiment II-6 (Example II-6)
Figure 46:
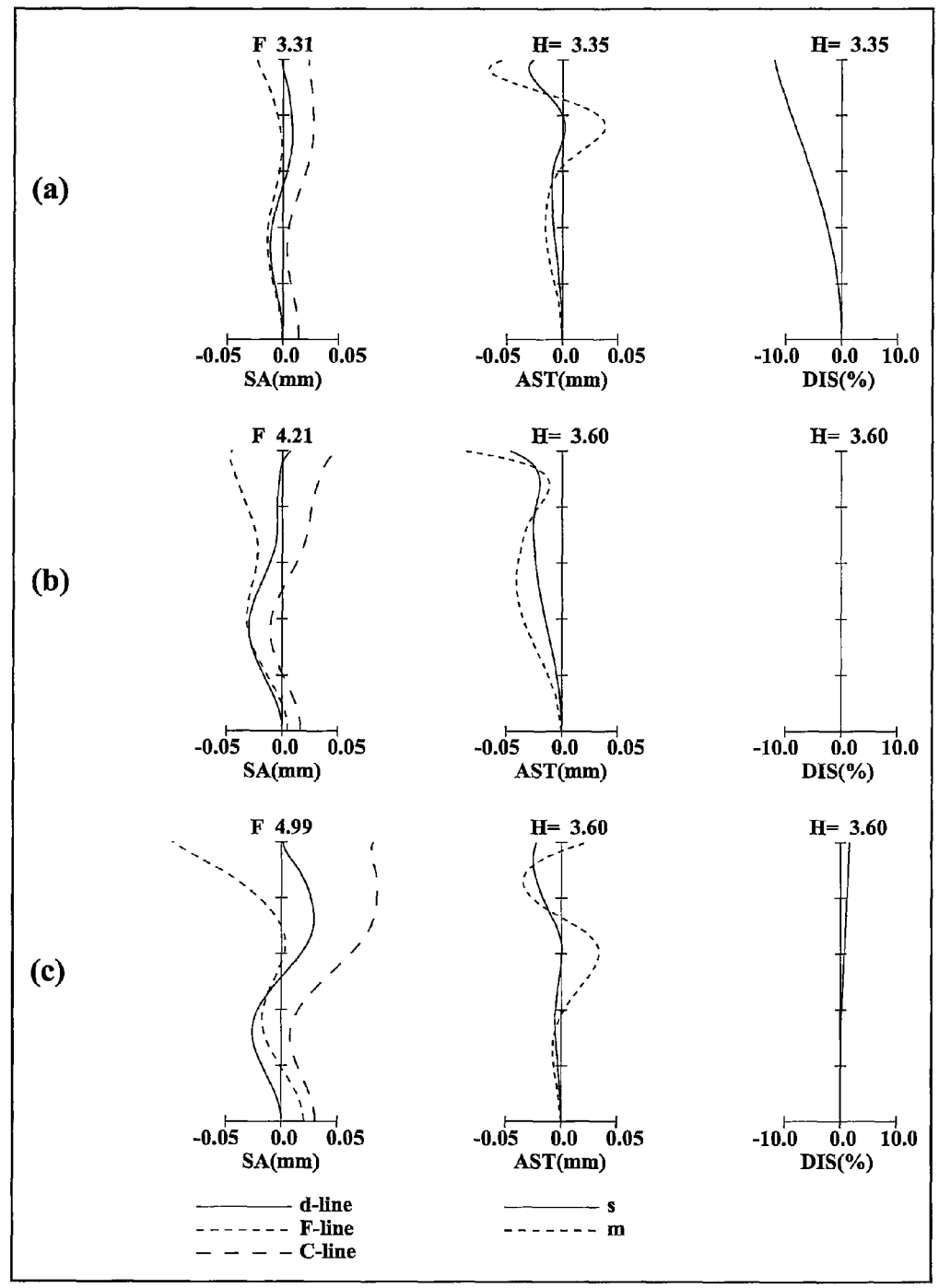
FIGS. 46(a)-(c) are a longitudinal aberration diagram of an infinity in-focus condition of a zoom lens system according to Example II-6.

As shown in FIG. 45, in the zoom lens system according to Embodiment II-6, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment II-6, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system according to Embodiment II-6, the third lens unit G3, in order from the object side to the image side, comprises: a bi-convex seventh lens element L7; and a negative meniscus eighth lens element L8 with the convex surface facing the object side. Among these, the seventh lens element L7 has two aspheric surfaces.

Further, in the zoom lens system according to Embodiment II-6, the fourth lens unit G4 comprises solely a bi-convex ninth lens element L9. The ninth lens element L9 has two aspheric surfaces.

Here, in the zoom lens system according to Embodiment II-6, a plane parallel plate P is provided on the object side relative to the image surface S (between the image surface S and the ninth lens element L9).

In the zoom lens system according to Embodiment II-6, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 47:
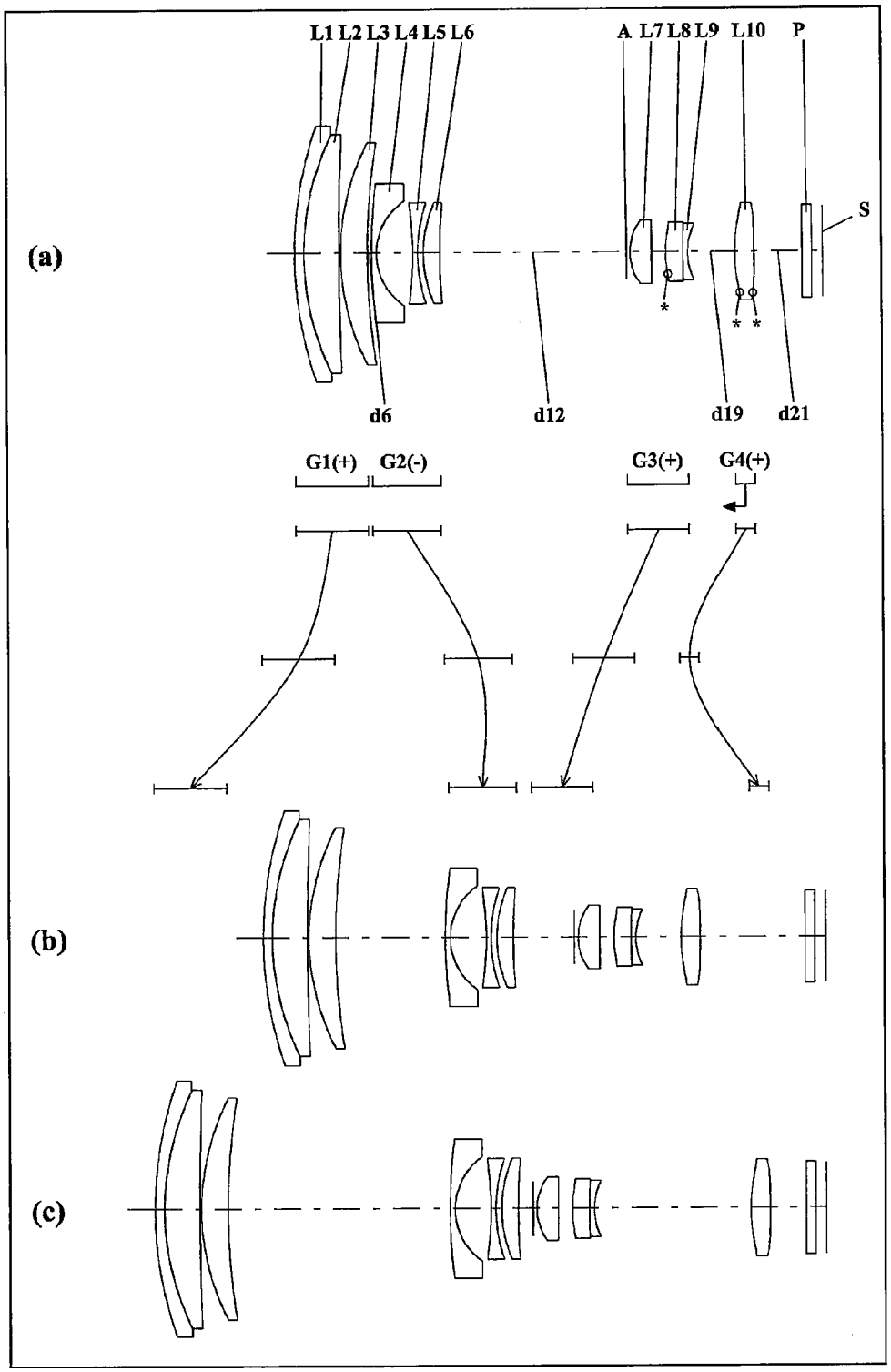
FIGS. 47(a)-(c) are a lens arrangement diagram showing an infinity in-focus condition of a zoom lens system according to Embodiment II-7 (Example II-7)
Figure 48:
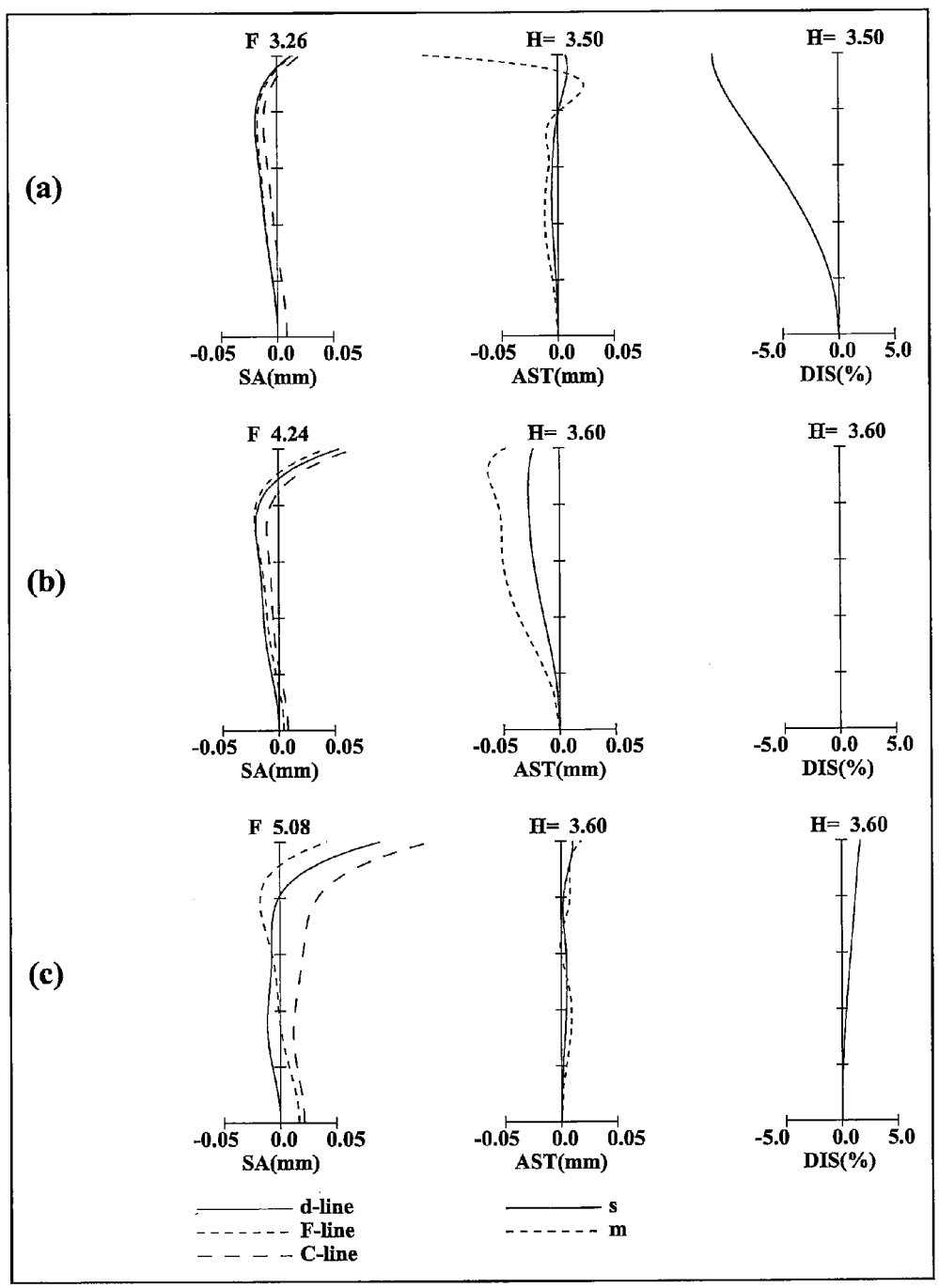
FIGS. 48(a)-(c) are a longitudinal aberration diagram of an infinity in-focus condition of a zoom lens system according to Example II-7.
Figure 49:
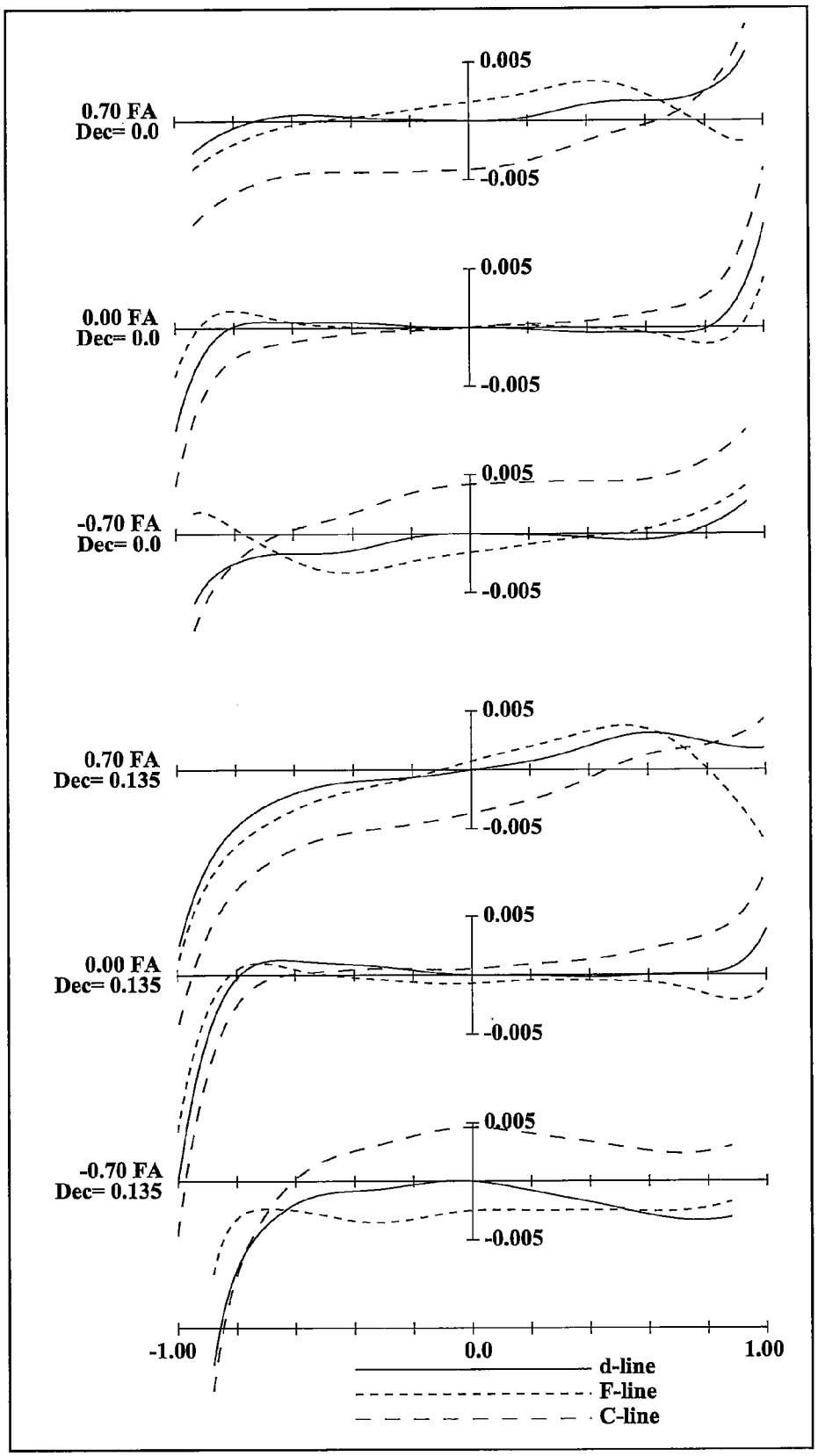
FIG. 49 is a lateral aberration diagram of a zoom lens system according to Example II-7 at a telephoto limit in a basic state where image blur compensation is not performed and in a blur compensation state.

As shown in FIG. 47, in the zoom lens system according to Embodiment II-7, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment II-7, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

In the zoom lens system according to Embodiment II-7, the third lens unit G3, in order from the object side to the image side, comprises: a positive meniscus seventh lens element L7 with the convex surface facing the object side; a positive meniscus eighth lens element L8 with the convex surface facing the object side; and a negative meniscus ninth lens element L9 with the convex surface facing the object side. Among these, the eighth lens element L8 and the ninth lens element L9 are cemented with each other. In the surface data in the corresponding numerical example described later, surface number 17 indicates the cement layer between the eighth lens element L8 and the ninth lens element L9. Further, the eighth lens element L8 has an aspheric object side surface.

Further, in the zoom lens system according to Embodiment II-7, the fourth lens unit G4 comprises solely a bi-convex tenth lens element L10. The tenth lens element L10 has two aspheric surfaces.

Here, in the zoom lens system according to Embodiment II-7, a plane parallel plate P is provided on the object side relative to the image surface S (between the image surface S and the tenth lens element L10).

In the zoom lens system according to Embodiment II-7, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 50:
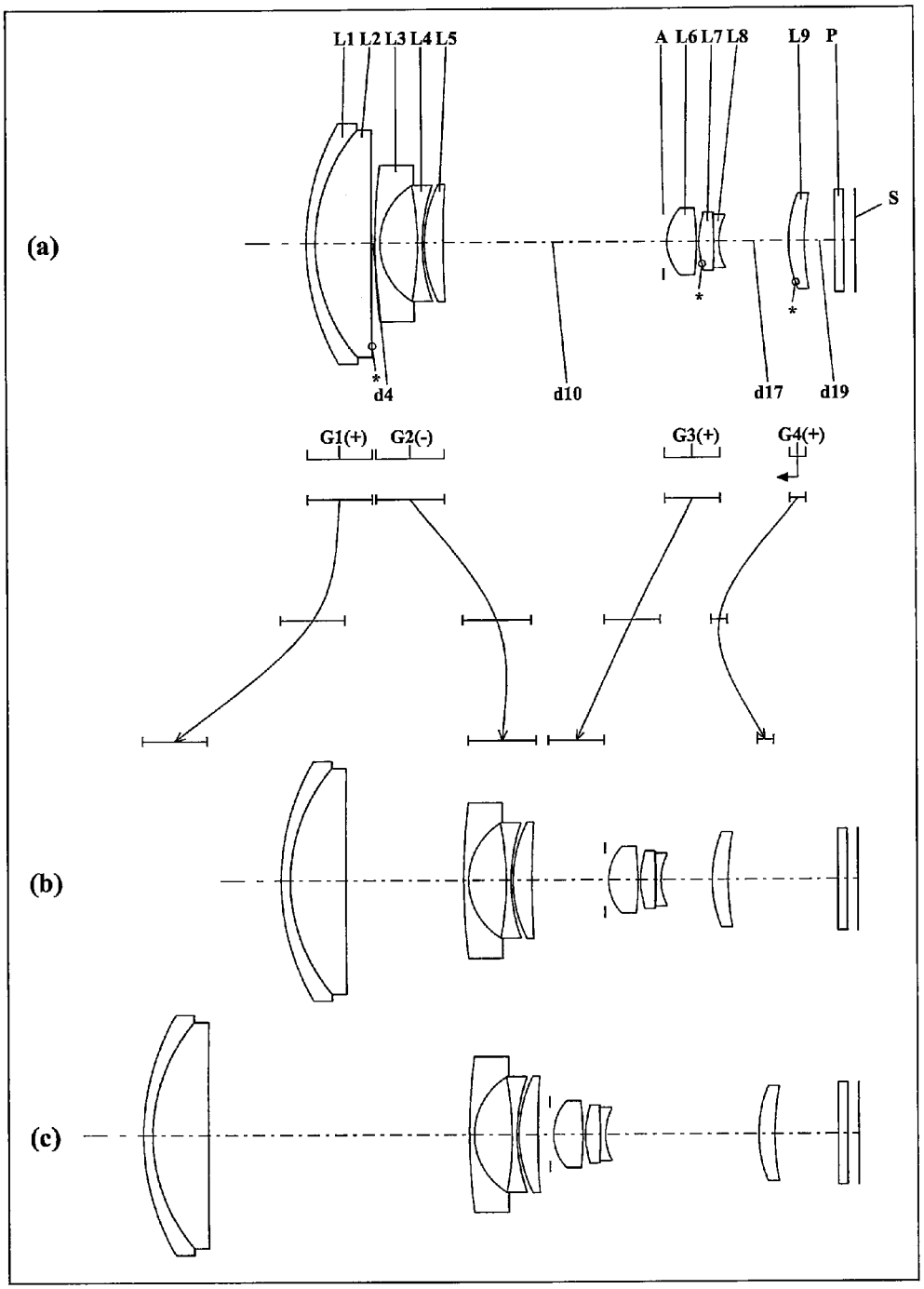
FIGS. 50(a)-(c) are a lens arrangement diagram showing an infinity in-focus condition of a zoom lens system according to Embodiment II-8 (Example II-8)
Figure 51:
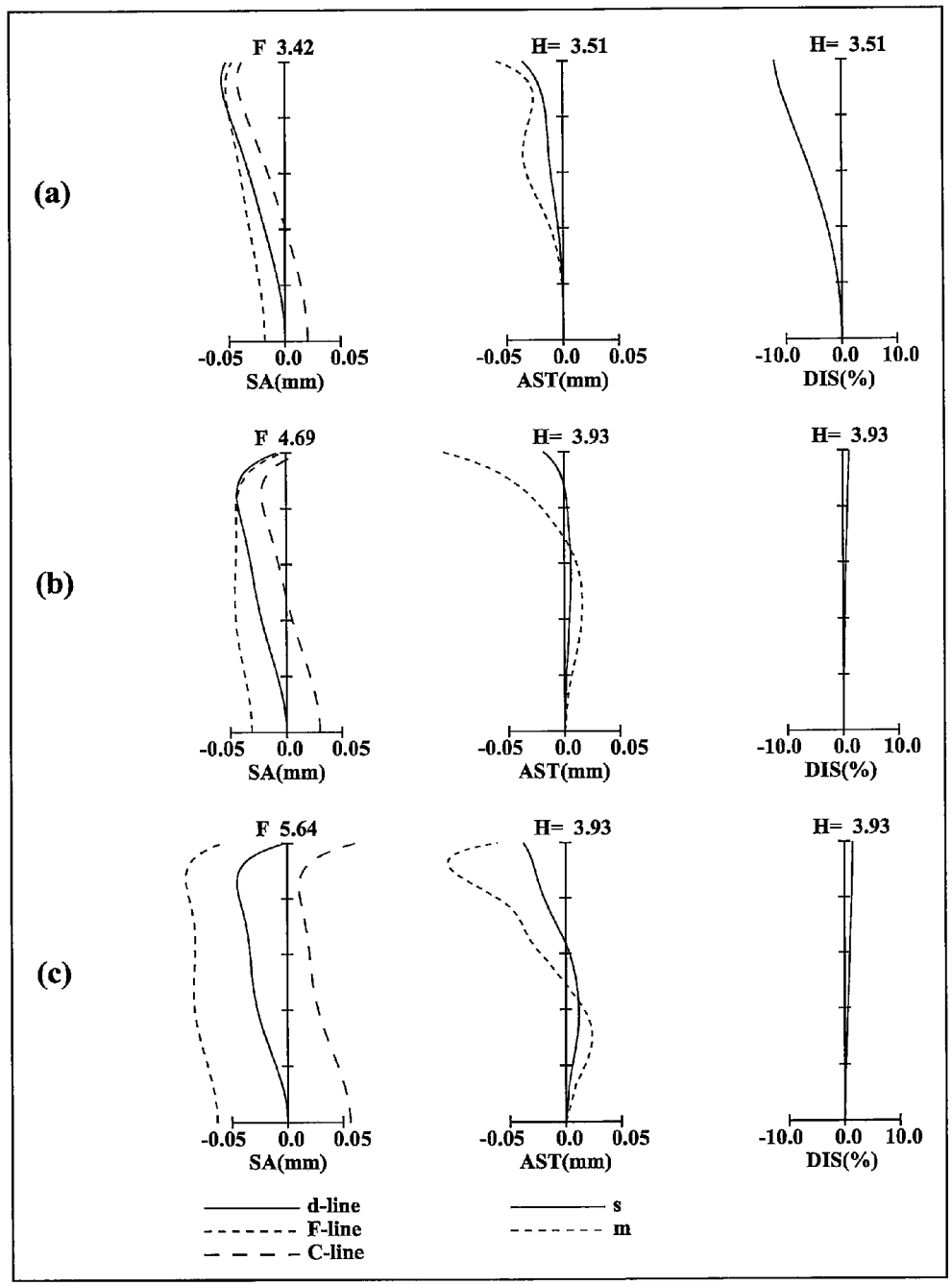
FIGS. 51(a)-(c) are a longitudinal aberration diagram of an infinity in-focus condition of a zoom lens system according to Example II-8.
Figure 52:
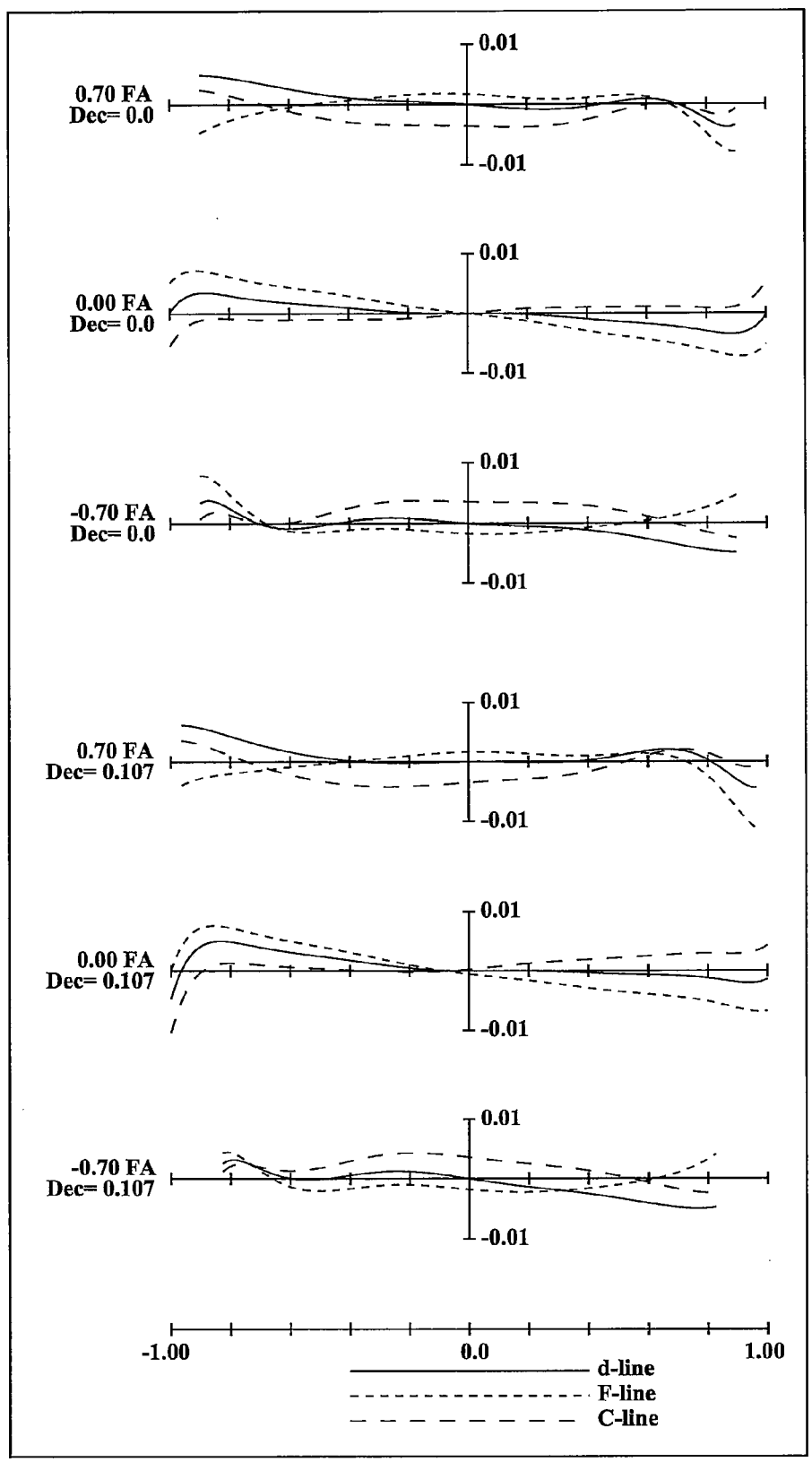
FIG. 52 is a lateral aberration diagram of a zoom lens system according to Example II-8 at a telephoto limit in a basic state where image blur compensation is not performed and in a blur compensation state.

As shown in FIG. 50, in the zoom lens system according to Embodiment II-8, the first lens unit G1, in order from the object side to the image side, comprises: a negative meniscus first lens element L1 with the convex surface facing the object side; and a planer-convex second lens element L2 with the convex surface facing the object side. The first lens element L1 and the second lens element L2 are cemented with each other. In the surface data in the corresponding numerical example described later, surface number 2 indicates the cement layer between the first lens element L1 and the second lens element L2. Further, the second lens element L2 has an aspheric image side surface.

In the zoom lens system according to Embodiment II-8, the second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side.

Further, in the zoom lens system according to Embodiment II-8, the third lens unit G3, in order from the object side to the image side, comprises: a bi-convex sixth lens element L6; a bi-convex seventh lens element L7; and a bi-concave eighth lens element L8. Among these, the seventh lens element L7 and the eighth lens element L8 are cemented with each other. In the surface data in the corresponding numerical example described later, surface number 15 indicates the cement layer between the seventh lens element L7 and the eighth lens element L8. Further, the seventh lens element L7 has an aspheric object side surface.

Moreover, in the zoom lens system according to Embodiment II-8, the fourth lens unit G4 comprises solely a positive meniscus ninth lens element L9 with the convex surface facing the object side. The ninth lens element L9 has an aspheric object side surface.

Here, in the zoom lens system according to Embodiment II-8, a plane parallel plate P is provided on the object side relative to the image surface S (between the image surface S and the ninth lens element L9).

In the zoom lens system according to Embodiment II-8, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 53:
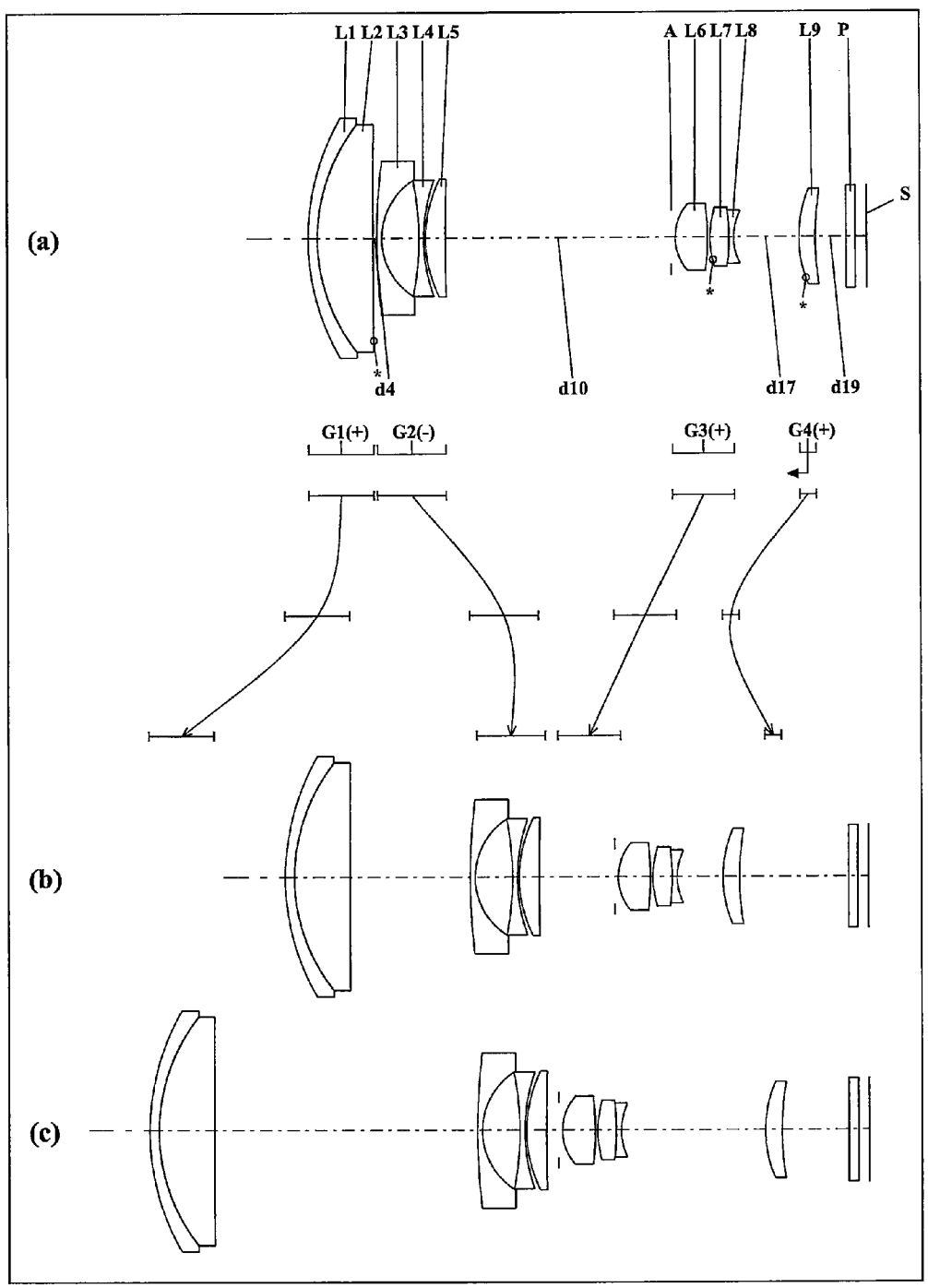
FIGS. 53(a)-(c) are a lens arrangement diagram showing an infinity in-focus condition of a zoom lens system according to Embodiment II-9 (Example II-9)
Figure 54:
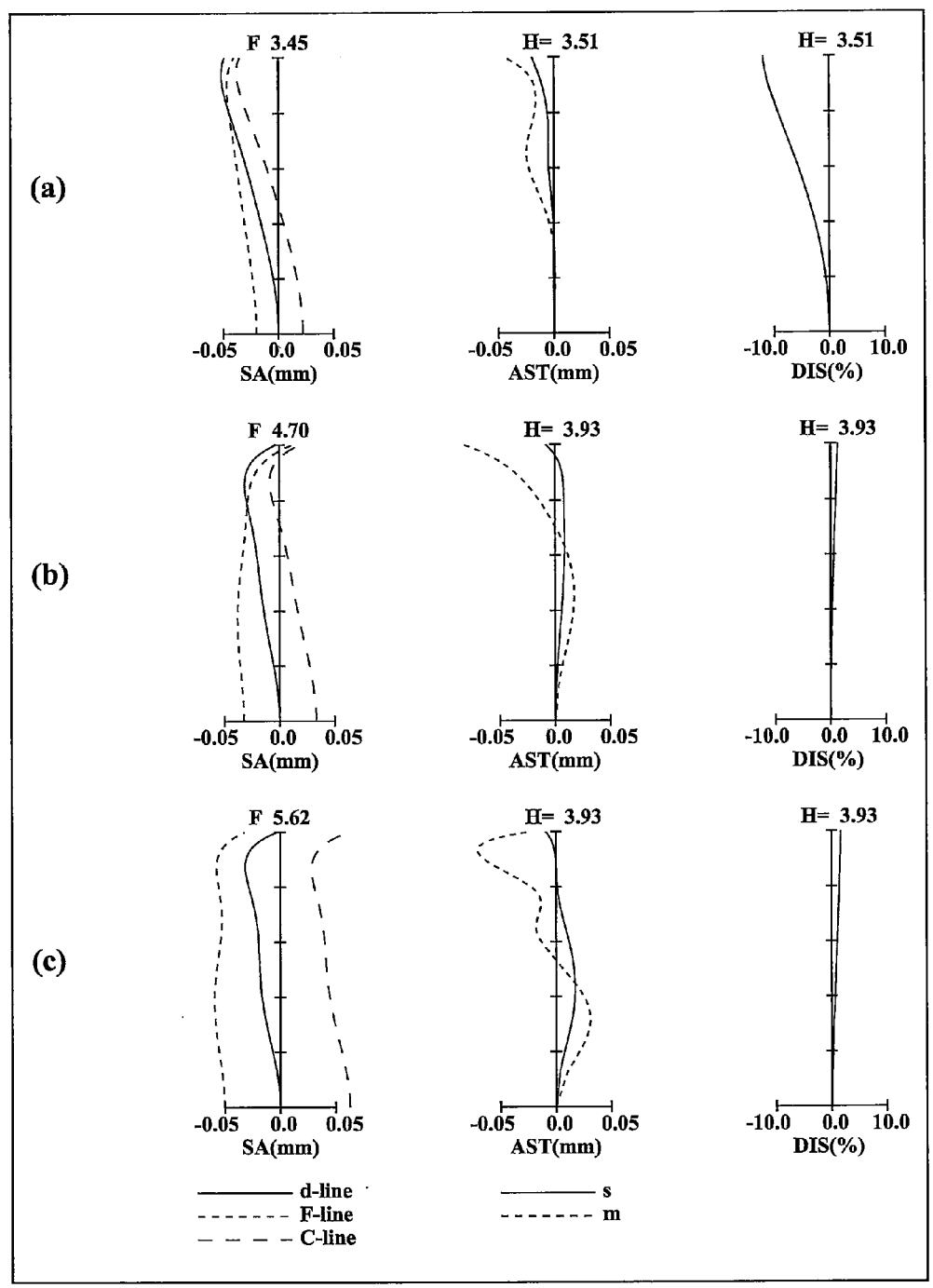
FIGS. 54(a)-(c) are a longitudinal aberration diagram of an infinity in-focus condition of a zoom lens system according to Example II-9.
Figure 55:
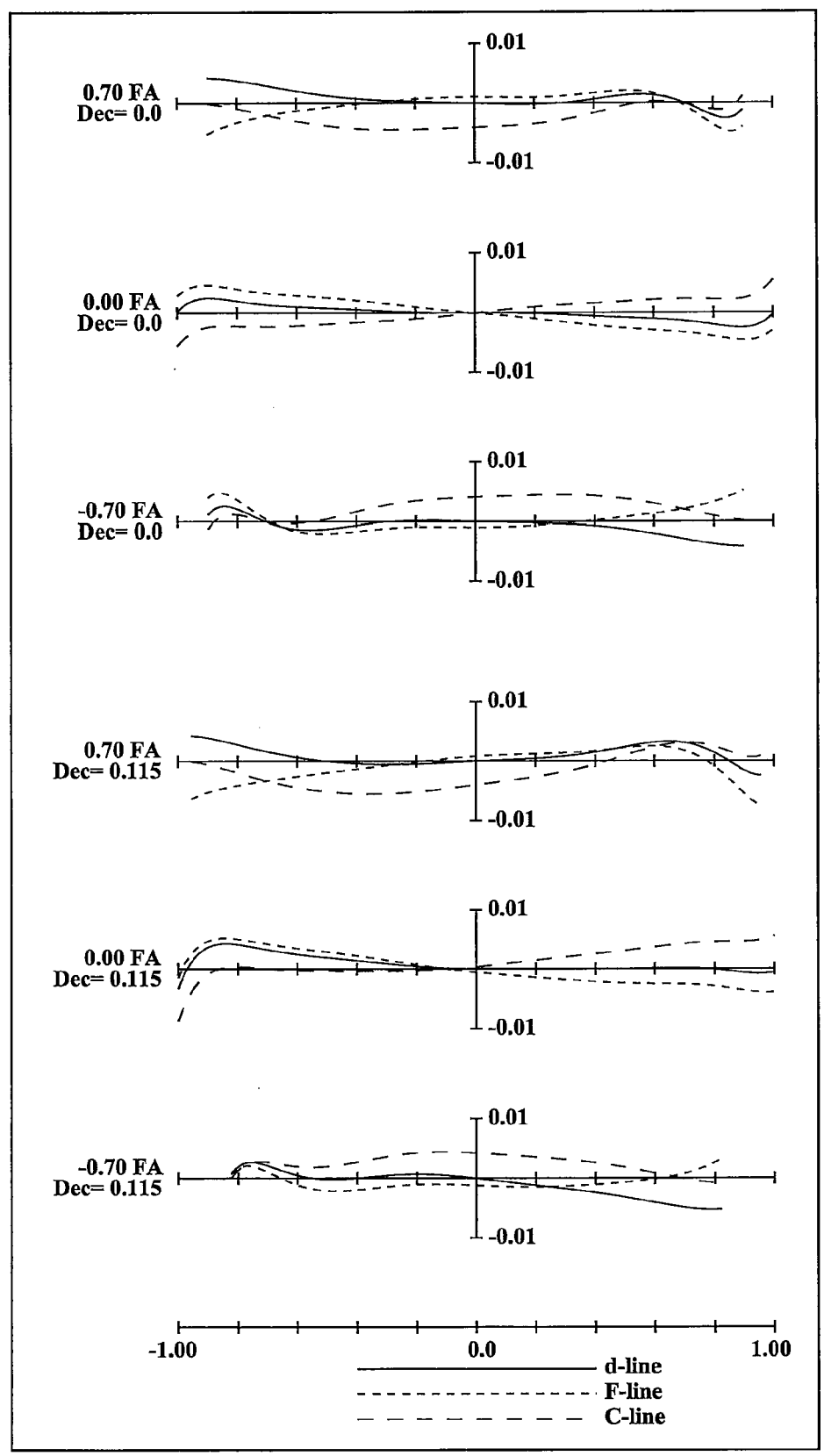
FIG. 55 is a lateral aberration diagram of a zoom lens system according to Example II-9 at a telephoto limit in a basic state where image blur compensation is not performed and in a blur compensation state.

As shown in FIG. 53, in the zoom lens system according to Embodiment II-9, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. In the surface data in the corresponding numerical example described later, surface number 2 indicates the cement layer between the first lens element L1 and the second lens element L2. Further, the second lens element L2 has an aspheric image side surface.

In the zoom lens system according to Embodiment II-9, the second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side.

Further, in the zoom lens system according to Embodiment II-9, the third lens unit G3, in order from the object side to the image side, comprises: a bi-convex sixth lens element L6; a bi-convex seventh lens element L7; and a bi-concave eighth lens element L8. Among these, the seventh lens element L7 and the eighth lens element L8 are cemented with each other. In the surface data in the corresponding numerical example described later, surface number 15 indicates the cement layer between the seventh lens element L7 and the eighth lens element L8. Further, the seventh lens element L7 has an aspheric object side surface.

Moreover, in the zoom lens system according to Embodiment II-9, the fourth lens unit G4 comprises solely a positive meniscus ninth lens element L9 with the convex surface facing the object side. The ninth lens element L9 has an aspheric object side surface.

Here, in the zoom lens system according to Embodiment II-9, a plane parallel plate P is provided on the object side relative to the image surface S (between the image surface S and the ninth lens element L9).

In the zoom lens system according to Embodiment II-9, in zooming from a wide-angle limit to a telephoto limit at the time of image taking, the first lens unit G1 and the third lens unit G3 move to the object side. Further, the second lens unit G2 moves to the image side, while the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

In the zoom lens system according to Embodiments II-1 to II-9, the first lens unit G1 is composed of three or two lens elements while the second lens unit G2 is composed of three lens elements. Thus, the lens system has a short overall length.

In the zoom lens system according to Embodiments II-1 to II-7, the first lens unit G1, in order from the object side to the image side, comprises a negative meniscus lens element L1 with the convex surface facing the object side, a positive meniscus lens element L2 with the convex surface facing the object side, and a positive meniscus lens element L3 with the convex surface facing the object side. Further, among these, the negative meniscus lens element L1 and the positive meniscus lens element L2 are cemented with each other so that a cemented lens element is formed. This realizes a compact lens system. Further, in the zoom lens system according to Embodiments II-8 to II-9, the first lens unit G1, in order from the object side to the image side, comprises a negative meniscus first lens element L1 with the convex surface facing the object side, and a planer-convex second lens element L2 with the convex surface facing the object side or a bi-convex second lens element L2. Then, the first lens elements L1 and the second lens element L2 are cemented with each other so that a cemented lens element is formed. This realizes a compact lens system. In the zoom lens system according to Embodiments II-1 to II-9, such a configuration permits satisfactory compensation of chromatic aberration.

In the zoom lens system according to Embodiments II-1 to II-8, each surface of the three or two lens elements constituting the first lens unit G1 and the three lens elements constituting the second lens unit G2 has a positive radius of curvature except for the object side surface of the fifth lens element L5 or the object side surface of the fourth lens element L4 arranged in the center of the second lens unit G2. Thus, in a state that a compact lens system is realized, compensation of curvature of field is achieved.

In the zoom lens system according to Embodiments II-1 to II-9, the third lens unit G3 includes at least one lens element having negative optical power and having a concave image side surface. This permits satisfactory compensation of spherical aberration, coma aberration and chromatic aberration.

In the zoom lens system according to Embodiments II-1 to II-5 and II-7, the third lens unit G3, in order from the object side to the image side, comprises a seventh lens element L7 having positive optical power, an eighth lens element L8 having an aspheric object side surface and having positive optical power, and a ninth lens element L9 having negative optical power. Further, the eighth lens element L8 serving as a positive lens element on the image side and the ninth lens element L9 are cemented with each other so that a cemented lens element is formed. This permits remarkably satisfactory compensation of spherical aberration, coma aberration and chromatic aberration. Further, in the zoom lens system according to Embodiments II-8 to II-9, the third lens unit G3, in order from the object side to the image side, includes a sixth lens element L6 having positive optical power, a seventh lens element L7 having an aspheric object side surface and having positive optical power, and an eighth lens element L8 having negative optical power. Furthermore, the seventh lens element L7 serving as a positive lens element located at the second position on the object side and the eighth lens element L8 are cemented with each other so that a cemented lens element is formed. This permits remarkably satisfactory compensation of spherical aberration, coma aberration and chromatic aberration.

In the zoom lens system according to Embodiments II-1 to II-9, the fourth lens unit G4 also is composed of one lens element, and this lens element has positive optical power. This realizes a lens system having a short overall length. Further, at the time of focusing change from an infinite-distance object to a short-distance object, as shown in each FIG., the fourth lens unit G4 is drawn out to the object side so that rapid focusing is achieved easily. Further, in the zoom lens system according to Embodiments II-1 to II-7, the one lens element constituting the fourth lens unit G4 has two aspheric surfaces. This permits satisfactory compensation of curvature of off-axial field over the range from a wide-angle limit to a telephoto limit.

Further, in the zoom lens system according to Embodiments II-1 to II-9, in zooming from a wide-angle limit to a telephoto limit at the time of image taking, the first lens unit G1, the second lens unit G2, the third lens unit G3 and the fourth lens unit G4 are moved individually along the optical axis so that zooming is achieved. Then, any lens unit among the first lens unit G1, the second lens unit G2, the third lens unit G3 and the fourth lens unit G4, or alternatively a sub lens unit consisting of a part of a lens unit is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the third lens unit G3 is moved in a direction perpendicular to the optical axis, so that image blur is compensated in a state that size increase in the entire zoom lens system is suppressed and a compact construction is realized and that excellent imaging characteristics such as small decentering coma aberration and decentering astigmatism are satisfied.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

The following description is given for conditions preferred to be satisfied by a zoom lens system like the zoom lens system according to Embodiments I-1 to I-10, and a zoom lens system like the zoom lens system according to Embodiments II-1 to II-9. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect is obtained.

In a zoom lens system like the zoom lens system according to Embodiments I-1 to I-10, in order from the object side to the image side, comprising a first lens unit having positive optical power, a second lens unit having negative optical power, a third lens unit having positive optical power, and a fourth lens unit having positive optical power, wherein the first lens unit is composed of three or fewer lens elements, and wherein the second lens unit is composed of three lens elements (this lens configuration is referred to as basic configuration I of the embodiment, hereinafter), the following conditions (2), (a-1) and (b) are satisfied.

$$2.00 \leq D/f_W \leq 4.68 \quad (2)$$

$$\omega_W \geq 35 \quad (a\text{-}1)$$

$$f_T/f_W \geq 10 \quad (b)$$

where,

D is a total of an optical axial thickness of each lens unit, $\omega_W$ is a half view angle (°) at a wide-angle limit, $f_T$ is a focal length of the entire system at a telephoto limit, and $f_W$ is a focal length of the entire system at a wide-angle limit.

The condition (2) sets forth the total of the optical axial thicknesses of the first lens unit, the second lens unit, the third lens unit and the fourth lens unit. When the value goes below the lower limit of the condition (2), the view angle at a wide-angle limit becomes excessively narrow, and hence the aimed wide-angle property cannot be achieved. In contrast, when the value exceeds the upper limit of the condition (2), the total of the optical axial thickness of each lens unit becomes large, and hence the overall length of lens system becomes long at the time of retraction. This causes difficulty in realizing a compact zoom lens system.

When the following condition (2)' is satisfied, the above-mentioned effect is achieved more successfully.

$$3.00 \leq D/f_W \quad (2)'$$

In a zoom lens system like the zoom lens system according to Embodiments II-1 to II-9, in order from the object side to the image side, comprising a first lens unit having positive optical power, a second lens unit having negative optical power, a third lens unit having positive optical power, and a fourth lens unit having positive optical power, wherein the first lens unit is composed of three or fewer lens elements, and wherein the second lens unit is composed of three lens elements (this lens configuration is referred to as basic configuration II of the embodiment, hereinafter), the following conditions (3), (4), (a-1) and (b) are satisfied.

$$8.50 \leq L_W/I_r \leq 11.85 \quad (3)$$

$$11.50 \leq L_T/I_r \leq 15.84 \quad (4)$$

$$\omega_W \geq 35 \quad (a\text{-}1)$$

$$f_T/f_W \geq 10 \quad (b)$$

where, $L_W$ is an overall length of lens system at a wide-angle limit (a distance from the most object side surface of the first lens unit to the image surface), $L_T$ is an overall length of lens system at a telephoto limit (a distance from the most object side surface of the first lens unit to the image surface), $I_r$ is a maximum image height, $\omega_W$ is a half view angle (°) at a wide-angle limit, $f_T$ is a focal length of the entire system at a telephoto limit, and $f_W$ is a focal length of the entire system at a wide-angle limit.

The condition (3) sets forth the relation between the overall length of the zoom lens system at a wide-angle limit and the maximum image height. When the value goes below the lower limit of the condition (3), it is necessary to reduce the number of lens elements, and hence compensation of various aberrations in each lens unit becomes difficult. In contrast, when the value exceeds the upper limit of the condition (3), tendency for the overall length of the zoom lens system at a wide-angle limit to be long becomes significant. This causes difficulty in realizing a compact zoom lens system.

When the following condition (3)' is satisfied, the above-mentioned effect is achieved more successfully.

$$10.00 \leq L_W/I_r \quad (3)'$$

The condition (4) sets forth the relation between the overall length of the zoom lens system at a telephoto limit and the maximum image height. When the value goes below the lower limit of the condition (4), it is necessary to reduce the number of lens elements, and hence compensation of various aberrations in each lens unit becomes difficult. In contrast, when the value exceeds the upper limit of the condition (4), tendency for the overall length of the zoom lens system at a telephoto limit to be long becomes significant. This causes difficulty in realizing a compact zoom lens system.

When the following condition (4)' is satisfied, the above-mentioned effect is achieved more successfully.

$$13.00 \leq L_T/I_r \quad (4)'$$

In a zoom lens system having the basic configuration I like the zoom lens system according to Embodiments I-1 to I-10, and in a zoom lens system having the basic configuration II like the zoom lens system according to Embodiments II-1 to II-9, it is preferable that the following condition (10) is satisfied.

$$4.00 \leq m_{2T}/m_{2W} \leq 8.00 \quad (10)$$

where, $m_{2T}$ is a lateral magnification of the second lens unit at a telephoto limit in an infinity in-focus condition, and $m_{2W}$ is a lateral magnification of the second lens unit at a wide-angle limit in an infinity in-focus condition.

The condition (10) sets forth magnification change in the second lens unit, and substantially optimizes a variable magnification load to the second lens unit during zooming. When the value falls outside the range of the condition (10), the variable magnification load to the second lens unit becomes inappropriate. This can cause difficulty in constructing a compact zoom lens system having satisfactory optical performance.

Here, when at least one of the following conditions (10)' and (10)'' is satisfied, the above-mentioned effect is achieved more successfully.

$$4.50 \leq m_{2T}/m_{2W} \quad (10)'$$

$$m_{2T}/m_{2W} \leq 6.00 \quad (10)''$$

In a zoom lens system having the basic configuration I like the zoom lens system according to Embodiments I-1 to I-10, and in a zoom lens system having the basic configuration II like the zoom lens system according to Embodiments II-1 to II-9, it is preferable that the following condition (11) is satisfied.

$$1.00 \leq L_T/f_T \leq 2.00 \quad (11)$$

where, $L_T$ is an overall length of lens system at a telephoto limit (a distance from the most object side surface of the first lens unit to the image surface), and $f_T$ is a focal length of the entire system at a telephoto limit.

The condition (11) sets forth the overall length of the zoom lens system at a telephoto limit. When the value goes below the lower limit of the condition (11), the refractive power of each lens unit is excessively strong. Thus, various kinds of aberration of each lens unit increases, and hence causes a possibility that aberration compensation becomes difficult. In contrast, when the value exceeds the upper limit of the condition (11), the refractive power of each lens unit is weak. Thus, in order that a high variable magnification ratio should be achieved, a larger amount of movement is necessary in each lens unit. Thus, a possibility arises that compactness is difficult to be realized.

Here, when at least one of the following conditions (11)' and (11)'' is satisfied, the above-mentioned effect is achieved more successfully.

$$1.10 \leq L_T/f_T \quad (11)''$$

$$L_T/f_T \leq 1.37 \quad (11)''$$

In a zoom lens system having the basic configuration I like the zoom lens system according to Embodiments I-1 to I-10, and in a zoom lens system having the basic configuration II like the zoom lens system according to Embodiments II-1 to II-9, it is preferable that the following condition (12) is satisfied.

$$1.00 \leq f_T/f_{G1} \leq 2.00 \quad (12)$$

where, $f_{G1}$ is a composite focal length of the first lens unit, and $f_T$ is a focal length of the entire system at a telephoto limit.

The condition (12) sets forth a suitable focal length of the first lens unit. When the value goes below the lower limit of the condition (12), the refractive power of the first lens unit is weak. Thus, in order that a high variable magnification ratio should be achieved, a larger amount of movement is necessary in the second lens unit. Thus, a possibility arises that compactness is difficult to be realized. In contrast, when the value exceeds the upper limit of the condition (12), the refractive power of the first lens unit is excessively strong. This causes an increase in various kinds of aberration, and hence causes a possibility that compensation of axial chromatic aberration becomes difficult especially at a telephoto limit.

Here, when at least one of the following conditions (12)' and (12)'' is satisfied, the above-mentioned effect is achieved more successfully.

$$1.40 \leq f_T/f_{G1} \quad (12)'$$

$$f_T/f_{G1} \leq 1.70 \quad (12)''$$

In a zoom lens system having the basic configuration I like the zoom lens system according to Embodiments I-1 to I-10, and in a zoom lens system having the basic configuration II like the zoom lens system according to Embodiments II-1 to II-9, it is preferable that the following condition (13) is satisfied.

$$1.00 \leq L_W/f_{G1} \leq 2.00 \quad (13)$$

where, $L_W$ is an overall length of lens system at a wide-angle limit (a distance from the most object side surface of the first lens unit to the image surface), and $f_{G1}$ is a composite focal length of the first lens unit.

The condition (13) sets forth the ratio between the overall length of the zoom lens system at a wide-angle limit and the focal length of the first lens unit. When the value goes below the lower limit of the condition (13), the refractive power of the first lens unit is excessively weak, and hence the refractive power of the second lens unit becomes weak. This causes an increase in the necessary amount of movement of the second lens unit. As a result, the position of the first lens unit at a wide-angle limit is relatively located to the object side. This causes an increase in the necessary outer diameter of the first lens unit for achieving the wide-angle property. Thus, a possibility arises that compactness is difficult to be realized. In contrast, when the value exceeds the upper limit of the condition (13), the refractive power of the first lens unit is excessively strong. Thus, a possibility arises that compensation of curvature of field becomes difficult especially at a wide-angle limit.

Here, when at least one of the following conditions (13)' and (13)'' is satisfied, the above-mentioned effect is achieved more successfully.

$$1.30 \leq L_W/f_{G1} \quad (13)'$$

$$L_W/f_{G1} \leq 1.50 \quad (13)'$$

In a zoom lens system having the basic configuration I like the zoom lens system according to Embodiments I-1 to I-10, and in a zoom lens system having the basic configuration II like the zoom lens system according to Embodiments II-1 to II-9, it is preferable that the following condition (14) is satisfied.

$$1.50 \leq L_T/f_{G1} \leq 2.00 \quad (14)$$

where, $L_T$ is an overall length of lens system at a telephoto limit (a distance from the most object side surface of the first lens unit to the image surface), and $f_{G1}$ is a composite focal length of the first lens unit.

The condition (14) sets forth the ratio between the overall length of the zoom lens system at a telephoto limit and the focal length of the first lens unit. When the value goes below the lower limit of the condition (14), the refractive power of the first lens unit is weak. Thus, in order that a high variable magnification ratio should be achieved, a larger amount of movement is necessary in the second lens unit. Thus, a possibility arises that compactness is difficult to be realized. In contrast, when the value exceeds the upper limit of the condition (14), the refractive power of the first lens unit is excessively strong. This causes an increase in various kinds of aberration, and hence causes a possibility that compensation of axial chromatic aberration becomes difficult especially at a telephoto limit.

Here, when at least one of the following conditions (14)' and (14)'' is satisfied, the above-mentioned effect is achieved more successfully.

$$1.60 \leq L_T/f_{G1} \quad (14)'$$

$$L_T/f_{G1} \leq 1.80 \quad (14)''$$

In a zoom lens system having the basic configuration I like the zoom lens system according to Embodiments I-1 to I-10, and in a zoom lens system having the basic configuration II like the zoom lens system according to Embodiments II-1 to II-9, it is preferable that the following condition (15) is satisfied.

$$4.50 \leq f_{G1}/|f_{G2}| \leq 7.00 \qquad (15)$$

where, $f_{G1}$ is a composite focal length of the first lens unit, and $f_{G2}$ is a composite focal length of the second lens unit.

The condition (15) sets forth the ratio of the focal lengths of the first lens unit and the second lens unit. When the value goes below the lower limit of the condition (15), the focal length of the first lens unit becomes excessively small relatively. This causes difficulty in maintaining the variable magnification function of the second lens unit, and hence can cause difficulty in constructing a zoom lens system having a zooming ratio of 10 or greater in a state that satisfactory optical performance is obtained. In contrast, when the value exceeds the upper limit of the condition (15), the focal length of the second lens unit becomes excessively small relatively. This can cause difficulty in compensating aberration generated in the second lens unit.

Here, when at least one of the following conditions (15)' and (15)" is satisfied, the above-mentioned effect is achieved more successfully.

$$5.00 \leq f_{G1}/|f_{G2}| \qquad (15)'$$

$$f_{G1}/|f_{G2}| \leq 6.00 \qquad (15)''$$

Each lens unit constituting the zoom lens system according to Embodiments I-1 to I-10 and the zoom lens system according to Embodiments II-1 to II-9 is composed exclusively of refractive type lens elements that deflect the incident light by refraction (that is, lens elements of a type in which deflection is achieved at the interface between media each having a distinct refractive index). However, the present invention is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the fourth lens unit G4), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiment I-11

Figure 29:
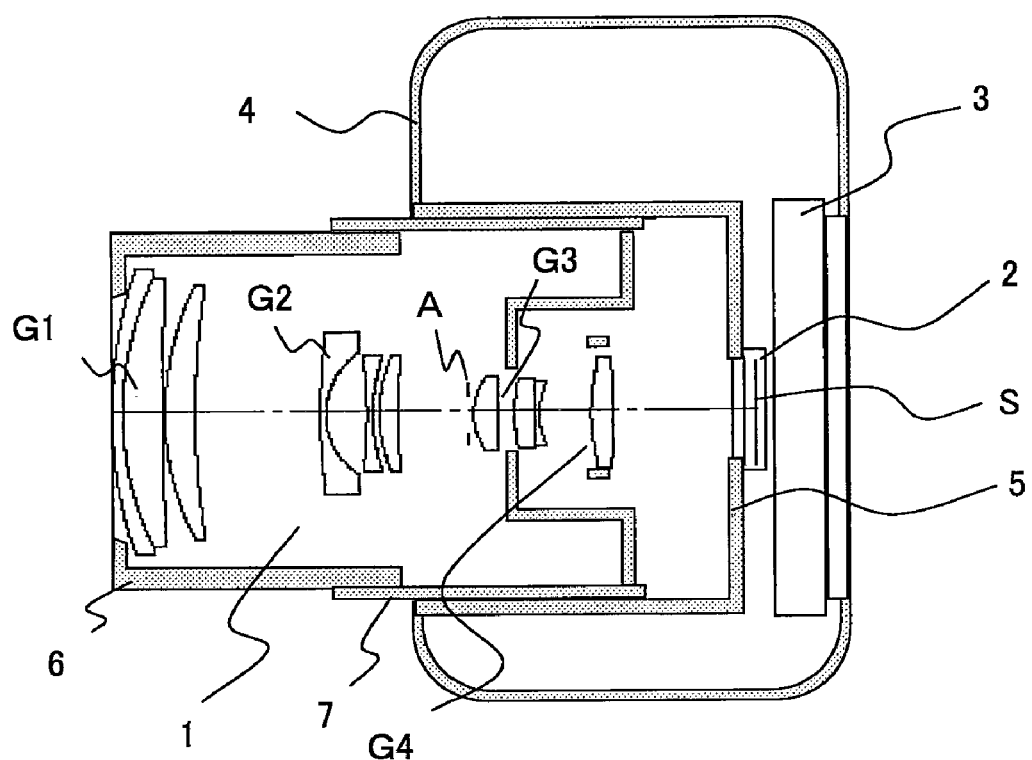
FIG. 29 is a schematic construction diagram of a digital still camera according to Embodiment I-11.

FIG. 29 is a schematic construction diagram of a digital still camera according to Embodiment I-11. In FIG. 29, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment I-7. In FIG. 29, the zoom lens system 1 comprises a first lens unit G1, a second lens unit G2, an aperture diaphragm A, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the aperture diaphragm A, the third lens unit G3 and the fourth lens unit G4 move to predetermined positions relative to the image sensor 2, so that zooming from a wide-angle limit to a telephoto limit is achieved. The fourth lens unit G4 is movable in an optical axis direction by a motor for focus adjustment.

As such, when the zoom lens system according to Embodiment I-7 is employed in a digital still camera, a small digital still camera is obtained that has a high resolution and high capability of compensating the curvature of field and that has a short overall length of lens system at the time of non-use. Here, in the digital still camera shown in FIG. 29, any one of the zoom lens systems according to Embodiments I-1 to I-6 and I-8 to I-10 may be employed in place of the zoom lens system according to Embodiment I-7. Further, the optical system of the digital still camera shown in FIG. 29 is applicable also to a digital video camera for moving images. In this case, moving images with high resolution can be acquired in addition to still images.

Here, the digital still camera according to the present Embodiment I-11 has been described for a case that the employed zoom lens system 1 is a zoom lens system according to Embodiments I-1 to I-10. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments I-1 to I-10.

Further, Embodiment I-11 has been described for a case that the zoom lens system is applied to a lens barrel of so-called barrel retraction construction. However, the present invention is not limited to this. For example, the zoom lens system may be applied to a lens barrel of so-called bending construction where a prism having an internal reflective surface or a front surface reflective mirror is arranged at an arbitrary position within the first lens unit G1 or the like. Further, in Embodiment I-11, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of retraction.

Further, an imaging device comprising a zoom lens system according to

Embodiments I-1 to I-10 described above and an image sensor such as a CCD or a CMOS may be applied to a mobile telephone, a PDA (Personal Digital Assistance), a surveillance camera in a surveillance system, a Web camera, a vehicle-mounted camera or the like.

Embodiment II-10

Figure 56:
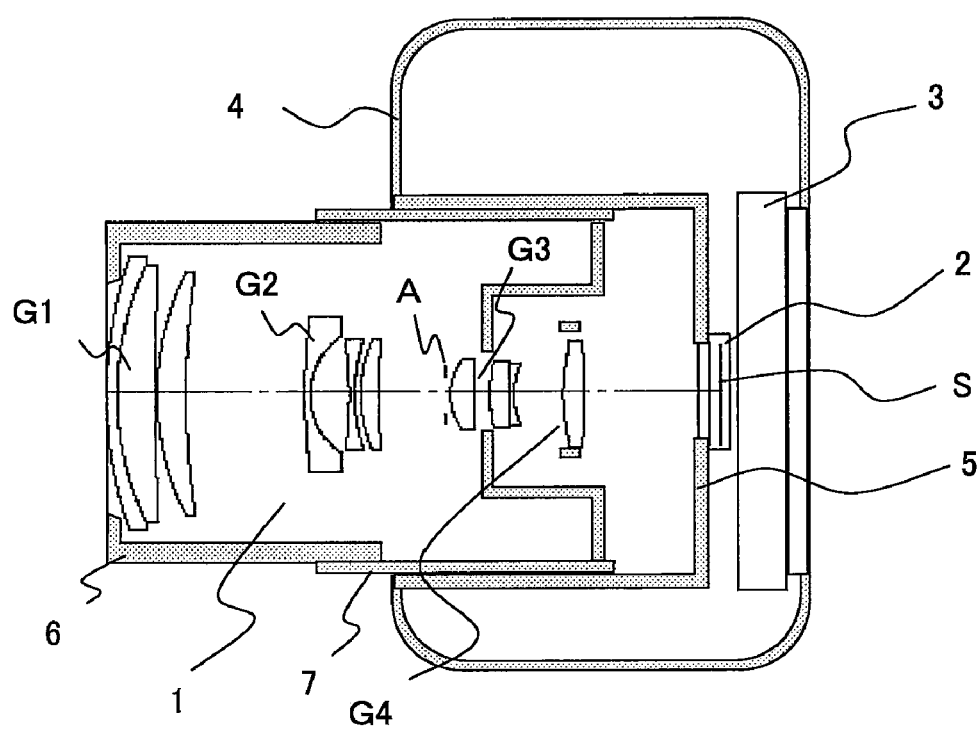
FIG. 56 is a schematic construction diagram of a digital still camera according to Embodiment II-10.

FIG. 56 is a schematic construction diagram of a digital still camera according to Embodiment II-10. In FIG. 56, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment II-7. In FIG. 56, the zoom lens system 1 comprises a first lens unit G1, a second lens unit G2, an aperture diaphragm A, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the aperture diaphragm A, the third lens unit G3 and the fourth lens unit G4 move to predetermined positions relative to the image sensor 2, so that zooming from a wide-angle limit to a telephoto limit is achieved. The fourth lens unit G4 is movable in an optical axis direction by a motor for focus adjustment.

As such, when the zoom lens system according to Embodiment II-7 is employed in a digital still camera, a small digital still camera is obtained that has a high resolution and high capability of compensating the curvature of field and that has a short overall length of lens system at the time of non-use. Here, in the digital still camera shown in FIG. 56, any one of the zoom lens systems according to Embodiments II-1 to II-6 and II-8 to II-9 may be employed in place of the zoom lens system according to Embodiment II-7. Further, the optical system of the digital still camera shown in FIG. 56 is applicable also to a digital video camera for moving images. In this case, moving images with high resolution can be acquired in addition to still images.

Here, the digital still camera according to the present Embodiment II-10 has been described for a case that the employed zoom lens system 1 is a zoom lens system according to Embodiments II-1 to II-9. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments II-1 to II-9.

Further, Embodiment II-10 has been described for a case that the zoom lens system is applied to a lens barrel of so-called barrel retraction construction. However, the present invention is not limited to this. For example, the zoom lens system may be applied to a lens barrel of so-called bending construction where a prism having an internal reflective surface or a front surface reflective mirror is arranged at an arbitrary position within the first lens unit G1 or the like. Further, in Embodiment II-10, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of retraction.

Further, an imaging device comprising a zoom lens system according to Embodiments II-1 to II-9 described above and an image sensor such as a CCD or a CMOS may be applied to a mobile telephone, a PDA (Personal Digital Assistance), a surveillance camera in a surveillance system, a Web camera, a vehicle-mounted camera or the like.

Numerical embodiments are described below in which the zoom lens systems according to Embodiments I-1 to I-10 and the zoom lens systems according to Embodiments II-1 to II-9 are implemented respectively. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1+\sqrt{1-(1+\kappa)(h/r)^2}} + A4h^4 + A6h^6 + A8h^8 + A10h^{10} + A12h^{12} + A14h^{14} + A16h^{16}$$

Here, κ is the conic constant, A4, A6, A8, A10, A12, A14 and A16 are a fourth-order, sixth-order, eighth-order, tenth-order, twelfth-order, fourteenth-order and sixteenth-order aspherical coefficients, respectively.

FIGS. 2, 5, 8, 11, 14, 16, 18, 21, 24 and 27 are longitudinal aberration diagrams of the zoom lens systems according to Embodiments I-1 to I-10, respectively.

FIGS. 31, 34, 37, 40, 43, 46, 48, 51 and 54 are longitudinal aberration diagrams of the zoom lens systems according to Embodiments II-1 to II-9, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each FIG., indicated as F), and the solid line, the short dash line and the long dash line indicate the characteristics to the d-line, the F-line and the C-line, respectively. In each astigmatism diagram, the vertical axis indicates the image height (in each FIG., indicated as H), and the solid line and the dash line indicate the characteristics to the sagittal plane (in each FIG., indicated as "s") and the meridional plane (in each FIG., indicated as "m"), respectively. In each distortion diagram, the vertical axis indicates the image height (in each FIG., indicated as H).

FIGS. 3, 6, 9, 12, 19, 22, 25 and 28 are lateral aberration diagrams of the zoom lens systems at a telephoto limit according to Embodiments I-1, I-2, I-3, I-4, I-7, I-8, I-9 and I-10, respectively.

FIGS. 32, 35, 38, 41, 44, 49, 52 and 55 are lateral aberration diagrams of the zoom lens systems at a telephoto limit according to Embodiments II-1, II-2, II-3, II-4, II-5, II-7, II-8 and II-9, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entire third lens unit G3 is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

Here, in the zoom lens system according to each example, the amount of movement of the third lens unit G3 in a direction perpendicular to the optical axis in an image blur compensation state at a telephoto limit is as follows.

| Example | Amount of movement (mm) I- | Amount of movement (mm) II- |
|---|---|---|
| 1 | 0.137 | 0.135 |
| 2 | 0.144 | 0.136 |
| 3 | 0.142 | 0.138 |
| 4 | 0.142 | 0.139 |
| 5 | — | 0.144 |
| 6 | — | — |
| 7 | 0.135 | 0.135 |
| 8 | 0.182 | 0.107 |
| 9 | 0.107 | 0.115 |
| 10 | 0.115 | — |

Here, when the shooting distance is infinity, at a telephoto limit, the amount of image decentering in a case that the zoom lens system inclines by 0.3° is equal to the amount of image decentering in a case that the entire third lens unit G3 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in a basic state, all have a small degree of curvature and almost the same inclination in the aberration curve. Thus, decentering coma aberration and decentering astigmatism are small. This indicates that sufficient imaging performance is obtained even in an image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

NUMERICAL EXAMPLE I-1

The zoom lens system of Numerical Example I-1 corresponds to Embodiment I-1 shown in FIG. 1. Table I-1 shows the surface data of the zoom lens system of Numerical Example I-1. Table I-2 shows the aspherical data. Table I-3 shows various data.

TABLE I-1

(Surface data)

| Surface number | r | d | nd | vd |
|---|---|---|---|---|
| Object surface | ∞ | | | |
| 1 | 28.95300 | 0.75000 | 1.84666 | 23.8 |
| 2 | 19.07400 | 0.01000 | 1.56732 | 42.8 |
| 3 | 19.07400 | 2.84700 | 1.49700 | 81.6 |
| 4 | 102.59900 | 0.15000 | | |
| 5 | 19.75500 | 2.17900 | 1.72916 | 54.7 |
| 6 | 63.58500 | Variable | | |
| 7 | 41.65600 | 0.40000 | 1.88300 | 40.8 |
| 8 | 5.19900 | 2.92000 | | |
| 9 | −29.77800 | 0.40000 | 1.78590 | 43.9 |
| 10 | 12.49200 | 0.47500 | | |
| 11 | 10.24000 | 1.33100 | 1.94595 | 18.0 |
| 12 | 46.29800 | Variable | | |
| 13(Diaphragm) | ∞ | 0.30000 | | |
| 14 | 4.30400 | 1.76700 | 1.49700 | 81.6 |
| 15 | 8241.75900 | 1.15600 | | |
| 16* | 8.55800 | 1.39900 | 1.80359 | 40.8 |
| 17 | 46.55400 | 0.01000 | 1.56732 | 42.8 |
| 18 | 46.55400 | 0.40000 | 1.84666 | 23.8 |
| 19 | 5.32600 | Variable | | |
| 20* | 11.65500 | 1.57800 | 1.51788 | 70.1 |
| 21* | −1903.05100 | Variable | | |
| 22 | ∞ | 0.78000 | 1.51680 | 64.2 |
| 23 | ∞ | (BF) | | |
| Image surface | ∞ | | | |

TABLE I-2

(Aspherical data)

Surface No. 16

K = −8.53000E−02, A4 = −1.79943E−03, A6 = −1.98982E−04, A8 = 6.52382E−05
A10 = −2.72130E−05, A12 = 5.37007E−06, A14 = −5.53606E−07, A16 = 2.29509E−08
Surface No. 20

K = 0.00000E+00, A4 = −6.55021E−04, A6 = 6.29639E−05, A8 = −8.78772E−06
A10 = 2.06133E−07, A12 = 1.31011E−08, A14 = −4.97108E−10, A16 = −5.00067E−13
Surface No. 21

K = 0.00000E+00, A4 = −7.19117E−04, A6 = 8.06908E−05, A8 = −1.39557E−05
A10 = 7.59747E−07, A12 = −1.68506E−08, A14 = 1.71944E−10, A16 = −5.16658E−13

TABLE I-3

(Various data)

Zooming ratio 11.03447

| Wide-angle limit | Middle position | Telephoto limit |
|---|---|---|

TABLE I-3-continued (Various data)

| | | | |
|---|---|---|---|
| Focal length | 4.3028 | 13.8628 | 47.4786 |
| F-number | 3.25644 | 4.28046 | 5.09375 |
| View angle | 41.6709 | 14.5348 | 4.2566 |
| Image height | 3.4000 | 3.6000 | 3.6000 |
| Overall length of lens system | 43.2052 | 45.3720 | 54.8214 |
| BF | 0.88493 | 0.87830 | 0.87516 |
| d6 | 0.3128 | 8.5714 | 18.1623 |
| d12 | 15.4915 | 4.8361 | 1.2400 |
| d19 | 3.6304 | 3.2810 | 12.8380 |
| d21 | 4.0336 | 8.9532 | 2.8539 |
| Entrance pupil position | 11.7985 | 30.6568 | 102.9723 |
| Exit pupil position | −14.2987 | −18.5579 | −54.6467 |
| Front principal points position | 14.8820 | 34.6320 | 109.8503 |
| Back principal points position | 38.9025 | 31.5092 | 7.3427 |

Single lens data

| Lens element | Initial surface number | Focal length |
|---|---|---|
| 1 | 1 | −68.4065 |
| 2 | 3 | 46.6152 |
| 3 | 5 | 38.4970 |
| 4 | 7 | −6.7623 |
| 5 | 9 | −11.1513 |
| 6 | 11 | 13.6543 |
| 7 | 14 | 8.6639 |
| 8 | 16 | 12.8378 |
| 9 | 18 | −7.1350 |
| 10 | 20 | 22.3745 |

Zoom lens unit data

| Lens unit | Initial surface No. | Focal length | Overall length of lens unit | Front principal points position | Back principal points position |
|---|---|---|---|---|---|
| 1 | 1 | 31.61710 | 5.93600 | 0.97969 | 3.18057 |
| 2 | 7 | −6.07545 | 5.52600 | 0.34993 | 1.33482 |
| 3 | 13 | 10.23904 | 5.03200 | −2.49736 | 0.38786 |
| 4 | 20 | 22.37451 | 1.57800 | 0.00633 | 0.54443 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.27462 | −0.43819 | −1.42149 |
| 3 | 13 | −0.69700 | −2.03619 | −1.38245 |
| 4 | 20 | 0.71100 | 0.49142 | 0.76416 |

NUMERICAL EXAMPLE I-2

The zoom lens system of Numerical Example I-2 corresponds to Embodiment I-2 shown in FIG. 4. Table I-4 shows the surface data of the zoom lens system of Numerical Example I-2. Table I-5 shows the aspherical data. Table I-6 shows various data.

TABLE I-4

(Surface data)

| Surface number | r | d | nd | vd |
|---|---|---|---|---|
| Object surface | ∞ | | | |
| 1 | 29.96700 | 0.75000 | 1.84666 | 23.8 |
| 2 | 19.76100 | 0.01000 | 1.56732 | 42.8 |
| 3 | 19.76100 | 2.87000 | 1.49700 | 81.6 |
| 4 | 113.14300 | 0.15000 | | |
| 5 | 20.52300 | 2.17200 | 1.72916 | 54.7 |
| 6 | 66.07200 | Variable | | |
| 7 | 42.98400 | 0.40000 | 1.88300 | 40.8 |
| 8 | 5.24000 | 2.87000 | | |
| 9 | −26.74300 | 0.40000 | 1.72916 | 54.7 |
| 10 | 11.79700 | 0.41400 | | |
| 11 | 9.87600 | 1.61100 | 1.92286 | 20.9 |
| 12 | 49.90000 | Variable | | |
| 13(Diaphragm) | ∞ | 0.30000 | | |
| 14 | 4.35100 | 1.71500 | 1.49700 | 81.6 |
| 15 | 8241.75900 | 1.15600 | | |
| 16* | 8.17800 | 1.39900 | 1.80359 | 40.8 |
| 17 | 26.89800 | 0.01000 | 1.56732 | 42.8 |
| 18 | 26.89800 | 0.40000 | 1.84666 | 23.8 |
| 19 | 5.12800 | Variable | | |
| 20* | 11.58100 | 1.57800 | 1.51835 | 70.3 |
| 21* | −1903.05100 | Variable | | |
| 22 | ∞ | 0.78000 | 1.51680 | 64.2 |
| 23 | ∞ | (BF) | | |
| Image surface | ∞ | | | |

TABLE I-5

(Aspherical data)

Surface No. 16

$K = 2.48612E{-}01$, $A4 = -1.72469E{-}03$, $A6 = -2.47114E{-}04$, $A8 = 8.90838E{-}05$ $A10 = -3.12229E{-}05$, $A12 = 5.32264E{-}06$, $A14 = -4.63452E{-}07$, $A16 = 1.59112E{-}08$

Surface No. 20

$K = 0.00000E{+}00$, $A4 = -8.09583E{-}04$, $A6 = 7.87583E{-}05$, $A8 = -9.48222E{-}06$ $A10 = 1.69233E{-}07$, $A12 = 1.30664E{-}08$, $A14 = -4.30331E{-}10$, $A16 = 0.00000E{+}00$

Surface No. 21

$K = 0.00000E{+}00$, $A4 = -8.68096E{-}04$, $A6 = 8.93558E{-}05$, $A8 = -1.40719E{-}05$ $A10 = 7.56809E{-}07$, $A12 = -2.21847E{-}08$, $A14 = 3.91923E{-}10$, $A16 = 0.00000E{+}00$

TABLE I-6

(Various data)

Zooming ratio 11.19473

| | Wide-angle limit | Middle position | Telephoto limit |
|---|---|---|---|
| Focal length | 4.3435 | 13.8635 | 48.6242 |
| F-number | 3.32176 | 4.29281 | 5.09761 |
| View angle | 42.1252 | 14.5274 | 4.1532 |
| Image height | 3.4800 | 3.6000 | 3.6000 |
| Overall length of lens system | 43.6261 | 46.0995 | 55.1687 |
| BF | 0.88520 | 0.87910 | 0.88176 |
| d6 | 0.3325 | 9.1692 | 18.9873 |
| d12 | 15.6779 | 5.0320 | 1.0000 |
| d19 | 3.7027 | 3.3848 | 12.5529 |
| d21 | 4.0398 | 8.6464 | 2.7587 |
| Entrance pupil position | 11.8828 | 32.3910 | 107.5476 |
| Exit pupil position | −14.3910 | −18.3900 | −52.0024 |
| Front principal points position | 14.9913 | 36.2802 | 111.4645 |
| Back principal points position | 39.2826 | 32.2360 | 6.5445 |

TABLE I-6-continued (Various data)

Single lens data

| Lens element | Initial surface number | Focal length |
|---|---|---|
| 1 | 1 | −70.9202 |
| 2 | 3 | 47.6882 |
| 3 | 5 | 40.0231 |
| 4 | 7 | −6.7919 |
| 5 | 9 | −11.1776 |
| 6 | 11 | 13.0893 |
| 7 | 14 | 8.7586 |
| 8 | 16 | 14.1515 |
| 9 | 18 | −7.5470 |
| 10 | 20 | 22.2132 |

Zoom lens unit data

| Lens unit | Initial surface No. | Focal length | Overall length of lens unit | Front principal points position | Back principal points position |
|---|---|---|---|---|---|
| 1 | 1 | 32.51235 | 5.95200 | 1.00008 | 3.20471 |
| 2 | 7 | −6.24486 | 5.69800 | 0.31767 | 1.42601 |
| 3 | 13 | 10.34842 | 4.98000 | −2.56327 | 0.32969 |
| 4 | 20 | 22.21316 | 1.57800 | 0.00629 | 0.54471 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.27306 | −0.44500 | −1.48150 |
| 3 | 13 | −0.69043 | −1.91066 | −1.31711 |
| 4 | 20 | 0.70862 | 0.50151 | 0.76645 |

NUMERICAL EXAMPLE I-3

The zoom lens system of Numerical Example I-3 corresponds to Embodiment I-3 shown in FIG. 7. Table I-7 shows the surface data of the zoom lens system of Numerical Example I-3. Table I-8 shows the aspherical data. Table I-9 shows various data.

TABLE I-7

(Surface data)

| Surface number | r | d | nd | vd |
|---|---|---|---|---|
| Object surface | ∞ | | | |
| 1 | 29.98000 | 0.75000 | 1.84666 | 23.8 |
| 2 | 19.75000 | 0.01000 | 1.56732 | 42.8 |
| 3 | 19.75000 | 2.87000 | 1.49700 | 81.6 |
| 4 | 113.52000 | 0.15000 | | |
| 5 | 20.59300 | 2.17200 | 1.72916 | 54.7 |
| 6 | 66.92800 | Variable | | |
| 7 | 42.41600 | 0.40000 | 1.88300 | 40.8 |
| 8 | 5.21900 | 2.86500 | | |
| 9 | −26.30500 | 0.40000 | 1.72916 | 54.7 |
| 10 | 11.77700 | 0.41400 | | |
| 11 | 9.85800 | 1.61100 | 1.92286 | 20.9 |
| 12 | 50.77500 | Variable | | |
| 13(Diaphragm) | ∞ | 0.30000 | | |
| 14 | 4.34500 | 1.71500 | 1.49700 | 81.6 |
| 15 | 8241.75900 | 1.15600 | | |
| 16* | 8.14000 | 1.39900 | 1.80359 | 40.8 |
| 17 | 28.06700 | 0.01000 | 1.56732 | 42.8 |
| 18 | 28.06700 | 0.40000 | 1.84666 | 23.8 |
| 19 | 5.12400 | Variable | | |
| 20* | 11.58400 | 1.57800 | 1.51835 | 70.3 |
| 21* | −1903.05100 | Variable | | |

TABLE I-7-continued (Surface data)

| Surface number | r | d | nd | vd |
|---|---|---|---|---|
| 22 | ∞ | 0.78000 | 1.51680 | 64.2 |
| 23 | ∞ | (BF) | | |
| Image surface | ∞ | | | |

TABLE I-8

(Aspherical data)

Surface No. 16

K = 2.19356E−01, A4 = −1.73329E−03, A6 = −2.48089E−04,
A8 = 8.95636E−05 A10 = −3.13611E−05, A12 = 5.32250E−06,
A14 = −4.61271E−07, A16 = 1.57929E−08
Surface No. 20

K = 0.00000E+00, A4 = −7.99466E−04, A6 = 7.92292E−05,
A8 = −9.47263E−06 A10 = 1.69393E−07, A12 = 1.30494E−08,
A14 = −4.31627E−10, A16 = 0.00000E+00
Surface No. 21

K = 0.00000E+00, A4 = −8.52004E−04, A6 = 8.93019E−05,
A8 = −1.40262E−05 A10 = 7.55766E−07, A12 = −2.22435E−08,
A14 = 3.91141E−10, A16 = 0.00000E+00

TABLE I-9

(Various data)

Zooming ratio 11.18704

| | Wide-angle limit | Middle position | Telephoto limit |
|---|---|---|---|
| Focal length | 4.3124 | 13.8547 | 48.2430 |
| F-number | 3.30960 | 4.32516 | 5.09038 |
| View angle | 42.3150 | 14.5314 | 4.1859 |
| Image height | 3.4800 | 3.6000 | 3.6000 |
| Overall length of lens system | 43.5196 | 45.8641 | 55.1102 |
| BF | 0.88326 | 0.87634 | 0.87658 |
| d6 | 0.2933 | 8.9188 | 18.9576 |
| d12 | 15.6660 | 4.8668 | 1.0000 |
| d19 | 3.7319 | 3.4974 | 12.5238 |
| d21 | 3.9651 | 8.7248 | 2.7722 |
| Entrance pupil position | 11.7879 | 31.2919 | 106.8152 |
| Exit pupil position | −14.3736 | −18.6812 | −51.7087 |
| Front principal points position | 14.8814 | 35.3319 | 110.7989 |
| Back principal points position | 39.2072 | 32.0094 | 6.8672 |

Single lens data

| Lens element | Initial surface number | Focal length |
|---|---|---|
| 1 | 1 | −70.7394 |
| 2 | 3 | 47.6245 |
| 3 | 5 | 40.0032 |
| 4 | 7 | −6.7740 |
| 5 | 9 | −11.1074 |
| 6 | 11 | 13.0098 |
| 7 | 14 | 8.7465 |
| 8 | 16 | 13.8346 |
| 9 | 18 | −7.4633 |
| 10 | 20 | 22.2189 |

TABLE I-9-continued (Various data)

Zoom lens unit data

| Lens unit | Initial surface No. | Focal length | Overall length of lens unit | Front principal points position | Back principal points position |
|---|---|---|---|---|---|
| 1 | 1 | 32.50835 | 5.95200 | 1.00782 | 3.21166 |
| 2 | 7 | −6.23113 | 5.69000 | 0.31449 | 1.41906 |
| 3 | 13 | 10.29689 | 4.98000 | −2.54251 | 0.34446 |
| 4 | 20 | 22.21888 | 1.57800 | 0.00629 | 0.54471 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.27176 | −0.43563 | −1.46106 |
| 3 | 13 | −0.68545 | −1.96357 | −1.32577 |
| 4 | 20 | 0.71214 | 0.49823 | 0.76613 |

NUMERICAL EXAMPLE I-4

The zoom lens system of Numerical Example I-4 corresponds to Embodiment I-4 shown in FIG. 10. Table I-10 shows the surface data of the zoom lens system of Numerical Example I-4. Table I-11 shows the aspherical data. Table I-12 shows various data.

TABLE I-10

(Surface data)

| Surface number | r | d | nd | vd |
|---|---|---|---|---|
| Object surface | ∞ | | | |
| 1 | 30.54000 | 0.75000 | 1.84666 | 23.8 |
| 2 | 19.97400 | 0.01000 | 1.56732 | 42.8 |
| 3 | 19.97400 | 2.87000 | 1.49700 | 81.6 |
| 4 | 119.50600 | 0.15000 | | |
| 5 | 20.80800 | 2.17200 | 1.72916 | 54.7 |
| 6 | 68.56200 | Variable | | |
| 7 | 41.49100 | 0.40000 | 1.88300 | 40.8 |
| 8 | 5.16400 | 2.91600 | | |
| 9 | −28.12500 | 0.40000 | 1.77250 | 49.6 |
| 10 | 11.42600 | 0.28600 | | |
| 11 | 9.47800 | 1.61100 | 1.92286 | 20.9 |
| 12 | 67.30800 | Variable | | |
| 13(Diaphragm) | ∞ | 0.30000 | | |
| 14 | 4.35700 | 1.71500 | 1.49700 | 81.6 |
| 15 | 8241.75900 | 1.15600 | | |
| 16* | 7.96700 | 1.39900 | 1.80359 | 40.8 |
| 17 | 29.75200 | 0.01000 | 1.56732 | 42.8 |
| 18 | 29.75200 | 0.40000 | 1.84666 | 23.8 |
| 19 | 5.06400 | Variable | | |
| 20* | 11.61900 | 1.57800 | 1.51835 | 70.3 |
| 21* | −1903.05100 | Variable | | |
| 22 | ∞ | 0.78000 | 1.51680 | 64.2 |
| 23 | ∞ | (BF) | | |
| Image surface | ∞ | | | |

TABLE I-11

(Aspherical data)

Surface No. 16

K = 1.39021E−02, A4 = −1.64228E−03, A6 = −2.91551E−04,
A8 = 1.15748E−04 A10 = −3.67628E−05, A12 = 5.42614E−06,
A14 = −3.77856E−07, A16 = 9.18243E−09

TABLE I-11-continued (Aspherical data)

Surface No. 20

K = 0.00000E+00, A4 = −8.71053E−04, A6 = 8.45133E−05,
A8 = −9.60026E−06 A10 = 1.40515E−07, A12 = 1.12552E−08,
A14 = −2.70338E−10, A16 = 0.00000E+00
Surface No. 21

K = 0.00000E+00, A4 = −9.33492E−04, A6 = 9.55308E−05,
A8 = −1.40865E−05 A10 = 6.99833E−07, A12 = −2.23769E−08,
A14 = 5.21314E−10, A16 = 0.00000E+00

TABLE I-12

(Various data)

Zooming ratio 11.22733

| | Wide-angle limit | Middle position | Telephoto limit |
|---|---|---|---|
| Focal length | 4.3008 | 13.8502 | 48.2860 |
| F-number | 3.29451 | 4.30437 | 5.08373 |
| View angle | 42.3554 | 14.5254 | 4.1813 |
| Image height | 3.5000 | 3.6000 | 3.6000 |
| Overall length of lens system | 43.5390 | 46.0641 | 55.1007 |
| BF | 0.88366 | 0.87555 | 0.87318 |
| d6 | 0.3270 | 9.1087 | 19.1281 |
| d12 | 15.8063 | 5.0015 | 1.0000 |
| d19 | 3.7135 | 3.6945 | 12.5209 |
| d21 | 3.9055 | 8.4808 | 2.6755 |
| Entrance pupil position | 11.8346 | 31.7799 | 106.5530 |
| Exit pupil position | −14.2580 | −18.7963 | −51.2354 |
| Front principal points position | 14.9138 | 35.8787 | 110.0952 |
| Back principal points position | 39.2382 | 32.2138 | 6.8147 |

Single lens data

| Lens element | Initial surface number | Focal length |
|---|---|---|
| 1 | 1 | −70.4825 |
| 2 | 3 | 47.7970 |
| 3 | 5 | 40.2004 |
| 4 | 7 | −6.7143 |
| 5 | 9 | −10.4718 |
| 6 | 11 | 11.7958 |
| 7 | 14 | 8.7707 |
| 8 | 16 | 13.1634 |
| 9 | 18 | −7.2619 |
| 10 | 20 | 22.2856 |

Zoom lens unit data

| Lens unit | Initial surface No. | Focal length | Overall length of lens unit | Front principal points position | Back principal points position |
|---|---|---|---|---|---|
| 1 | 1 | 32.73986 | 5.95200 | 1.03540 | 3.23820 |
| 2 | 7 | −6.27895 | 5.61300 | 0.30084 | 1.41358 |
| 3 | 13 | 10.26409 | 4.98000 | −2.53886 | 0.35305 |
| 4 | 20 | 22.28560 | 1.57800 | 0.00631 | 0.54473 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.27159 | −0.43794 | −1.45407 |

TABLE I-12-continued (Various data)

| | | | | |
|---|---|---|---|---|
| 3 | 13 | −0.67585 | −1.89141 | −1.31499 |
| 4 | 20 | 0.71566 | 0.51072 | 0.77132 |

NUMERICAL EXAMPLE I-5

The zoom lens system of Numerical Example I-5 corresponds to Embodiment I-5 shown in FIG. 13. Table I-13 shows the surface data of the zoom lens system of Numerical Example I-5. Table I-14 shows the aspherical data. Table I-15 shows various data.

TABLE I-13

(Surface data)

| Surface number | r | d | nd | vd |
|---|---|---|---|---|
| Object surface | ∞ | | | |
| 1 | 28.83400 | 0.75000 | 1.84666 | 23.8 |
| 2 | 19.10600 | 0.01000 | 1.56732 | 42.8 |
| 3 | 19.10600 | 2.85000 | 1.49700 | 81.6 |
| 4 | 101.86400 | 0.15000 | | |
| 5 | 20.12000 | 2.17900 | 1.72916 | 54.7 |
| 6 | 67.88000 | Variable | | |
| 7 | 48.57300 | 0.40000 | 1.88300 | 40.8 |
| 8 | 5.25800 | 2.88300 | | |
| 9 | −30.09700 | 0.40000 | 1.78590 | 43.9 |
| 10 | 11.97200 | 0.46400 | | |
| 11 | 10.02000 | 1.38900 | 1.94595 | 18.0 |
| 12 | 45.19300 | Variable | | |
| 13(Diaphragm) | ∞ | 0.30000 | | |
| 14* | 4.07200 | 1.85400 | 1.51835 | 70.3 |
| 15* | −14.78000 | 1.10600 | | |
| 16 | 10.46100 | 0.40000 | 1.80518 | 25.5 |
| 17 | 3.45300 | 0.45000 | | |
| 18 | 4.62900 | 1.00100 | 1.60342 | 38.0 |
| 19 | 7.26800 | Variable | | |
| 20* | 12.44300 | 1.57700 | 1.51835 | 70.3 |
| 21* | −178.17400 | Variable | | |
| 22 | ∞ | 0.78000 | 1.51680 | 64.2 |
| 23 | ∞ | (BF) | | |
| Image surface | ∞ | | | |

TABLE I-14

(Aspherical data)

Surface No. 14

K = 0.00000E+00, A4 = −8.24968E−04, A6 = −1.09073E−06,
A8 = 2.17711E−05 A10 = −5.02279E−06, A12 = 2.35314E−07,
A14 = 1.63202E−07, A16 = −1.54658E−08
Surface No. 15

K = 0.00000E+00, A4 = 1.49679E−03, A6 = 1.31240E−04,
A8 = 1.46070E−06 A10 = −1.18079E−06, A12 = −9.13721E−08,
A14 = 2.62896E−07, A16 = −2.45633E−08
Surface No. 20

K = 0.00000E+00, A4 = −7.69541E−04, A6 = 7.69065E−05,
A8 = −1.40933E−05 A10 = 9.19495E−07, A12 = −1.81967E−08,
A14 = −1.78801E−09, A16 = 7.53515E−11
Surface No. 21

K = 0.00000E+00, A4 = −7.47072E−04, A6 = 4.18687E−05,
A8 = −9.53545E−06 A10 = 6.77844E−07, A12 = −2.96255E−08,
A14 = 8.03400E−11, A16 = 2.04568E−11

TABLE I-15

(Various data)

Zooming ratio 11.02588

| | Wide-angle limit | Middle position | Telephoto limit |
|---|---|---|---|
| Focal length | 4.2986 | 13.8551 | 47.3961 |
| F-number | 3.28208 | 4.24530 | 5.13352 |
| View angle | 42.0251 | 14.6001 | 4.2709 |
| Image height | 3.4000 | 3.6000 | 3.6000 |
| Overall length of lens system | 43.1677 | 45.8742 | 54.8407 |
| BF | 0.87410 | 0.86181 | 0.87475 |
| d6 | 0.3050 | 8.8771 | 18.0441 |
| d12 | 15.5017 | 5.0021 | 1.2400 |
| d19 | 3.8901 | 3.6860 | 12.7948 |
| d21 | 3.6538 | 8.5042 | 2.9441 |
| Entrance pupil position | 11.7092 | 31.8814 | 101.3999 |
| Exit pupil position | −15.4282 | −19.8509 | −59.3792 |
| Front principal points position | 14.8744 | 36.4685 | 111.5140 |
| Back principal points position | 38.8691 | 32.0191 | 7.4446 |

Single lens data

| Lens element | Initial surface number | Focal length |
|---|---|---|
| 1 | 1 | −69.3377 |
| 2 | 3 | 46.7831 |
| 3 | 5 | 38.4775 |
| 4 | 7 | −6.7066 |
| 5 | 9 | −10.8530 |
| 6 | 11 | 13.3538 |
| 7 | 14 | 6.3728 |
| 8 | 16 | −6.5687 |
| 9 | 18 | 18.4881 |
| 10 | 20 | 22.5016 |

Zoom lens unit data

| Lens unit | Initial surface No. | Focal length | Overall length of lens unit | Front principal points position | Back principal points position |
|---|---|---|---|---|---|
| 1 | 1 | 31.49909 | 5.93900 | 1.00554 | 3.20336 |
| 2 | 7 | −5.98151 | 5.53600 | 0.36288 | 1.39105 |
| 3 | 13 | 10.16322 | 5.11100 | −2.32440 | 0.11796 |
| 4 | 20 | 22.50158 | 1.57700 | 0.06799 | 0.60342 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.27048 | −0.44170 | −1.36721 |
| 3 | 13 | −0.68864 | −1.92377 | −1.44020 |
| 4 | 20 | 0.73265 | 0.51764 | 0.76416 |

NUMERICAL EXAMPLE I-6

The zoom lens system of Numerical Example I-6 corresponds to Embodiment I-6 shown in FIG. 15. Table I-16 shows the surface data of the zoom lens system of Numerical Example I-6. Table I-17 shows the aspherical data. Table I-18 shows various data.

TABLE I-16

(Surface data)

| Surface number | r | d | nd | vd |
|---|---|---|---|---|
| Object surface | ∞ | | | |
| 1 | 30.82100 | 0.75000 | 1.84666 | 23.8 |
| 2 | 19.80200 | 0.01000 | 1.56732 | 42.8 |
| 3 | 19.80200 | 2.84100 | 1.49700 | 81.6 |
| 4 | 132.37900 | 0.15000 | | |
| 5 | 19.70800 | 2.19000 | 1.72916 | 54.7 |
| 6 | 63.77100 | Variable | | |
| 7 | 46.49600 | 0.40000 | 1.88300 | 40.8 |
| 8 | 5.15900 | 2.99000 | | |
| 9 | −26.75700 | 0.40000 | 1.78590 | 43.9 |
| 10 | 13.20600 | 0.40800 | | |
| 11 | 10.12700 | 1.34000 | 1.94595 | 18.0 |
| 12 | 46.54600 | Variable | | |
| 13(Diaphragm) | ∞ | 0.30000 | | |
| 14* | 4.69000 | 2.11400 | 1.51835 | 70.3 |
| 15* | −14.23800 | 1.13000 | | |
| 16 | 6.94600 | 0.91900 | 1.94595 | 18.0 |
| 17 | 3.99000 | Variable | | |
| 18* | 11.88000 | 1.57700 | 1.51835 | 70.3 |
| 19* | −613.12200 | Variable | | |
| 20 | ∞ | 0.78000 | 1.51680 | 64.2 |
| 21 | ∞ | (BF) | | |
| Image surface | ∞ | | | |

TABLE I-17

(Aspherical data)

Surface No. 14

$K = 0.00000E+00, A4 = −6.98798E−04, A6 = −3.07231E−05,$
$A8 = 4.14892E−05\ A10 = −7.19360E−06, A12 = 8.33698E−08,$
$A14 = 1.67474E−07, A16 = −1.49651E−08$

Surface No. 15

$K = 0.00000E+00, A4 = 1.02954E−03, A6 = 2.16803E−04,$
$A8 = −3.21361E−05\ A10 = 3.94649E−06, A12 = 2.58926E−07,$
$A14 = −6.31197E−09, A16 = −3.45461E−09$

Surface No. 18

$K = 0.00000E+00, A4 = −2.31301E−04, A6 = −3.30169E−05,$
$A8 = −5.02139E−06\ A10 = 7.52561E−07, A12 = −5.25403E−08,$
$A14 = 2.01872E−09, A16 = −4.40237E−11$

Surface No. 19

$K = 0.00000E+00, A4 = −5.07083E−04, A6 = 2.66686E−05,$
$A8 = −1.42819E−05\ A10 = 1.13449E−06, A12 = −2.14192E−08,$
$A14 = −1.36032E−09, A16 = 4.60748E−11$

TABLE I-18

(Various data)

Zooming ratio 11.02420

| | Wide-angle limit | Middle position | Telephoto limit |
|---|---|---|---|
| Focal length | 4.2999 | 13.8718 | 47.4034 |
| F-number | 3.31040 | 4.20958 | 4.99163 |
| View angle | 41.5250 | 14.5528 | 4.2738 |
| Image height | 3.3500 | 3.6000 | 3.6000 |
| Overall length of lens system | 43.3831 | 45.7414 | 54.4466 |
| BF | 0.87136 | 0.88634 | 0.87037 |
| d6 | 0.3050 | 9.1454 | 18.3495 |
| d12 | 15.6017 | 5.0041 | 1.2400 |
| d17 | 4.8012 | 3.7877 | 12.7923 |
| d19 | 3.5048 | 8.6189 | 2.8954 |
| Entrance pupil position | 11.6412 | 32.7101 | 105.6893 |
| Exit pupil position | −15.5987 | −18.6607 | −51.0614 |
| Front principal points position | 14.8185 | 36.7376 | 109.8228 |
| Back principal points position | 39.0831 | 31.8696 | 7.0432 |

Single lens data

| Lens element | Initial surface number | Focal length |
|---|---|---|
| 1 | 1 | −67.5261 |
| 2 | 3 | 46.4623 |
| 3 | 5 | 38.3143 |
| 4 | 7 | −6.6017 |
| 5 | 9 | −11.2015 |
| 6 | 11 | 13.4422 |
| 7 | 14 | 7.0758 |
| 8 | 16 | −11.6760 |
| 9 | 18 | 22.5026 |

Zoom lens unit data

| Lens unit | Initial surface No. | Focal length | Overall length of lens unit | Front principal points position | Back principal points position |
|---|---|---|---|---|---|
| 1 | 1 | 31.49935 | 5.94100 | 1.07105 | 3.27435 |
| 2 | 7 | −5.98100 | 5.53800 | 0.35015 | 1.35673 |
| 3 | 13 | 10.16664 | 4.46300 | −2.41163 | 0.14756 |
| 4 | 18 | 22.50262 | 1.57700 | 0.01976 | 0.55724 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.26946 | −0.44781 | −1.44049 |
| 3 | 13 | −0.68706 | −1.93046 | −1.36656 |
| 4 | 18 | 0.73736 | 0.50942 | 0.76448 |

NUMERICAL EXAMPLE I-7

The zoom lens system of Numerical Example I-7 corresponds to Embodiment I-7 shown in FIG. 17. Table I-19 shows the surface data of the zoom lens system of Numerical Example I-7. Table I-20 shows the aspherical data. Table I-21 shows various data.

TABLE I-19

(Surface data)

| Surface number | r | d | nd | vd |
|---|---|---|---|---|
| Object surface | ∞ | | | |
| 1 | 31.60900 | 0.75700 | 1.92286 | 20.9 |
| 2 | 22.12900 | 0.01000 | 1.56732 | 42.8 |
| 3 | 22.12900 | 2.85800 | 1.49700 | 81.6 |
| 4 | 221.46700 | 0.14400 | | |
| 5 | 19.82900 | 2.17900 | 1.72916 | 54.7 |
| 6 | 56.23800 | Variable | | |
| 7 | 44.93500 | 0.40100 | 1.88300 | 40.8 |
| 8 | 5.19000 | 2.94100 | | |
| 9 | −28.98600 | 0.39900 | 1.78590 | 43.9 |
| 10 | 12.33500 | 0.47500 | | |
| 11 | 10.20700 | 1.34300 | 1.94595 | 18.0 |
| 12 | 47.99500 | Variable | | |
| 13(Diaphragm) | ∞ | 0.30000 | | |
| 14 | 4.30200 | 1.77300 | 1.49700 | 81.6 |
| 15 | 6803.89600 | 1.15900 | | |

TABLE I-19-continued (Surface data)

| Surface number | r | d | nd | vd |
|---|---|---|---|---|
| 16* | 8.43500 | 1.39700 | 1.80359 | 40.8 |
| 17 | 49.88900 | 0.01000 | 1.56732 | 42.8 |
| 18 | 49.88900 | 0.39800 | 1.84666 | 23.8 |
| 19 | 5.29900 | Variable | | |
| 20* | 11.72100 | 1.58000 | 1.51835 | 70.3 |
| 21* | −1629.06500 | Variable | | |
| 22 | ∞ | 0.78000 | 1.51680 | 64.2 |
| 23 | ∞ | (BF) | | |
| Image surface | ∞ | | | |

TABLE I-20

(Aspherical data)

Surface No. 16

K = −1.26014E−01, A4 = −1.78233E−03, A6 = −2.10674E−04,
A8 = 6.69814E−05 A10 = −2.74048E−05, A12 = 5.39168E−06,
A14 = −5.55222E−07, A16 = 2.30211E−08

Surface No. 20

K = 0.00000E+00, A4 = −7.75064E−04, A6 = 6.14125E−05,
A8 = −8.73167E−06 A10 = 2.05005E−07, A12 = 1.29818E−08,
A14 = −4.93909E−10, A16 = 6.87949E−13

Surface No. 21

K = 0.00000E+00, A4 = −9.03803E−04, A6 = 7.96172E−05,
A8 = −1.34273E−05 A10 = 7.25544E−07, A12 = −1.80856E−08,
A14 = 3.95732E−10, A16 = −6.69981E−12

TABLE I-21

(Various data)

Zooming ratio 11.02287

| | Wide-angle limit | Middle position | Telephoto limit |
|---|---|---|---|
| Focal length | 4.3008 | 13.8156 | 47.4068 |
| F-number | 3.26165 | 4.24209 | 5.08129 |
| View angle | 42.5203 | 14.6148 | 4.2714 |
| Image height | 3.5000 | 3.6000 | 3.6000 |
| Overall length of lens system | 43.1633 | 45.9912 | 54.9059 |
| BF | 0.88315 | 0.88011 | 0.86611 |
| d6 | 0.3402 | 8.9311 | 18.1547 |
| d12 | 15.2947 | 5.0260 | 1.2415 |
| d19 | 3.8356 | 3.6957 | 12.7992 |
| d21 | 3.9057 | 8.5543 | 2.9404 |
| Entrance pupil position | 11.7233 | 32.1123 | 103.6880 |
| Exit pupil position | −14.5669 | −18.9414 | −53.9620 |
| Front principal points position | 14.8268 | 36.2985 | 110.1048 |
| Back principal points position | 38.8626 | 32.1757 | 7.4991 |

Single lens data

| Lens element | Initial surface number | Focal length |
|---|---|---|
| 1 | 1 | −83.1380 |
| 2 | 3 | 49.2339 |
| 3 | 5 | 40.9708 |
| 4 | 7 | −6.6768 |
| 5 | 9 | −10.9635 |
| 6 | 11 | 13.4721 |
| 7 | 14 | 8.6607 |

TABLE I-21-continued (Various data)

| 8 | 16 | 12.4456 |
| 9 | 18 | −7.0312 |
| 10 | 20 | 22.4580 |

Zoom lens unit data

| Lens unit | Initial surface No. | Focal length | Overall length of lens unit | Front principal points position | Back principal points position |
|---|---|---|---|---|---|
| 1 | 1 | 31.49407 | 5.94800 | 0.97373 | 3.20547 |
| 2 | 7 | −5.98650 | 5.55900 | 0.35026 | 1.33891 |
| 3 | 13 | 10.16527 | 5.03700 | −2.46799 | 0.41145 |
| 4 | 20 | 22.45799 | 1.58000 | 0.00744 | 0.54649 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.27119 | −0.44398 | −1.40526 |
| 3 | 13 | −0.70146 | −1.93358 | −1.40649 |
| 4 | 20 | 0.71785 | 0.51099 | 0.76159 |

NUMERICAL EXAMPLE I-8

The zoom lens system of Numerical Example I-8 corresponds to Embodiment I-8 shown in FIG. 20. Table I-22 shows the surface data of the zoom lens system of Numerical Example I-8. Table I-23 shows the aspherical data. Table I-24 shows various data.

TABLE I-22

(Surface data)

| Surface number | r | d | nd | vd | Effective diameter |
|---|---|---|---|---|---|
| Object surface | ∞ | | | | |
| 1 | 20.98290 | 0.75000 | 1.80518 | 25.5 | 9.839 |
| 2 | 13.88780 | 0.01000 | 1.56732 | 42.8 | 8.842 |
| 3 | 13.88780 | 4.37500 | 1.66550 | 55.3 | 8.838 |
| 4* | ∞ | Variable | | | 8.324 |
| 5 | 84.91200 | 0.40000 | 1.90366 | 31.3 | 6.341 |
| 6 | 5.39320 | 3.24050 | | | 4.587 |
| 7 | −28.22190 | 0.40000 | 1.62299 | 58.1 | 4.575 |
| 8 | 9.79740 | 0.01000 | 1.56732 | 42.8 | 4.652 |
| 9 | 9.79740 | 2.15110 | 2.00170 | 20.6 | 4.653 |
| 10* | 98.54000 | Variable | | | 4.584 |
| 11 (Diaphragm) | ∞ | 0.30000 | | | 2.295 |
| 12 | 4.60320 | 2.50820 | 1.48749 | 70.4 | |
| 13 | −27.47690 | 0.20000 | | | |
| 14* | 6.60560 | 1.74010 | 1.68398 | 31.2 | 3.144 |
| 15 | −15.56150 | 0.01000 | 1.56732 | 42.8 | |
| 16 | −15.56150 | 0.40000 | 2.00069 | 25.5 | |
| 17 | 4.84080 | 0.40000 | | | 1.850 |
| 18 | 33.57380 | 0.80000 | 1.62004 | 36.3 | |
| 19 | −45.87960 | Variable | | | 1.850 |
| 20* | 10.44000 | 1.30510 | 1.51443 | 63.6 | 3.708 |
| 21 | 19.71820 | Variable | | | 3.675 |
| 22 | ∞ | 0.78000 | 1.51680 | 64.2 | |
| 23 | ∞ | (BF) | | | |
| Image surface | ∞ | | | | |

TABLE I-23

(Aspherical data)

Surface No. 4

K = 0.00000E+00, A4 = 5.44859E−06, A6 = −3.16138E−09,
A8 = −4.46348E−11 A10 = 1.30269E−13
Surface No. 10

K = 0.00000E+00, A4 = −1.36503E−04, A6 = −7.12314E−07,
A8 = −3.65563E−08 A10 = −2.35003E−09
Surface No. 14

K = −1.18891E+00, A4 = −7.28073E−04, A6 = −9.31333E−05,
A8 = 7.94547E−07 A10 = −7.01384E−07
Surface No. 20

K = 0.00000E+00, A4 = −1.01241E−04, A6 = 7.25117E−06,
A8 = −1.67079E−07 A10 = 0.00000E+00

TABLE I-24

(Various data)

Zooming ratio 11.20139

|  | Wide-angle limit | Middle position | Telephoto limit |
|---|---|---|---|
| Focal length | 4.6499 | 14.9976 | 52.0854 |
| F-number | 3.40109 | 4.57355 | 5.84643 |
| View angle | 40.6107 | 14.4180 | 4.2309 |
| Image height | 3.5100 | 3.9300 | 3.9300 |
| Overall length of lens system | 47.6917 | 49.7109 | 59.0505 |
| BF | 0.96082 | 0.94475 | 0.87062 |
| d4 | 0.3000 | 9.4768 | 18.9347 |
| d10 | 18.9756 | 6.8855 | 1.0000 |
| d19 | 4.6225 | 4.0673 | 13.9922 |
| d21 | 3.0528 | 8.5565 | 4.4730 |
| Entrance pupil position | 11.7392 | 33.0254 | 90.7706 |
| Exit pupil position | −13.7800 | −18.4896 | −33.9713 |
| Front principal points position | 14.9223 | 36.4493 | 64.9930 |
| Back principal points position | 43.0418 | 34.7132 | 6.9651 |

Single lens data

| Lens element | Initial surface number | Focal length |
|---|---|---|
| 1 | 1 | −53.5331 |
| 2 | 3 | 20.8681 |
| 3 | 5 | −6.3882 |
| 4 | 7 | −11.6268 |
| 5 | 9 | 10.7304 |
| 6 | 12 | 8.3004 |
| 7 | 14 | 7.0030 |
| 8 | 16 | −3.6538 |
| 9 | 18 | 31.3881 |
| 10 | 20 | 41.1632 |

Zoom lens unit data

| Lens unit | Initial surface No. | Focal length | Overall length of lens unit | Front principal points position | Back principal points position |
|---|---|---|---|---|---|
| 1 | 1 | 35.11856 | 5.13500 | −0.14515 | 1.94345 |
| 2 | 5 | −6.80610 | 6.20160 | 0.10086 | 1.48861 |
| 3 | 11 | 10.66323 | 6.35830 | −2.91266 | 0.74640 |
| 4 | 20 | 41.16318 | 1.30510 | −0.92547 | −0.44285 |

TABLE I-24-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.27533 | −0.43788 | −1.11844 |
| 3 | 11 | −0.56741 | −1.36551 | −1.62662 |
| 4 | 20 | 0.84754 | 0.71422 | 0.81523 |

NUMERICAL EXAMPLE I-9

The zoom lens system of Numerical Example I-9 corresponds to Embodiment I-9 shown in FIG. 23. Table I-25 shows the surface data of the zoom lens system of Numerical Example I-9. Table I-26 shows the aspherical data. Table I-27 shows various data.

TABLE I-25

(Surface data)

| Surface number | r | d | nd | vd | Effective diameter |
|---|---|---|---|---|---|
| Object surface | ∞ | | | | |
| 1 | 19.74460 | 0.75000 | 1.80518 | 25.5 | 9.867 |
| 2 | 14.42530 | 0.01000 | 1.56732 | 42.8 | 9.046 |
| 3 | 14.42530 | 4.58060 | 1.58842 | 61.4 | 9.044 |
| 4* | ∞ | Variable | | | 8.687 |
| 5 | 51.45680 | 0.40000 | 1.90366 | 31.3 | 6.224 |
| 6 | 5.56270 | 3.12720 | | | 4.550 |
| 7 | −25.07760 | 0.40000 | 1.72916 | 54.7 | 4.494 |
| 8 | 14.27150 | 0.16660 | | | 4.447 |
| 9 | 10.68100 | 1.55340 | 1.94595 | 18.0 | 4.541 |
| 10 | 75.93340 | Variable | | | 4.456 |
| 11 (Diaphragm) | ∞ | 0.30000 | | | 2.205 |
| 12 | 4.01800 | 2.44330 | 1.48749 | 70.4 | |
| 13 | −21.09430 | 0.20000 | | | |
| 14* | 6.14200 | 1.23530 | 1.68398 | 31.2 | 2.594 |
| 15 | −42.70560 | 0.01000 | 1.56732 | 42.8 | |
| 16 | −42.70560 | 2.00000 | 2.00069 | 25.5 | |
| 17 | 4.55800 | Variable | | | 1.753 |
| 18* | 10.12120 | 1.31660 | 1.52500 | 70.3 | 3.622 |
| 19 | 21.51830 | Variable | | | 3.603 |
| 20 | ∞ | 0.78000 | 1.51680 | 64.2 | |
| 21 | ∞ | (BF) | | | |
| Image surface | ∞ | | | | |

TABLE I-26

(Aspherical data)

Surface No. 4

K = 0.00000E+00, A4 = 6.17753E−06, A6 = −1.49369E−09,
A8 = −8.29862E−11 A10 = 4.82705E−13, A12 = 0.00000E+00
Surface No. 14

K = −2.06747E+00, A4 = −1.16941E−03, A6 = −2.34186E−04,
A8 = −6.87246E−08 A10 = −2.18647E−06, A12 = 0.00000E+00
Surface No. 18

K = 0.00000E+00, A4 = −3.08123E−04, A6 = 6.64049E−05,
A8 = −9.04968E−06 A10 = 6.32666E−07, A12 = −1.69826E−08

TABLE I-27

(Various data)

Zooming ratio 11.40034

|  | Wide-angle limit | Middle position | Telephoto limit |
|---|---|---|---|
| Focal length | 4.6049 | 14.9993 | 52.4971 |
| F-number | 3.42225 | 4.69287 | 5.64395 |
| View angle | 40.9010 | 14.5275 | 4.2181 |
| Image height | 3.5100 | 3.9300 | 3.9300 |
| Overall length of lens system | 45.3684 | 47.6360 | 59.0317 |
| BF | 0.93231 | 0.89902 | 0.90205 |
| d4 | 0.3000 | 9.7009 | 21.5121 |
| d10 | 18.1817 | 6.0382 | 1.0000 |
| d17 | 5.7814 | 4.2306 | 12.6513 |
| d19 | 2.5000 | 9.0943 | 5.2933 |
| Entrance pupil position | 12.0254 | 32.1580 | 106.5866 |
| Exit pupil position | −13.5292 | −17.8075 | −30.6943 |
| Front principal points position | 15.1639 | 35.1306 | 71.8603 |
| Back principal points position | 40.7635 | 32.6367 | 6.5347 |

Single lens data

| Lens element | Initial surface number | Focal length |
|---|---|---|
| 1 | 1 | −70.9634 |
| 2 | 3 | 24.5155 |
| 3 | 5 | −6.9306 |
| 4 | 7 | −12.4205 |
| 5 | 9 | 12.9893 |
| 6 | 12 | 7.1515 |
| 7 | 14 | 7.9322 |
| 8 | 16 | −4.0982 |
| 9 | 18 | 35.0062 |

Zoom lens unit data

| Lens unit | Initial surface No. | Focal length | Overall length of lens unit | Front principal points position | Back principal points position |
|---|---|---|---|---|---|
| 1 | 1 | 38.45052 | 5.34060 | −0.23969 | 1.79936 |
| 2 | 5 | −6.80173 | 5.64720 | 0.23455 | 1.32483 |
| 3 | 11 | 10.18755 | 4.58860 | −3.11748 | 0.11964 |
| 4 | 18 | 35.00621 | 1.31660 | −0.73737 | −0.25109 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.24668 | −0.37430 | −1.06930 |
| 3 | 11 | −0.57626 | −1.59102 | −1.67223 |
| 4 | 18 | 0.84248 | 0.65505 | 0.76355 |

NUMERICAL EXAMPLE I-10

The zoom lens system of Numerical Example I-10 corresponds to Embodiment I-10 shown in FIG. 26. Table I-28 shows the surface data of the zoom lens system of Numerical Example I-10. Table I-29 shows the aspherical data. Table I-30 shows various data.

TABLE I-28

(Surface data)

| Surface number | r | d | nd | vd | Effective diameter |
|---|---|---|---|---|---|
| Object surface | ∞ | | | | |
| 1 | 19.77840 | 0.75000 | 1.85139 | 23.6 | 9.867 |
| 2 | 15.05080 | 0.01000 | 1.56732 | 42.8 | 9.046 |
| 3 | 15.05080 | 4.55170 | 1.58913 | 61.2 | 9.044 |
| 4* | −2009.86870 | Variable | | | 8.687 |
| 5 | 52.22170 | 0.40000 | 1.95534 | 29.4 | 6.224 |
| 6 | 5.68140 | 3.07420 | | | 4.550 |
| 7 | −23.91140 | 0.40000 | 1.72668 | 53.6 | 4.494 |
| 8 | 14.22890 | 0.15000 | | | 4.447 |
| 9 | 10.89020 | 1.62340 | 1.94595 | 18.0 | 4.541 |
| 10 | 165.48490 | Variable | | | 4.456 |
| 11 (Diaphragm) | ∞ | 0.30000 | | | 2.205 |
| 12 | 4.18710 | 2.65790 | 1.49171 | 69.9 | |
| 13 | −22.46530 | 0.20000 | | | |
| 14* | 6.60790 | 1.54420 | 1.71418 | 29.7 | 2.712 |
| 15 | −18.34560 | 0.01000 | 1.56732 | 42.8 | |
| 16 | −18.34560 | 0.40000 | 2.00080 | 24.4 | |
| 17 | 4.72980 | Variable | | | 1.753 |
| 18* | 9.76620 | 1.36180 | 1.51760 | 63.5 | 3.622 |
| 19 | 23.45330 | Variable | | | 3.603 |
| 20 | ∞ | 0.78000 | 1.51680 | 64.2 | |
| 21 | ∞ | (BF) | | | |
| Image surface | ∞ | | | | |

TABLE I-29

(Aspherical data)

Surface No. 4

K = 0.00000E+00, A4 = 6.68914E−06, A6 = −9.93410E−10,
A8 = −8.29880E−11 A10 = 4.79336E−13, A12 = 0.00000E+00

Surface No. 14

K = −1.97925E+00, A4 = −1.09715E−03, A6 = −1.81257E−04,
A8 = 5.09203E−07 A10 = −1.71341E−06, A12 = 0.00000E+00

Surface No. 18

K = 0.00000E+00, A4 = −3.54076E−04, A6 = 7.33046E−05,
A8 = −1.00180E−05 A10 = 6.97991E−07, A12 = −1.86608E−08

TABLE I-30

(Various data)

Zooming ratio 11.44412

|  | Wide-angle limit | Middle position | Telephoto limit |
|---|---|---|---|
| Focal length | 4.5865 | 14.9965 | 52.4889 |
| F-number | 3.44725 | 4.69828 | 5.62110 |
| View angle | 41.0129 | 14.5052 | 4.2129 |
| Image height | 3.5100 | 3.9300 | 3.9300 |
| Overall length of lens system | 45.8634 | 47.8820 | 59.0016 |
| BF | 0.91651 | 0.88175 | 0.87169 |
| d4 | 0.3000 | 9.8706 | 21.5407 |
| d10 | 18.5253 | 6.1613 | 1.0000 |
| d17 | 5.3803 | 3.7677 | 11.8523 |
| d19 | 2.5281 | 8.9874 | 5.5237 |
| Entrance pupil position | 11.8960 | 32.6328 | 107.7666 |
| Exit pupil position | −13.4686 | −17.4274 | −31.0462 |
| Front principal points position | 15.0202 | 35.3461 | 73.9375 |
| Back principal points position | 41.2769 | 32.8854 | 6.5127 |

TABLE I-30-continued (Various data)

Single lens data

| Lens element | Initial surface number | Focal length |
|---|---|---|
| 1 | 1 | −79.7777 |
| 2 | 3 | 25.3788 |
| 3 | 5 | −6.7011 |
| 4 | 7 | −12.2219 |
| 5 | 9 | 12.2609 |
| 6 | 12 | 7.4217 |
| 7 | 14 | 6.9824 |
| 8 | 16 | −3.7250 |
| 9 | 18 | 31.2703 |

Zoom lens unit data

| Lens unit | Initial surface No. | Focal length | Overall length of lens unit | Front principal points position | Back principal points position |
|---|---|---|---|---|---|
| 1 | 1 | 38.18058 | 5.31170 | −0.23227 | 1.80477 |
| 2 | 5 | −6.86331 | 5.64760 | 0.11084 | 1.15898 |
| 3 | 11 | 10.27017 | 5.11210 | −3.64054 | 0.23351 |
| 4 | 18 | 31.27028 | 1.36180 | −0.61927 | −0.12535 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.25049 | −0.38495 | −1.11439 |
| 3 | 11 | −0.58070 | −1.64465 | −1.68650 |
| 4 | 18 | 0.82584 | 0.62039 | 0.73148 |

The following Table I-31 shows the corresponding values to the individual conditions in the zoom lens systems of the numerical examples.

TABLE I-31

(Corresponding values to conditions)

| | | | | | Example | | | | | |
|---|---|---|---|---|---|---|---|---|---|---|
| Condition | I-1 | I-2 | I-3 | I-4 | I-5 | I-6 | I-7 | I-8 | I-9 | I-10 |
| (2) $D/f_W$ | 4.130 | 4.123 | 4.151 | 4.144 | 4.156 | 4.005 | 4.144 | 4.021 | 3.603 | 3.735 |
| (a-1) $\omega_W$ | 41.67 | 42.13 | 42.32 | 42.36 | 42.03 | 41.53 | 42.52 | 40.60 | 40.90 | 41.01 |
| (b) $f_T/f_W$ | 11.03 | 11.19 | 11.19 | 11.23 | 11.03 | 11.02 | 11.02 | 11.20 | 11.40 | 11.44 |
| (10) $m_{2T}/m_{2W}$ | 5.177 | 5.425 | 5.376 | 5.354 | 5.054 | 5.345 | 5.182 | 4.062 | 4.337 | 4.449 |
| (11) $L_T/f_T$ | 1.155 | 1.135 | 1.142 | 1.141 | 1.157 | 1.149 | 1.158 | 1.134 | 1.124 | 1.124 |
| (12) $f_T/f_{G1}$ | 1.502 | 1.496 | 1.484 | 1.475 | 1.505 | 1.505 | 1.505 | 1.483 | 1.365 | 1.375 |
| (13) $L_W/f_{G1}$ | 1.367 | 1.342 | 1.339 | 1.330 | 1.370 | 1.377 | 1.371 | 1.358 | 1.180 | 1.201 |
| (14) $L_T/f_{G1}$ | 1.734 | 1.697 | 1.695 | 1.683 | 1.741 | 1.729 | 1.743 | 1.681 | 1.535 | 1.545 |
| (15) $f_{G1}/|f_{G2}|$ | 5.204 | 5.206 | 5.217 | 5.214 | 5.266 | 5.267 | 5.261 | 5.160 | 5.653 | 5.563 |

NUMERICAL EXAMPLE II-1

The zoom lens system of Numerical Example II-1 corresponds to Embodiment II-1 shown in FIG. 30. Table II-1 shows the surface data of the zoom lens system of Numerical Example II-1. Table II-2 shows the aspherical data. Table II-3 shows various data.

TABLE II-1

(Surface data)

| Surface number | r | d | nd | vd |
|---|---|---|---|---|
| Object surface | ∞ | | | |
| 1 | 28.99700 | 0.75000 | 1.84666 | 23.8 |
| 2 | 19.09100 | 0.01000 | 1.56732 | 42.8 |
| 3 | 19.09100 | 2.84700 | 1.49700 | 81.6 |
| 4 | 103.92400 | 0.15000 | | |
| 5 | 19.82600 | 2.17900 | 1.72916 | 54.7 |
| 6 | 64.92800 | Variable | | |
| 7 | 44.87200 | 0.40000 | 1.88300 | 40.8 |
| 8 | 5.18700 | 2.92000 | | |
| 9 | −29.21100 | 0.40000 | 1.78590 | 43.9 |
| 10 | 12.37500 | 0.47500 | | |
| 11 | 10.24000 | 1.34100 | 1.94595 | 18.0 |
| 12 | 47.83600 | Variable | | |
| 13(Diaphragm) | ∞ | 0.30000 | | |
| 14 | 4.30100 | 1.76700 | 1.49700 | 81.6 |
| 15 | 8241.75900 | 1.15600 | | |
| 16* | 8.43200 | 1.39900 | 1.80359 | 40.8 |
| 17 | 47.76900 | 0.01000 | 1.56732 | 42.8 |
| 18 | 47.76900 | 0.40000 | 1.84666 | 23.8 |
| 19 | 5.30000 | Variable | | |
| 20* | 11.73300 | 1.57800 | 1.51788 | 70.1 |
| 21* | −1903.05100 | Variable | | |
| 22 | ∞ | 0.78000 | 1.51680 | 64.2 |
| 23 | ∞ | (BF) | | |
| Image surface | ∞ | | | |

TABLE II-2

(Aspherical data)

Surface No. 16

K = −1.08120E−01, A4 = −1.77933E−03, A6 = −2.10910E−04,
A8 = 6.71009E−05 A10 = −2.73694E−05, A12 = 5.38864E−06,
A14 = −5.55377E−07, A16 = 2.30717E−08
Surface No. 20

K = 0.00000E+00, A4 = −7.73857E−04, A6 = 6.08786E−05,
A8 = −8.73181E−06 A10 = 2.05548E−07, A12 = 1.29957E−08,
A14 = −4.94747E−10, A16 = 4.24877E−13

TABLE II-2-continued (Aspherical data)

Surface No. 21

K = 0.00000E+00, A4 = −9.05532E−04, A6 = 7.99808E−05,
A8 = −1.34302E−05 A10 = 7.25546E−07, A12 = −1.80811E−08,
A14 = 3.94130E−10, A16 = −6.65585E−12

TABLE II-3

(Various data)

Zooming ratio 11.02792

|  | Wide-angle limit | Middle position | Telephoto limit |
|---|---|---|---|
| Focal length | 4.3008 | 13.7797 | 47.4286 |
| F-number | 3.25999 | 4.27060 | 5.07866 |
| View angle | 42.8274 | 14.6883 | 4.2641 |
| Image height | 3.5000 | 3.6000 | 3.6000 |
| Overall length of lens system | 43.0322 | 45.9106 | 54.8663 |
| BF | 0.88584 | 0.88510 | 0.87609 |
| d6 | 0.3050 | 8.7502 | 18.1561 |
| d12 | 15.2479 | 4.9989 | 1.2400 |
| d19 | 3.8106 | 3.8386 | 12.8035 |
| d21 | 3.9209 | 8.5758 | 2.9286 |
| Entrance pupil position | 11.6669 | 31.3764 | 103.4955 |
| Exit pupil position | −14.5144 | −19.2244 | −53.6397 |
| Front principal points position | 14.7666 | 35.7138 | 109.6613 |
| Back principal points position | 38.7315 | 32.1309 | 7.4377 |

Single lens data

| Lens element | Initial surface number | Focal length |
|---|---|---|
| 1 | 1 | −68.3779 |
| 2 | 3 | 46.5386 |
| 3 | 5 | 38.3610 |
| 4 | 7 | −6.6736 |
| 5 | 9 | −11.0140 |
| 6 | 11 | 13.5388 |
| 7 | 14 | 8.6579 |
| 8 | 16 | 12.5433 |
| 9 | 18 | −7.0716 |
| 10 | 20 | 22.5233 |

Zoom lens unit data

| Lens unit | Initial surface No. | Focal length | Overall length of lens unit | Front principal points position | Back principal points position |
|---|---|---|---|---|---|
| 1 | 1 | 31.49755 | 5.93600 | 0.99755 | 3.19687 |
| 2 | 7 | −5.98535 | 5.53600 | 0.34887 | 1.33719 |
| 3 | 13 | 10.15073 | 5.03200 | −2.46007 | 0.41501 |
| 4 | 20 | 22.52334 | 1.57800 | 0.00637 | 0.54447 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.27060 | −0.43772 | −1.40235 |
| 3 | 13 | −0.70292 | −1.95501 | −1.40848 |
| 4 | 20 | 0.71787 | 0.51123 | 0.76236 |

NUMERICAL EXAMPLE II-2

The zoom lens system of Numerical Example II-2 corresponds to Embodiment II-2 shown in FIG. 33. Table II-4 shows the surface data of the zoom lens system of Numerical Example II-2. Table II-5 shows the aspherical data. Table II-6 shows various data.

TABLE II-4

(Surface data)

| Surface number | r | d | nd | vd |
|---|---|---|---|---|
| Object surface | ∞ | | | |
| 1 | 29.00200 | 0.75000 | 1.84666 | 23.8 |
| 2 | 19.09100 | 0.01000 | 1.56732 | 42.8 |
| 3 | 19.09100 | 2.84700 | 1.49700 | 81.6 |
| 4 | 103.18100 | 0.15000 | | |
| 5 | 19.83500 | 2.17900 | 1.72916 | 54.7 |
| 6 | 64.49100 | Variable | | |
| 7 | 41.93600 | 0.40000 | 1.88300 | 40.8 |
| 8 | 5.21000 | 2.92000 | | |
| 9 | −29.76700 | 0.40000 | 1.78590 | 43.9 |
| 10 | 12.33500 | 0.47500 | | |
| 11 | 10.21100 | 1.34100 | 1.94595 | 18.0 |
| 12 | 47.24000 | Variable | | |
| 13 (Diaphragm) | ∞ | 0.30000 | | |
| 14 | 4.30800 | 1.76700 | 1.49700 | 81.6 |
| 15 | 8241.75900 | 1.15600 | | |
| 16* | 8.46500 | 1.39900 | 1.80359 | 40.8 |
| 17 | 49.22000 | 0.01000 | 1.56732 | 42.8 |
| 18 | 49.22000 | 0.40000 | 1.84666 | 23.8 |
| 19 | 5.28600 | Variable | | |
| 20* | 11.76800 | 1.57800 | 1.51788 | 70.1 |
| 21* | −1903.05100 | variable | | |
| 22 | ∞ | 0.78000 | 1.51680 | 64.2 |
| 23 | ∞ | (BF) | | |
| Image surface | ∞ | | | |

TABLE II-5

(Aspherical data)

Surface No. 16

K = −9.41000E−02, A4 = −1.77662E−03, A6 = −2.08421E−04, A8 = 6.73317E−05 A10 = −2.73729E−05, A12 = 5.38860E−06, A14 = −5.55659E−07, A16 = 2.29993E−08

Surface No. 20

K = 0.00000E+00, A4 = −7.79344E−04, A6 = 6.10144E−05, A8 = −8.72399E−06 A10 = 2.05822E−07, A12 = 1.30044E−08, A14 = −4.94628E−10, A16 = 4.06152E−13

Surface No. 21

K = 0.00000E+00, A4 = −9.00147E−04, A6 = 7.98337E−05, A8 = −1.34330E−05 A10 = 7.25279E−07, A12 = −1.80856E−08, A14 = 3.94194E−10, A16 = −6.62551E−12

TABLE II-6

(Various data)

Zooming ratio 11.04434

|  | Wide-angle limit | Middle position | Telephoto limit |
|---|---|---|---|
| Focal length | 4.3029 | 13.8431 | 47.5229 |
| F-number | 3.26492 | 4.27074 | 5.09421 |
| View angle | 42.5386 | 14.6075 | 4.2542 |
| Image height | 3.5000 | 3.6000 | 3.6000 |
| Overall length of lens system | 43.4214 | 45.9707 | 54.8351 |
| BF | 0.88244 | 0.87826 | 0.87453 |
| d6 | 0.3050 | 8.7705 | 18.1561 |
| d12 | 15.6472 | 5.0952 | 1.2400 |
| d19 | 3.8128 | 3.8030 | 12.8535 |
| d21 | 3.9120 | 8.5617 | 2.8490 |
| Entrance pupil position | 11.7982 | 31.5551 | 102.7232 |
| Exit pupil position | −14.4899 | −19.1204 | −53.7011 |

TABLE II-6-continued (Various data)

| | | | |
|---|---|---|---|
| Front principal points position | 14.8967 | 35.8160 | 108.8646 |
| Back principal points position | 39.1185 | 32.1276 | 7.3122 |

Single lens data

| Lens element | Initial surface number | Focal length |
|---|---|---|
| 1 | 1 | −68.3540 |
| 2 | 3 | 46.6096 |
| 3 | 5 | 38.4931 |
| 4 | 7 | −6.7720 |
| 5 | 9 | −11.0508 |
| 6 | 11 | 13.5329 |
| 7 | 14 | 8.6720 |
| 8 | 16 | 12.5303 |
| 9 | 18 | −7.0238 |
| 10 | 20 | 22.5901 |

Zoom lens unit data

| Lens unit | Initial surface No. | Focal length | Overall length of lens unit | Front principal points position | Back principal points position |
|---|---|---|---|---|---|
| 1 | 1 | 31.62140 | 5.93600 | 0.98880 | 3.18880 |
| 2 | 7 | −6.08099 | 5.53600 | 0.34867 | 1.33592 |
| 3 | 13 | 10.23386 | 5.03200 | −2.50728 | 0.38598 |
| 4 | 20 | 22.59011 | 1.57800 | 0.00639 | 0.54449 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.27467 | −0.44471 | −1.41799 |
| 3 | 13 | −0.68881 | −1.91666 | −1.38244 |
| 4 | 20 | 0.71925 | 0.51361 | 0.76666 |

NUMERICAL EXAMPLE II-3

The zoom lens system of Numerical Example II-3 corresponds to Embodiment II-3 shown in FIG. 36. Table II-7 shows the surface data of the zoom lens system of Numerical Example II-3. Table II-8 shows the aspherical data. Table II-9 shows various data.

TABLE II-7

(Surface data)

| Surface number | r | d | nd | vd |
|---|---|---|---|---|
| Object surface | ∞ | | | |
| 1 | 28.95300 | 0.75000 | 1.84666 | 23.8 |
| 2 | 19.07400 | 0.01000 | 1.56732 | 42.8 |
| 3 | 19.07400 | 2.84700 | 1.49700 | 81.6 |
| 4 | 102.59900 | 0.15000 | | |
| 5 | 19.75500 | 2.17900 | 1.72916 | 54.7 |
| 6 | 63.58500 | Variable | | |
| 7 | 41.65600 | 0.40000 | 1.88300 | 40.8 |
| 8 | 5.19900 | 2.92000 | | |
| 9 | −29.77800 | 0.40000 | 1.78590 | 43.9 |
| 10 | 12.49200 | 0.47500 | | |
| 11 | 10.24000 | 1.33100 | 1.94595 | 18.0 |
| 12 | 46.29800 | Variable | | |
| 13 (Diaphragm) | ∞ | 0.30000 | | |
| 14 | 4.30400 | 1.76700 | 1.49700 | 81.6 |
| 15 | 8241.75900 | 1.15600 | | |
| 16* | 8.56700 | 1.39900 | 1.80359 | 40.8 |
| 17 | 48.96000 | 0.01000 | 1.56732 | 42.8 |
| 18 | 48.96000 | 0.40000 | 1.84666 | 23.8 |
| 19 | 5.34200 | Variable | | |
| 20* | 11.72600 | 1.57800 | 1.51788 | 70.1 |
| 21* | −1903.05100 | Variable | | |
| 22 | ∞ | 0.78000 | 1.51680 | 64.2 |
| 23 | ∞ | (BF) | | |
| Image surface | ∞ | | | |

TABLE II-8

(Aspherical data)

Surface No. 16

K = 4.93400E−02, A4 = −1.80530E−03, A6 = −2.15960E−04,
A8 = 7.26180E−05 A10 = −2.85091E−05, A12 = 5.36254E−06,
A14 = −5.29374E−07, A16 = 2.12136E−08
Surface No. 20

K = 0.00000E+00, A4 = −6.76168E−04, A6 = 6.14842E−05,
A8 = −8.88672E−06 A10 = 2.02317E−07, A12 = 1.30872E−08,
A14 = −4.92808E−10, A16 = 0.00000E+00
Surface No. 21

K = 0.00000E+00, A4 = −7.33588E−04, A6 = 7.88550E−05,
A8 = −1.40407E−05 A10 = 7.58234E−07, A12 = −1.68517E−08,
A14 = 1.72428E−10, A16 = 0.00000E+00

TABLE II-9

(Various data)

Zooming ratio 11.04001

| | Wide-angle limit | Middle position | Telephoto limit |
|---|---|---|---|
| Focal length | 4.3048 | 13.8679 | 47.5254 |
| F-number | 3.27976 | 4.31031 | 5.08742 |
| View angle | 42.1035 | 14.5309 | 4.2538 |
| Image height | 3.4500 | 3.6000 | 3.6000 |
| Overall length of lens system | 43.2089 | 45.3793 | 54.6428 |
| BF | 0.88855 | 0.88560 | 0.88880 |
| d6 | 0.3128 | 8.5714 | 18.1764 |
| d12 | 15.4915 | 4.8361 | 1.1000 |
| d19 | 3.6609 | 3.3086 | 12.5531 |
| d21 | 4.0031 | 8.9256 | 3.0725 |
| Entrance pupil position | 11.7985 | 30.6568 | 102.5200 |
| Exit pupil position | −14.3116 | −18.5687 | −51.4125 |
| Front principal points position | 14.8842 | 34.6391 | 106.8598 |
| Back principal points position | 38.9040 | 31.5114 | 7.1174 |

Single lens data

| Lens element | Initial surface number | Focal length |
|---|---|---|
| 1 | 1 | −68.4065 |
| 2 | 3 | 46.6152 |
| 3 | 5 | 38.4970 |
| 4 | 7 | −6.7623 |
| 5 | 9 | −11.1513 |
| 6 | 11 | 13.6543 |
| 7 | 14 | 8.6639 |
| 8 | 16 | 12.7256 |

TABLE II-9-continued (Various data)

| 9 | 18 | −7.1121 |
|---|----|---------|
| 10 | 20 | 22.5100 |

Zoom lens unit data

| Lens unit | Initial surface No. | Focal length | Overall length of lens unit | Front principal points position | Back principal points position |
|---|---|---|---|---|---|
| 1 | 1 | 31.61710 | 5.93600 | 0.97969 | 3.18057 |
| 2 | 7 | −6.07545 | 5.52600 | 0.34993 | 1.33482 |
| 3 | 13 | 10.22337 | 5.03200 | −2.48207 | 0.39575 |
| 4 | 20 | 22.50998 | 1.57800 | 0.00637 | 0.54447 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.27462 | −0.43819 | −1.42620 |
| 3 | 13 | −0.69447 | −2.02063 | −1.39549 |
| 4 | 20 | 0.71393 | 0.49538 | 0.75526 |

NUMERICAL EXAMPLE II-4

The zoom lens system of Numerical Example II-4 corresponds to Embodiment II-4 shown in FIG. 39. Table II-10 shows the surface data of the zoom lens system of Numerical Example II-4. Table II-11 shows the aspherical data. Table II-12 shows various data.

TABLE II-10

(Surface data)

| Surface number | r | d | nd | vd |
|---|---|---|---|---|
| Object surface | ∞ | | | |
| 1 | 30.04800 | 0.75000 | 1.84666 | 23.8 |
| 2 | 19.79100 | 0.01000 | 1.56732 | 42.8 |
| 3 | 19.79100 | 2.87000 | 1.49700 | 81.6 |
| 4 | 110.53100 | 0.15000 | | |
| 5 | 20.53300 | 2.17200 | 1.72916 | 54.7 |
| 6 | 66.95400 | Variable | | |
| 7 | 42.41000 | 0.40000 | 1.88300 | 40.8 |
| 8 | 5.23200 | 2.92000 | | |
| 9 | −26.60600 | 0.40000 | 1.72916 | 54.7 |
| 10 | 11.77400 | 0.41400 | | |
| 11 | 9.85000 | 1.52500 | 1.92286 | 20.9 |
| 12 | 49.89900 | Variable | | |
| 13 (Diaphragm) | ∞ | 0.30000 | | |
| 14 | 4.34100 | 1.71500 | 1.49700 | 81.6 |
| 15 | 8241.75900 | 1.15600 | | |
| 16* | 8.13300 | 1.39900 | 1.80359 | 40.8 |
| 17 | 29.64300 | 0.01000 | 1.56732 | 42.8 |
| 18 | 29.64300 | 0.40000 | 1.84666 | 23.8 |
| 19 | 5.13200 | Variable | | |
| 20* | 11.58600 | 1.57800 | 1.51835 | 70.3 |
| 21* | −1903.05100 | Variable | | |
| 22 | ∞ | 0.78000 | 1.51680 | 64.2 |
| 23 | ∞ | (BF) | | |
| Image surface | ∞ | | | |

TABLE II-11

(Aspherical data)

Surface No. 16

K = 1.78419E−01, A4 = −1.74423E−03, A6 = −2.43524E−04, A8 = 8.84289E−05 A10 = −3.13851E−05, A12 = 5.33759E−06, A14 = −4.60617E−07, A16 = 1.56777E−08

Surface No. 20

K = 0.00000E+00, A4 = −7.66562E−04, A6 = 7.82061E−05, A8 = −9.47410E−06 A10 = 1.69202E−07, A12 = 1.30492E−08, A14 = −4.30772E−10, A16 = 0.00000E+00

Surface No. 21

K = 0.00000E+00, A4 = −8.32096E−04, A6 = 9.10521E−05, A8 = −1.41343E−05 A10 = 7.49749E−07, A12 = −2.21508E−08, A14 = 4.12406E−10, A16 = 0.00000E+00

TABLE II-12

(Various data)

Zooming ratio 11.01481

| | Wide-angle limit | Middle position | Telephoto limit |
|---|---|---|---|
| Focal length | 4.3066 | 13.8459 | 47.4361 |
| F-number | 3.30024 | 4.29885 | 5.09193 |
| View angle | 42.3363 | 14.5427 | 4.2584 |
| Image height | 3.4800 | 3.6000 | 3.6000 |
| Overall length of lens system | 43.5229 | 45.7546 | 55.0476 |
| BF | 0.87881 | 0.87324 | 0.87433 |
| d6 | 0.3224 | 8.9809 | 18.8488 |
| d12 | 15.7053 | 4.8375 | 1.0000 |
| d19 | 3.7902 | 3.4857 | 12.4922 |
| d21 | 3.8772 | 8.6283 | 2.8833 |
| Entrance pupil position | 11.8589 | 31.5019 | 104.5924 |
| Exit pupil position | −14.4027 | −18.5649 | −51.5094 |
| Front principal points position | 14.9518 | 35.4853 | 109.0727 |
| Back principal points position | 39.2163 | 31.9088 | 7.6115 |

Single lens data

| Lens element | Initial surface number | Focal length |
|---|---|---|
| 1 | 1 | −70.8535 |
| 2 | 3 | 48.0023 |
| 3 | 5 | 39.8296 |
| 4 | 7 | −6.7934 |
| 5 | 9 | −11.1448 |
| 6 | 11 | 13.0598 |
| 7 | 14 | 8.7385 |
| 8 | 16 | 13.5548 |
| 9 | 18 | −7.3858 |
| 10 | 20 | 22.2227 |

Zoom lens unit data

| Lens unit | Initial surface No. | Focal length | Overall length of lens unit | Front principal points position | Back principal points position |
|---|---|---|---|---|---|
| 1 | 1 | 32.54769 | 5.95200 | 1.00942 | 3.21326 |
| 2 | 7 | −6.24827 | 5.65900 | 0.31566 | 1.37601 |
| 3 | 13 | 10.26521 | 4.98000 | −2.52584 | 0.35485 |
| 4 | 20 | 22.22269 | 1.57800 | 0.00629 | 0.54471 |

TABLE II-12-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.27258 | −0.43804 | −1.42128 |
| 3 | 13 | −0.67763 | −1.93147 | −1.34700 |
| 4 | 20 | 0.71635 | 0.50280 | 0.76127 |

NUMERICAL EXAMPLE II-5

The zoom lens system of Numerical Example II-5 corresponds to Embodiment II-5 shown in FIG. 42. Table II-13 shows the surface data of the zoom lens system of Numerical Example II-5. Table II-14 shows the aspherical data. Table II-15 shows various data.

TABLE II-13

(Surface data)

| Surface number | r | d | nd | vd |
|---|---|---|---|---|
| Object surface | ∞ | | | |
| 1 | 29.96700 | 0.75000 | 1.84666 | 23.8 |
| 2 | 19.76100 | 0.01000 | 1.56732 | 42.8 |
| 3 | 19.76100 | 2.87000 | 1.49700 | 81.6 |
| 4 | 113.14300 | 0.15000 | | |
| 5 | 20.52300 | 2.17200 | 1.72916 | 54.7 |
| 6 | 66.07200 | Variable | | |
| 7 | 42.98400 | 0.40000 | 1.88300 | 40.8 |
| 8 | 5.24000 | 2.87300 | | |
| 9 | −26.74300 | 0.40000 | 1.72916 | 54.7 |
| 10 | 11.79700 | 0.41400 | | |
| 11 | 9.87600 | 1.61100 | 1.92286 | 20.9 |
| 12 | 49.90000 | Variable | | |
| 13 (Diaphragm) | ∞ | 0.30000 | | |
| 14 | 4.35100 | 1.71500 | 1.49700 | 81.6 |
| 15 | 8241.75900 | 1.15600 | | |
| 16* | 8.17800 | 1.39900 | 1.80359 | 40.8 |
| 17 | 26.89800 | 0.01000 | 1.56732 | 42.8 |
| 18 | 26.89800 | 0.40000 | 1.84666 | 23.8 |
| 19 | 5.12800 | Variable | | |
| 20* | 11.58100 | 1.57800 | 1.51835 | 70.3 |
| 21* | −1903.05100 | Variable | | |
| 22 | ∞ | 0.78000 | 1.51680 | 64.2 |
| 23 | ∞ | (BF) | | |
| Image surface | ∞ | | | |

TABLE II-14

(Aspherical data)

Surface No. 16

K = 2.48612E−01, A4 = −1.72469E−03, A6 = −2.47114E−04,
A8 = 8.90838E−05 A10 = −3.12229E−05, A12 = 5.32264E−06,
A14 = −4.63452E−07, A16 = 1.59112E−08

Surface No. 20

K = 0.00000E+00, A4 = −8.09583E−04, A6 = 7.87583E−05,
A8 = −9.48222E−06 A10 = 1.69233E−07, A12 = 1.30664E−08,
A14 = −4.30331E−10, A16 = 0.00000E+00

Surface No. 21

K = 0.00000E+00, A4 = −8.68096E−04, A6 = 8.93558E−05,
A8 = −1.40719E−05 A10 = 7.56809E−07, A12 = −2.21847E−08,
A14 = 3.91923E−10, A16 = 0.00000E+00

TABLE II-15

(Various data)

Zooming ratio 11.19473

| | Wide-angle limit | Middle position | Telephoto limit |
|---|---|---|---|
| Focal length | 4.3435 | 13.8635 | 48.6242 |
| F-number | 3.32176 | 4.29281 | 5.09761 |
| View angle | 42.1252 | 14.5274 | 4.1532 |
| Image height | 3.4800 | 3.6000 | 3.6000 |
| Overall length of lens system | 43.6261 | 46.0995 | 55.1687 |
| BF | 0.88520 | 0.87910 | 0.88176 |
| d6 | 0.3325 | 9.1692 | 18.9873 |
| d12 | 15.6779 | 5.0320 | 1.0000 |
| d19 | 3.7027 | 3.3848 | 12.5529 |
| d21 | 4.0398 | 8.6464 | 2.7587 |
| Entrance pupil position | 11.8828 | 32.3910 | 107.5476 |
| Exit pupil position | −14.3910 | −18.3900 | −52.0024 |
| Front principal points position | 14.9913 | 36.2802 | 111.4645 |
| Back principal points position | 39.2826 | 32.2360 | 6.5445 |

Single lens data

| Lens element | Initial surface number | Focal length |
|---|---|---|
| 1 | 1 | −70.9202 |
| 2 | 3 | 47.6882 |
| 3 | 5 | 40.0231 |
| 4 | 7 | −6.7919 |
| 5 | 9 | −11.1776 |
| 6 | 11 | 13.0893 |
| 7 | 14 | 8.7586 |
| 8 | 16 | 14.1515 |
| 9 | 18 | −7.5470 |
| 10 | 20 | 22.2132 |

Zoom lens unit data

| Lens unit | Initial surface No. | Focal length | Overall length of lens unit | Front principal points position | Back principal points position |
|---|---|---|---|---|---|
| 1 | 1 | 32.51235 | 5.95200 | 1.00008 | 3.20471 |
| 2 | 7 | −6.24486 | 5.69800 | 0.31767 | 1.42601 |
| 3 | 13 | 10.34842 | 4.98000 | −2.56327 | 0.32969 |
| 4 | 20 | 22.21316 | 1.57800 | 0.00629 | 0.54471 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.27306 | −0.44500 | −1.48150 |
| 3 | 13 | −0.69043 | −1.91066 | −1.31711 |
| 4 | 20 | 0.70862 | 0.50151 | 0.76645 |

NUMERICAL EXAMPLE II-6

The zoom lens system of Numerical Example II-6 corresponds to Embodiment II-6 shown in FIG. 45. Table II-16 shows the surface data of the zoom lens system of Numerical Example II-6. Table II-17 shows the aspherical data. Table II-18 shows various data.

TABLE II-16

(Surface data)

| Surface number | r | d | nd | vd |
|---|---|---|---|---|
| Object surface | ∞ | | | |
| 1 | 30.82100 | 0.75000 | 1.84666 | 23.8 |
| 2 | 19.80200 | 0.01000 | 1.56732 | 42.8 |
| 3 | 19.80200 | 2.84100 | 1.49700 | 81.6 |
| 4 | 132.37900 | 0.15000 | | |
| 5 | 19.70800 | 2.19000 | 1.72916 | 54.7 |
| 6 | 63.77100 | Variable | | |
| 7 | 46.49600 | 0.40000 | 1.88300 | 40.8 |
| 8 | 5.15900 | 2.99000 | | |
| 9 | −26.75700 | 0.40000 | 1.78590 | 43.9 |
| 10 | 13.20600 | 0.40800 | | |
| 11 | 10.12700 | 1.34000 | 1.94595 | 18.0 |
| 12 | 46.54600 | Variable | | |
| 13 (Diaphragm) | ∞ | 0.30000 | | |
| 14* | 4.69000 | 2.11400 | 1.51835 | 70.3 |
| 15* | −14.23800 | 1.13000 | | |
| 16 | 6.94600 | 0.91900 | 1.94595 | 18.0 |
| 17 | 3.99000 | Variable | | |
| 18* | 11.88000 | 1.57700 | 1.51835 | 70.3 |
| 19* | −613.12200 | Variable | | |
| 20 | ∞ | 0.78000 | 1.51680 | 64.2 |
| 21 | ∞ | (BF) | | |
| Image surface | ∞ | | | |

TABLE II-17

(Aspherical data)

Surface No. 14

K = 0.00000E+00, A4 = −6.98798E−04, A6 = −3.07231E−05,
A8 = 4.14892E−05 A10 = −7.19360E−06, A12 = 8.33698E−08,
A14 = 1.67474E−07, A16 = −1.49651E−08

Surface No. 15

K = 0.00000E+00, A4 = 1.02954E−03, A6 = 2.16803E−04,
A8 = −3.21361E−05 A10 = 3.94649E−06, A12 = 2.58926E−07,
A14 = −6.31197E−09, A16 = −3.45461E−09

Surface No. 18

K = 0.00000E+00, A4 = −2.31301E−04, A6 = −3.30169E−05,
A8 = −5.02139E−06 A10 = 7.52561E−07, A12 = −5.25403E−08,
A14 = 2.01872E−09, A16 = −4.40237E−11

Surface No. 19

K = 0.00000E+00, A4 = −5.07083E−04, A6 = 2.66686E−05,
A8 = −1.42819E−05 A10 = 1.13449E−06, A12 = −2.14192E−08,
A14 = −1.36032E−09, A16 = 4.60748E−11

TABLE II-18

(Various data)

Zooming ratio 11.02420

| | Wide-angle limit | Middle position | Telephoto limit |
|---|---|---|---|
| Focal length | 4.2999 | 13.8718 | 47.4034 |
| F-number | 3.31040 | 4.20958 | 4.99163 |
| View angle | 41.5250 | 14.5528 | 4.2738 |
| Image height | 3.3500 | 3.6000 | 3.6000 |
| Overall length of lens system | 43.3831 | 45.7414 | 54.4466 |
| BF | 0.87136 | 0.88634 | 0.87037 |
| d6 | 0.3050 | 9.1454 | 18.3495 |
| d12 | 15.6017 | 5.0041 | 1.2400 |
| d17 | 4.8012 | 3.7877 | 12.7923 |
| d19 | 3.5048 | 8.6189 | 2.8954 |
| Entrance pupil position | 11.6412 | 32.7101 | 105.6893 |
| Exit pupil position | −15.5987 | −18.6607 | −51.0614 |
| Front principal points position | 14.8185 | 36.7376 | 109.8228 |
| Back principal points position | 39.0831 | 31.8696 | 7.0432 |

Single lens data

| Lens element | Initial surface number | Focal length |
|---|---|---|
| 1 | 1 | −67.5261 |
| 2 | 3 | 46.4623 |
| 3 | 5 | 38.3143 |
| 4 | 7 | −6.6017 |
| 5 | 9 | −11.2015 |
| 6 | 11 | 13.4422 |
| 7 | 14 | 7.0758 |
| 8 | 16 | −11.6760 |
| 9 | 18 | 22.5026 |

Zoom lens unit data

| Lens unit | Initial surface No. | Focal length | Overall length of lens unit | Front principal points position | Back principal points position |
|---|---|---|---|---|---|
| 1 | 1 | 31.49935 | 5.94100 | 1.07105 | 3.27435 |
| 2 | 7 | −5.98100 | 5.53800 | 0.35015 | 1.35673 |
| 3 | 13 | 10.16664 | 4.46300 | −2.41163 | 0.14756 |
| 4 | 18 | 22.50262 | 1.57700 | 0.01976 | 0.55724 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.26946 | −0.44781 | −1.44049 |
| 3 | 13 | −0.68706 | −1.93046 | −1.36656 |
| 4 | 18 | 0.73736 | 0.50942 | 0.76448 |

NUMERICAL EXAMPLE II-7

The zoom lens system of Numerical Example II-7 corresponds to Embodiment II-7 shown in FIG. 47. Table II-19 shows the surface data of the zoom lens system of Numerical Example II-7. Table II-20 shows the aspherical data. Table II-21 shows various data.

TABLE II-19

(Surface data)

| Surface number | r | d | nd | vd |
|---|---|---|---|---|
| Object surface | ∞ | | | |
| 1 | 31.60900 | 0.75700 | 1.92286 | 20.9 |
| 2 | 22.12900 | 0.01000 | 1.56732 | 42.8 |
| 3 | 22.12900 | 2.85800 | 1.49700 | 81.6 |
| 4 | 221.46700 | 0.14400 | | |
| 5 | 19.82900 | 2.17900 | 1.72916 | 54.7 |
| 6 | 56.23800 | Variable | | |
| 7 | 44.93500 | 0.40100 | 1.88300 | 40.8 |
| 8 | 5.19000 | 2.94100 | | |
| 9 | −28.98600 | 0.39900 | 1.78590 | 43.9 |
| 10 | 12.33500 | 0.47500 | | |
| 11 | 10.20700 | 1.34300 | 1.94595 | 18.0 |
| 12 | 47.99500 | Variable | | |

TABLE II-19-continued (Surface data)

| Surface number | r | d | nd | vd |
|---|---|---|---|---|
| 13 (Diaphragm) | ∞ | 0.30000 | | |
| 14 | 4.30200 | 1.77300 | 1.49700 | 81.6 |
| 15 | 6803.89600 | 1.15900 | | |
| 16* | 8.43500 | 1.39700 | 1.80359 | 40.8 |
| 17 | 49.88900 | 0.01000 | 1.56732 | 42.8 |
| 18 | 49.88900 | 0.39800 | 1.84666 | 23.8 |
| 19 | 5.29900 | Variable | | |
| 20* | 11.72100 | 1.58000 | 1.51835 | 70.3 |
| 21* | −1629.06500 | Variable | | |
| 22 | ∞ | 0.78000 | 1.51680 | 64.2 |
| 23 | ∞ | (BF) | | |
| Image surface | ∞ | | | |

TABLE II-20

(Aspherical data)

Surface No. 16

K = −1.26014E−01, A4 = −1.78233E−03, A6 = −2.10674E−04, A8 = 6.69814E−05 A10 = −2.74048E−05, A12 = 5.39168E−06, A14 = −5.55222E−07, A16 = 2.30211E−08

Surface No. 20

K = 0.00000E+00, A4 = −7.75064E−04, A6 = 6.14125E−05, A8 = −8.73167E−06 A10 = 2.05005E−07, A12 = 1.29818E−08, A14 = −4.93909E−10, A16 = 6.87949E−13

Surface No. 21

K = 0.00000E+00, A4 = −9.03803E−04, A6 = 7.96172E−05, A8 = −1.34273E−05 A10 = 7.25544E−07, A12 = −1.80856E−08, A14 = 3.95732E−10, A16 = −6.69981E−12

TABLE II-21

(Various data)

Zooming ratio 11.02287

| | Wide-angle limit | Middle position | Telephoto limit |
|---|---|---|---|
| Focal length | 4.3008 | 13.8156 | 47.4068 |
| F-number | 3.26165 | 4.24209 | 5.08129 |
| View angle | 42.5203 | 14.6148 | 4.2714 |
| Image height | 3.5000 | 3.6000 | 3.6000 |
| Overall length of lens system | 43.1633 | 45.9912 | 54.9059 |
| BF | 0.88315 | 0.88011 | 0.86611 |
| d6 | 0.3402 | 8.9311 | 18.1547 |
| d12 | 15.2947 | 5.0260 | 1.2415 |
| d19 | 3.8356 | 3.6957 | 12.7992 |
| d21 | 3.9057 | 8.5543 | 2.9404 |
| Entrance pupil position | 11.7233 | 32.1123 | 103.6880 |
| Exit pupil position | −14.5669 | −18.9414 | −53.9620 |
| Front principal points position | 14.8268 | 36.2985 | 110.1048 |
| Back principal points position | 38.8626 | 32.1757 | 7.4991 |

Single lens data

| Lens element | Initial surface number | Focal length |
|---|---|---|
| 1 | 1 | −83.1380 |
| 2 | 3 | 49.2339 |
| 3 | 5 | 40.9708 |
| 4 | 7 | −6.6768 |

TABLE II-21-continued (Various data)

| 5 | 9 | −10.9635 |
| 6 | 11 | 13.4721 |
| 7 | 14 | 8.6607 |
| 8 | 16 | 12.4456 |
| 9 | 18 | −7.0312 |
| 10 | 20 | 22.4580 |

Zoom lens unit data

| Lens unit | Initial surface No. | Focal length | Overall length of lens unit | Front principal points position | Back principal points position |
|---|---|---|---|---|---|
| 1 | 1 | 31.49407 | 5.94800 | 0.97373 | 3.20547 |
| 2 | 7 | −5.98650 | 5.55900 | 0.35026 | 1.33891 |
| 3 | 13 | 10.16527 | 5.03700 | −2.46799 | 0.41145 |
| 4 | 20 | 22.45799 | 1.58000 | 0.00744 | 0.54649 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.27119 | −0.44398 | −1.40526 |
| 3 | 13 | −0.70146 | −1.93358 | −1.40649 |
| 4 | 20 | 0.71785 | 0.51099 | 0.76159 |

NUMERICAL EXAMPLE II-8

The zoom lens system of Numerical Example II-8 corresponds to Embodiment II-8 shown in FIG. 50. Table II-22 shows the surface data of the zoom lens system of Numerical Example II-8. Table II-23 shows the aspherical data. Table II-24 shows various data.

TABLE II-22

(Surface data)

| Surface number | r | d | nd | vd | Effective diameter |
|---|---|---|---|---|---|
| Object surface | ∞ | | | | |
| 1 | 19.74460 | 0.75000 | 1.80518 | 25.5 | 9.867 |
| 2 | 14.42530 | 0.01000 | 1.56732 | 42.8 | 9.046 |
| 3 | 14.42530 | 4.58060 | 1.58842 | 61.4 | 9.044 |
| 4* | ∞ | Variable | | | 8.687 |
| 5 | 51.45680 | 0.40000 | 1.90366 | 31.3 | 6.224 |
| 6 | 5.56270 | 3.12720 | | | 4.550 |
| 7 | −25.07760 | 0.40000 | 1.72916 | 54.7 | 4.494 |
| 8 | 14.27150 | 0.16660 | | | 4.447 |
| 9 | 10.68100 | 1.55340 | 1.94595 | 18.0 | 4.541 |
| 10 | 75.93340 | Variable | | | 4.456 |
| 11 (Diaphragm) | ∞ | 0.30000 | | | 2.205 |
| 12 | 4.01800 | 2.44330 | 1.48749 | 70.4 | |
| 13 | −21.09430 | 0.20000 | | | |
| 14* | 6.14200 | 1.23530 | 1.68398 | 31.2 | 2.594 |
| 15 | −42.70560 | 0.01000 | 1.56732 | 42.8 | |
| 16 | −42.70560 | 0.40000 | 2.00069 | 25.5 | |
| 17 | 4.55800 | Variable | | | 1.753 |
| 18* | 10.12120 | 1.31660 | 1.52500 | 70.3 | 3.622 |
| 19 | 21.51830 | Variable | | | 3.603 |
| 20 | ∞ | 0.78000 | 1.51680 | 64.2 | |
| 21 | ∞ | (BF) | | | |
| Image surface | ∞ | | | | |

TABLE II-23

(Aspherical data)

Surface No. 4

K = 0.00000E+00, A4 = 6.17753E−06, A6 = −1.49369E−09,
A8 = −8.29862E−11 A10 = 4.82705E−13, A12 = 0.00000E+00

Surface No. 14

K = −2.06747E+00, A4 = −1.16941E−03, A6 = −2.34186E−04,
A8 = −6.87246E−08 A10 = −2.18647E−06, A12 = 0.00000E+00

Surface No. 18

K = 0.00000E+00, A4 = −3.08123E−04, A6 = 6.64049E−05,
A8 = −9.04968E−06 A10 = 6.32666E−07, A12 = −1.69826E−08

TABLE II-24

(Various data)

Zooming ratio 11.40034

|  | Wide-angle limit | Middle position | Telephoto limit |
|---|---|---|---|
| Focal length | 4.6049 | 14.9993 | 52.4971 |
| F-number | 3.42225 | 4.69287 | 5.64395 |
| View angle | 40.9010 | 14.5275 | 4.2181 |
| Image height | 3.5100 | 3.9300 | 3.9300 |
| Overall length of lens system | 45.3684 | 47.6360 | 59.0317 |
| BF | 0.93231 | 0.89902 | 0.90205 |
| d4 | 0.3000 | 9.7009 | 21.5121 |
| d10 | 18.1817 | 6.0382 | 1.0000 |
| d17 | 5.7814 | 4.2306 | 12.6513 |
| d19 | 2.5000 | 9.0943 | 5.2933 |
| Entrance pupil position | 12.0254 | 32.1580 | 106.5866 |
| Exit pupil position | −13.5292 | −17.8075 | −30.6943 |
| Front principal points position | 15.1639 | 35.1306 | 71.8603 |
| Back principal points position | 40.7635 | 32.6367 | 6.5347 |

Single lens data

| Lens element | Initial surface number | Focal length |
|---|---|---|
| 1 | 1 | −70.9634 |
| 2 | 3 | 24.5155 |
| 3 | 5 | −6.9306 |
| 4 | 7 | −12.4205 |
| 5 | 9 | 12.9893 |
| 6 | 12 | 7.1515 |
| 7 | 14 | 7.9322 |
| 8 | 16 | −4.0982 |
| 9 | 18 | 35.0062 |

Zoom lens unit data

| Lens unit | Initial surface No. | Focal length | Overall length of lens unit | Front principal points position | Back principal points position |
|---|---|---|---|---|---|
| 1 | 1 | 38.45052 | 5.34060 | −0.23969 | 1.79936 |
| 2 | 5 | −6.80173 | 5.64720 | 0.23455 | 1.32483 |
| 3 | 11 | 10.18755 | 4.58860 | −3.11748 | 0.11964 |
| 4 | 18 | 35.00621 | 1.31660 | −0.73737 | −0.25109 |

TABLE II-24-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.24668 | −0.37430 | −1.06930 |
| 3 | 11 | −0.57626 | −1.59102 | −1.67223 |
| 4 | 18 | 0.84248 | 0.65505 | 0.76355 |

NUMERICAL EXAMPLE II-9

The zoom lens system of Numerical Example II-9 corresponds to Embodiment II-9 shown in FIG. 53. Table II-25 shows the surface data of the zoom lens system of Numerical Example II-9. Table II-26 shows the aspherical data. Table II-27 shows various data.

TABLE II-25

(Surface data)

| Surface number | r | d | nd | vd | Effective diameter |
|---|---|---|---|---|---|
| Object surface | ∞ | | | | |
| 1 | 19.77840 | 0.75000 | 1.85139 | 23.6 | 9.867 |
| 2 | 15.05080 | 0.01000 | 1.56732 | 42.8 | 9.046 |
| 3 | 15.05080 | 4.55170 | 1.58913 | 61.2 | 9.044 |
| 4* | −2009.86870 | Variable | | | 8.687 |
| 5 | 52.22170 | 0.40000 | 1.95534 | 29.4 | 6.224 |
| 6 | 5.68140 | 3.07420 | | | 4.550 |
| 7 | −23.91140 | 0.40000 | 1.72668 | 53.6 | 4.494 |
| 8 | 14.22890 | 0.15000 | | | 4.447 |
| 9 | 10.89020 | 1.62340 | 1.94595 | 18.0 | 4.541 |
| 10 | 165.48490 | Variable | | | 4.456 |
| 11 (Diaphragm) | ∞ | 0.30000 | | | 2.205 |
| 12 | 4.18710 | 2.65790 | 1.49171 | 69.9 | |
| 13 | −22.46530 | 0.20000 | | | |
| 14* | 6.60790 | 1.54420 | 1.71418 | 29.7 | 2.712 |
| 15 | −18.34560 | 0.01000 | 1.56732 | 42.8 | |
| 16 | −18.34560 | 0.40000 | 2.00080 | 24.4 | |
| 17 | 4.72980 | Variable | | | 1.753 |
| 18* | 9.76620 | 1.36180 | 1.51760 | 63.5 | 3.622 |
| 19 | 23.45330 | Variable | | | 3.603 |
| 20 | ∞ | 0.78000 | 1.51680 | 64.2 | |
| 21 | ∞ | (BF) | | | |
| Image surface | ∞ | | | | |

TABLE II-26

(Aspherical data)

Surface No. 4

K = 0.00000E+00, A4 = 6.68914E−06, A6 = −9.93410E−10,
A8 = −8.29880E−11 A10 = 4.79336E−13, A12 = 0.00000E+00

Surface No. 14

K = −1.97925E+00, A4 = −1.09715E−03, A6 = −1.81257E−04,
A8 = 5.09203E−07 A10 = −1.71341E−06, A12 = 0.00000E+00

TABLE II-26-continued (Aspherical data)

Surface No. 18

K = 0.00000E+00, A4 = −3.54076E−04, A6 = 7.33046E−05,
A8 = −1.00180E−05 A10 = 6.97991E−07, A12 = −1.86608E−08

TABLE II-27

(Various data)

Zooming ratio 11.44412

| | Wide-angle limit | Middle position | Telephoto limit |
|---|---|---|---|
| Focal length | 4.5865 | 14.9965 | 52.4889 |
| F-number | 3.44725 | 4.69828 | 5.62110 |
| View angle | 41.0129 | 14.5052 | 4.2129 |
| Image height | 3.5100 | 3.9300 | 3.9300 |
| Overall length of lens system | 45.8634 | 47.8820 | 59.0016 |
| BF | 0.91651 | 0.88175 | 0.87169 |
| d4 | 0.3000 | 9.8706 | 21.5407 |
| d10 | 18.5253 | 6.1613 | 1.0000 |
| d17 | 5.3803 | 3.7677 | 11.8523 |
| d19 | 2.5281 | 8.9874 | 5.5237 |
| Entrance pupil position | 11.8960 | 32.6328 | 107.7666 |
| Exit pupil position | −13.4686 | −17.4274 | −31.0462 |
| Front principal points position | 15.0202 | 35.3461 | 73.9375 |

TABLE II-27-continued (Various data)

| | | |
|---|---|---|
| 6 | 12 | 7.4217 |
| 7 | 14 | 6.9824 |
| 8 | 16 | −3.7250 |
| 9 | 18 | 31.2703 |

Zoom lens unit data

| Lens unit | Initial surface No. | Focal length | Overall length of lens unit | Front principal points position | Back principal points position |
|---|---|---|---|---|---|
| 1 | 1 | 38.18058 | 5.31170 | −0.23227 | 1.80477 |
| 2 | 5 | −6.86331 | 5.64760 | 0.11084 | 1.15898 |
| 3 | 11 | 10.27017 | 5.11210 | −3.64054 | 0.23351 |
| 4 | 18 | 31.27028 | 1.36180 | −0.61927 | −0.12535 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.25049 | −0.38495 | −1.11439 |
| 3 | 11 | −0.58070 | −1.64465 | −1.68650 |
| 4 | 18 | 0.82584 | 0.62039 | 0.73148 |

The following Table II-28 shows the corresponding values to the individual conditions in the zoom lens systems of the numerical examples.

TABLE II-28

(Corresponding values to conditions)

| | Condition | Example | | | | | | | | |
|---|---|---|---|---|---|---|---|---|---|---|
| | | II-1 | II-2 | II-3 | II-4 | II-5 | II-6 | II-7 | II-8 | II-9 |
| (3) | $L_W/I_r$ | 10.795 | 10.998 | 11.107 | 11.092 | 11.106 | 11.394 | 10.945 | 11.373 | 11.496 |
| (4) | $L_T/I_r$ | 13.763 | 13.889 | 14.046 | 14.030 | 14.045 | 14.300 | 13.922 | 14.798 | 14.790 |
| (a-1) | $\omega_W$ | 42.83 | 42.54 | 42.10 | 42.34 | 42.13 | 41.53 | 42.52 | 40.90 | 41.01 |
| (b) | $f_T/f_W$ | 11.03 | 11.04 | 11.04 | 11.01 | 11.19 | 11.02 | 11.02 | 11.40 | 11.44 |
| (10) | $m_{2T}/m_{2W}$ | 5.182 | 5.162 | 5.194 | 5.214 | 5.425 | 5.345 | 5.182 | 4.337 | 4.449 |
| (11) | $L_T/f_T$ | 1.157 | 1.154 | 1.150 | 1.160 | 1.135 | 1.149 | 1.158 | 1.124 | 1.124 |
| (12) | $f_T/f_{G1}$ | 1.506 | 1.503 | 1.503 | 1.457 | 1.496 | 1.505 | 1.505 | 1.365 | 1.375 |
| (13) | $L_W/f_{G1}$ | 1.366 | 1.373 | 1.367 | 1.337 | 1.342 | 1.377 | 1.371 | 1.180 | 1.201 |
| (14) | $L_T/f_{G1}$ | 1.742 | 1.734 | 1.728 | 1.691 | 1.697 | 1.729 | 1.743 | 1.535 | 1.545 |
| (15) | $f_{G1}/|f_{G2}|$ | 5.262 | 5.200 | 5.204 | 5.209 | 5.206 | 5.267 | 5.261 | 5.653 | 5.563 |

TABLE II-27-continued (Various data)

| Back principal points position | 41.2769 | 32.8854 | 6.5127 |
|---|---|---|---|

Single lens data

| Lens element | Initial surface number | Focal length |
|---|---|---|
| 1 | 1 | −79.7777 |
| 2 | 3 | 25.3788 |
| 3 | 5 | −6.7011 |
| 4 | 7 | −12.2219 |
| 5 | 9 | 12.2609 |

The zoom lens system according to the present invention is applicable to a digital input device such as a digital camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital camera.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system, in order from an object side to an image side, comprising a first lens unit having positive optical power, a second lens unit having negative optical power, a third lens unit having positive optical power, and a fourth lens unit having positive optical power, wherein
the first lens unit is composed of three or fewer lens elements, wherein
the second lens unit is composed of three lens elements, wherein
in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein
the following conditions (2), (a–1) and (b) are satisfied:

$$2.00 \leq D/f_W \leq 4.68 \tag{2}$$

$$\omega_W \geq 35 \tag{a-1}$$

$$f_T/f_W \geq 10 \tag{b}$$

where,
D is a total of an optical axial thickness of each lens unit,
$\omega_W$ is a half view angle (°) at a wide-angle limit,
$f_T$ is a focal length of the entire system at a telephoto limit, and
$f_W$ is a focal length of the entire system at a wide-angle limit,
wherein among the three or fewer lens elements constituting the first lens unit and the three lens elements constituting the second lens unit, only the object side surface of the lens element arranged in the center of the second lens unit has a negative radius of curvature.

2. The zoom lens system as claimed in claim 1, satisfying the following condition (10):

$$4.00 \leq m_{2T}/m_{2W} \leq 8.00 \tag{10}$$

where,
$m_{2T}$ is a lateral magnification of the second lens unit at a telephoto limit in an infinity in-focus condition, and
$m_{2W}$ is a lateral magnification of the second lens unit at a wide-angle limit in an infinity in-focus condition.

3. The zoom lens system as claimed in claim 1, satisfying the following condition (11):

$$1.00 \leq L_T/f_T \leq 2.00 \tag{11}$$

where,
$L_T$ is an overall length of lens system at a telephoto limit (a distance from the most object side surface of the first lens unit to the image surface), and
$f_T$ is a focal length of the entire system at a telephoto limit.

4. The zoom lens system as claimed in claim 1, satisfying the following condition (12):

$$1.00 \leq f_T/f_{G1} \leq 2.00 \tag{12}$$

where,
$f_{G1}$ is a composite focal length of the first lens unit, and
$f_T$ is a focal length of the entire system at a telephoto limit.

5. The zoom lens system as claimed in claim 1, satisfying the following condition (13):

$$1.00 \leq L_W/f_{G1} \leq 2.00 \tag{13}$$

where,
$L_W$ is an overall length of lens system at a wide-angle limit (a distance from the most object side surface of the first lens unit to the image surface), and
$f_{G1}$ is a composite focal length of the first lens unit.

6. The zoom lens system as claimed in claim 1, satisfying the following condition (14):

$$1.50 \leq L_T/f_{G1} \leq 2.00 \tag{14}$$

where,
$L_T$ is an overall length of lens system at a telephoto limit (a distance from the most object side surface of the first lens unit to the image surface), and
$f_{G1}$ is a composite focal length of the first lens unit.

7. The zoom lens system as claimed in claim 1, satisfying the following condition (15):

$$4.50 \leq f_{G1}/|f^{G2}| \leq 7.00 \tag{15}$$

where,
$f_{G1}$ is a composite focal length of the first lens unit, and
$f^{G2}$ is a composite focal length of the second lens unit.

8. The zoom lens system as claimed in claim 1, wherein the third lens unit is composed of two or three lens elements.

9. The zoom lens system as claimed in claim 8, wherein the third lens unit includes a lens element having positive optical power and located on the most object side.

10. The zoom lens system as claimed in claim 8, wherein the third lens unit includes at least one lens element having negative optical power and having a concave image side surface.

11. The zoom lens system as claimed in claim 1, wherein the fourth lens unit is composed of one lens element having positive optical power.

12. An imaging device capable of outputting an optical image of an object as an electric image signal, comprising:
a zoom lens system that forms the optical image of the object; and
an image sensor that converts the optical image formed by the zoom lens system into the electric image signal, wherein
in the zoom lens system,
the zoom lens system, in order from an object side to an image side, comprises a first lens unit having positive optical power, a second lens unit having negative optical power, a third lens unit having positive optical power, and a fourth lens unit having positive optical power, wherein
the first lens unit is composed of three or fewer lens elements, wherein
the second lens unit is composed of three lens elements, wherein
in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein
the following conditions (2), (a–1) and (b) are satisfied:

$$2.00 \leq D/f_W \leq 4.68 \tag{2}$$

$$\omega_W \leq 35 \tag{a-1}$$

$$f_T/f_W \geq 10 \tag{b}$$

where,
D is a total of an optical axial thickness of each lens unit,
$\omega_W$ is a half view angle)(°) at a wide-angle limit,
$f_T$ is a focal length of the entire system at a telephoto limit, and
$f_W$ is a focal length of the entire system at a wide-angle limit,
wherein among the three or fewer lens elements constituting the first lens unit and the three lens elements constituting the second lens unit, only the object side surface of the lens element arranged in the center of the second lens unit has a negative radius of curvature.

13. A camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein the first lens unit is composed of three or fewer lens elements, wherein the second lens unit is composed of three lens elements, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (2), (a–1) and (b) are satisfied:

$$2.00 \leq D/f_W \leq 4.68 \tag{2}$$

$$\omega_W \geq 35 \tag{a-1}$$

$$f_T/f_W \geq 10 \tag{b}$$

where,

D is a total of an optical axial thickness of each lens unit, $\omega_W$ is a half view angle (°) at a wide-angle limit, $f_T$ is a focal length of the entire system at a telephoto limit, and $f_W$ is a focal length of the entire system at a wide-angle limit, wherein among the three or fewer lens elements constituting the first lens unit and the three lens elements constituting the second lens unit, only the object side surface of the lens element arranged in the center of the second lens unit has a negative radius of curvature.

* * * * *